(12) United States Patent
Wang et al.

(10) Patent No.: US 10,152,116 B2
(45) Date of Patent: Dec. 11, 2018

(54) SYSTEMS AND DEVICES FOR RECORDING AND REPRODUCING SENSES

(75) Inventors: Deli Wang, San Diego, CA (US); Siarhei Vishniakou, La Jolla, CA (US); Brian Wellington Lewis, San Diego, CA (US); Truong Nguyen, San Diego, CA (US); Young Ouk Kim, Gyunggi-do (KR); Wonha Kim, La Jolla, CA (US)

(73) Assignee: The Regents of the University of California, Oakland, CA (US)

(*) Notice: Subject to any disclaimer, the term of this patent is extended or adjusted under 35 U.S.C. 154(b) by 1133 days.

(21) Appl. No.: 14/113,513

(22) PCT Filed: Apr. 26, 2012

(86) PCT No.: PCT/US2012/035305
§ 371 (c)(1),
(2), (4) Date: Apr. 29, 2014

(87) PCT Pub. No.: WO2012/149225
PCT Pub. Date: Nov. 1, 2012

(65) Prior Publication Data
US 2015/0220199 A1    Aug. 6, 2015

Related U.S. Application Data

(60) Provisional application No. 61/479,338, filed on Apr. 26, 2011.

(51) Int. Cl.
G06F 3/01    (2006.01)
G06F 3/041    (2006.01)
G06F 3/16    (2006.01)

(52) U.S. Cl.
CPC .............. G06F 3/011 (2013.01); G06F 3/014 (2013.01); G06F 3/016 (2013.01); G06F 3/041 (2013.01);
(Continued)

(58) Field of Classification Search
CPC ........ G06F 3/0416; G06F 3/016; G06F 3/011; G06F 3/015
See application file for complete search history.

(56) References Cited

U.S. PATENT DOCUMENTS 4,414,984 A    11/1983    Zarudiansky et al.
8,161,137 B2 *    4/2012    Basso .................. G06F 15/16
709/220
(Continued)

FOREIGN PATENT DOCUMENTS

GB    2445363 A  *  7/2008    ............. G06F 3/014
JP    2009-64964    11/2009

OTHER PUBLICATIONS

Brochu, Paul et al., "Advances in Dielectric Elastomers for Actuators and Artificial Muscles", Macromol. Rapid Commun.,2010, 31, pp. 10-36.
(Continued)

Primary Examiner — Patrick F Marinelli
(74) Attorney, Agent, or Firm — Greer, Burns & Crain, Ltd.; Steven P. Fallon

(57) ABSTRACT

Systems and devices for recording and reproducing senses. One or more of touch sensations and smell sensations are received to produce at least one of touch input signals and smell input signals. The input signals are stored and processed, and at least one output signal can be produced. One or more of a touch output and a smell output can be generated. The touch input, the smell input, or both can be integrated with one or more of sight input and sound input.

10 Claims, 64 Drawing Sheets
(50 of 64 Drawing Sheet(s) Filed in Color)

(52) U.S. Cl.
CPC .............. *G06F 3/0416* (2013.01); *G06F 3/16* (2013.01); *G06F 2203/0381* (2013.01)

(56) References Cited

U.S. PATENT DOCUMENTS

| | | | | |
|---|---|---|---|---|
| 9,112,058 | B2* | 8/2015 | Bao | H01L 29/84 |
| 9,566,506 | B2* | 2/2017 | Han | A63F 13/10 |
| 2002/0167003 | A1* | 11/2002 | Campbell | B82Y 10/00 |
| | | | | 257/20 |
| 2006/0254369 | A1* | 11/2006 | Yoon | A61B 5/6804 |
| | | | | 73/862.041 |
| 2007/0109274 | A1* | 5/2007 | Reynolds | G06F 3/041 |
| | | | | 345/173 |
| 2009/0125641 | A1* | 5/2009 | Garbow | G06F 3/011 |
| | | | | 710/5 |
| 2009/0128306 | A1 | 5/2009 | Luden et al. | |
| 2009/0146948 | A1* | 6/2009 | Lee | G06F 3/016 |
| | | | | 345/156 |
| 2009/0174687 | A1* | 7/2009 | Ciesla | G06F 3/04886 |
| | | | | 345/174 |
| 2010/0131206 | A1* | 5/2010 | Angell | G06Q 30/02 |
| | | | | 702/23 |
| 2010/0185891 | A1* | 7/2010 | Basso | G06F 15/16 |
| | | | | 714/2 |
| 2010/0214257 | A1* | 8/2010 | Wussler | G06F 3/0362 |
| | | | | 345/174 |
| 2010/0270388 | A1* | 10/2010 | Liu | G06F 3/011 |
| | | | | 239/1 |
| 2010/0272421 | A1* | 10/2010 | Liu | A61L 9/03 |
| | | | | 392/403 |
| 2011/0316798 | A1* | 12/2011 | Jackson | G06F 3/016 |
| | | | | 345/173 |
| 2012/0028820 | A1* | 2/2012 | Rhodes | B82Y 15/00 |
| | | | | 506/9 |
| 2012/0068271 | A1* | 3/2012 | Tokunaga | H01L 29/66757 |
| | | | | 257/369 |
| 2012/0188237 | A1* | 7/2012 | Han | A63F 13/10 |
| | | | | 345/419 |
| 2012/0235935 | A1* | 9/2012 | Ciesla | G06F 3/0202 |
| | | | | 345/173 |
| 2013/0241860 | A1* | 9/2013 | Ciesla | G06F 3/0202 |
| | | | | 345/173 |
| 2015/0123776 | A1* | 5/2015 | Lee | G06F 3/016 |
| | | | | 340/407.2 |
| 2015/0220199 | A1* | 8/2015 | Wang | G06F 3/16 |
| | | | | 345/173 |
| 2017/0136301 | A1* | 5/2017 | Cameron | A24F 47/008 |
| 2017/0185364 | A1* | 6/2017 | Cameron | G06F 3/1446 |

OTHER PUBLICATIONS

Ha, Soon M., et al., Interpenetrating Polymer Networks for High-Performance Electroelastomer Artificial Muscles:, *Adv. Mater.*, 2006, 18, pp. 887-891.

Mannsfeld, Stefan C., et al., "Highly Sensitive flexible pressure sensors with microstructured rubber dielectric layers", *Nature Materials*, vol. 9, Oct. 2010, pp. 859-864.

Takei, Kuniharu et al., "Nanowire active-matrix circuitry for low-voltage macroscale artificial skin", *Nature Materials*, vol. 9, Oct. 2010, pp. 821-826.

OpenHaptics, Developer Edition, "Add 3D Touch Navigation and Haptics to Your Applications", 3D Systems, date unknown, downloaded Aug. 28, 2017.

Kirk Nichols et al., "Teleoperation and Haptics for Surgery: Automatic Tissue Palpation and Discrimination", Charm Lab: Collaborative Haptics and Robotics in Medicine, date unknown, downloaded Aug. 28, 2017.

3D Systems, "Sense: Take your world from physical to digital with 3D scanning", date unknown, downloaded Aug. 28, 2017.

Iwamoto et al., "Non-contact Method for Producing Tactile Sensation Using Airborne Ultrasound", EuroHaptics 2008, LNCS 5024, pp. 504-513, M. Ferre Ed., (2008).

Richard M. Satava, "Medical Applications of Virtual Reality", Journal of Medical Systems, vol. 19, No. 3, 1995.

Russ Zajtchuk et al., "Medical Applications of Virtual Reality: How virtual reality is helping improve patient care in the form of advanced educational tools and therapeutic options", Communications of the ACM, vol. 40, No. 9, Sep. 1997.

\* cited by examiner

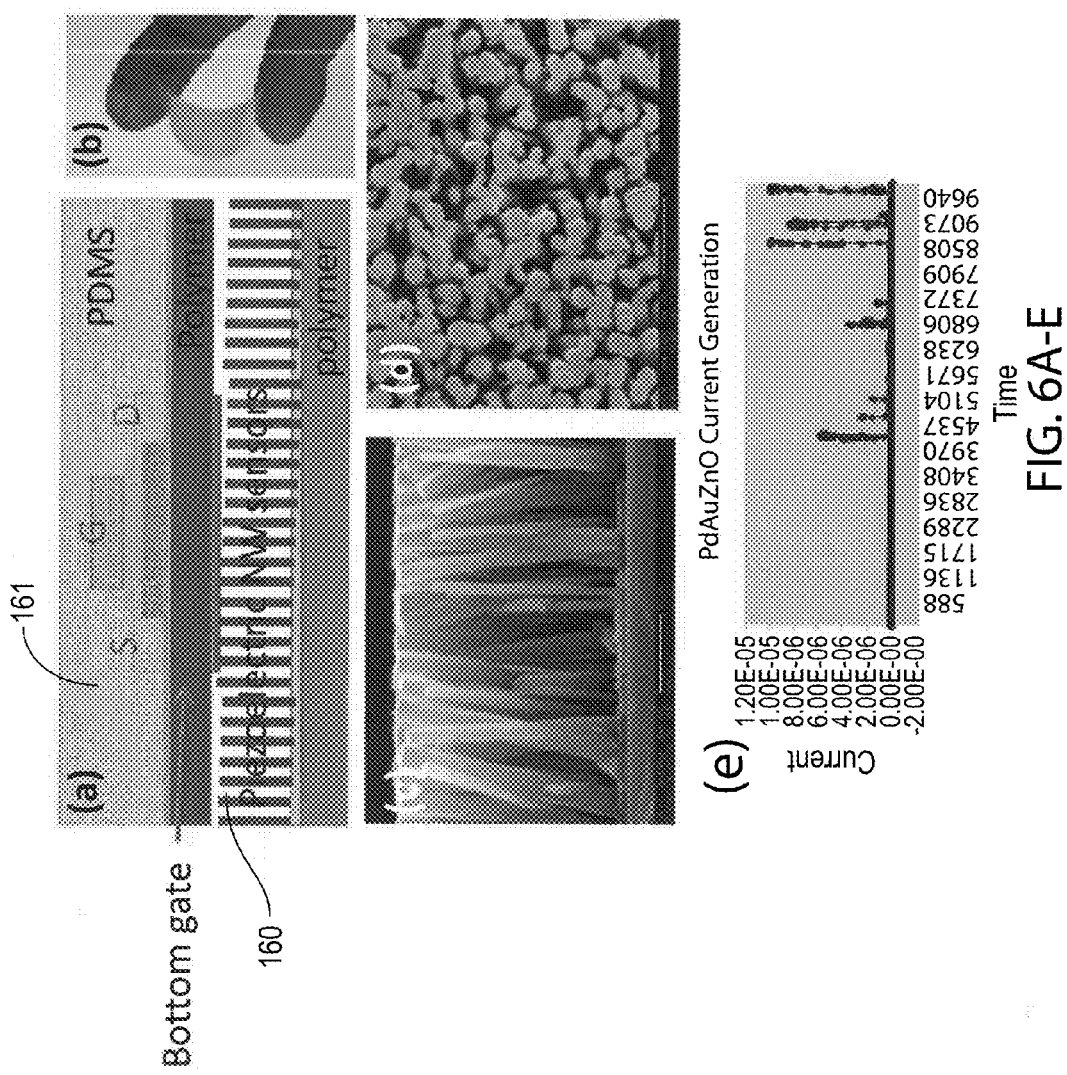
FIG. 6A-E

FIG. 8D

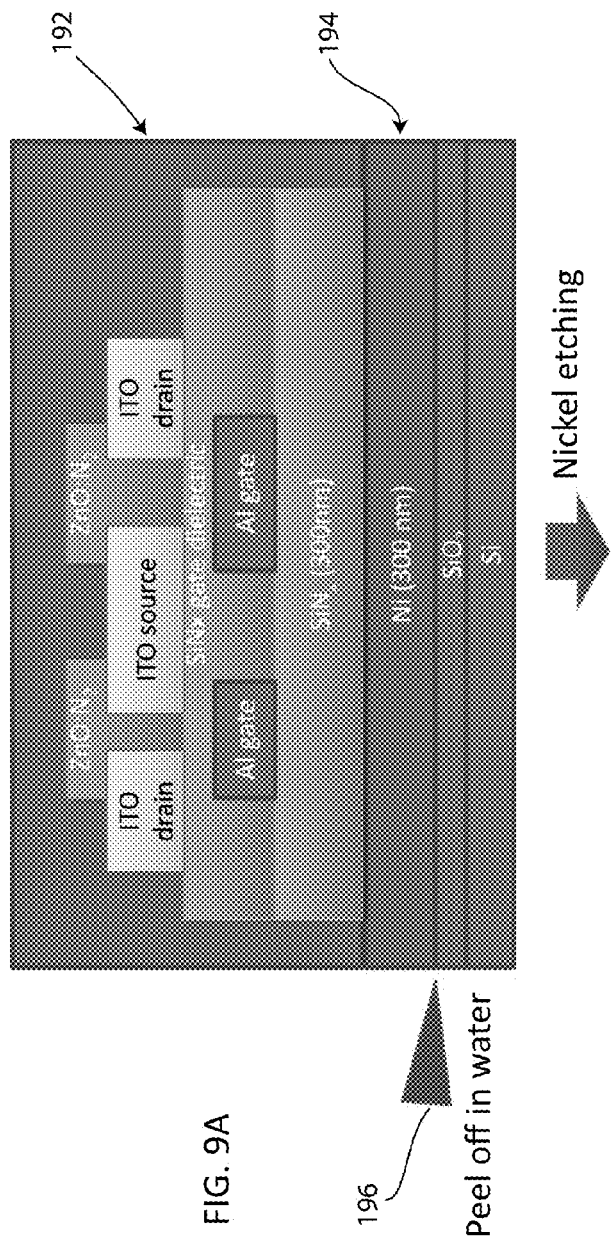
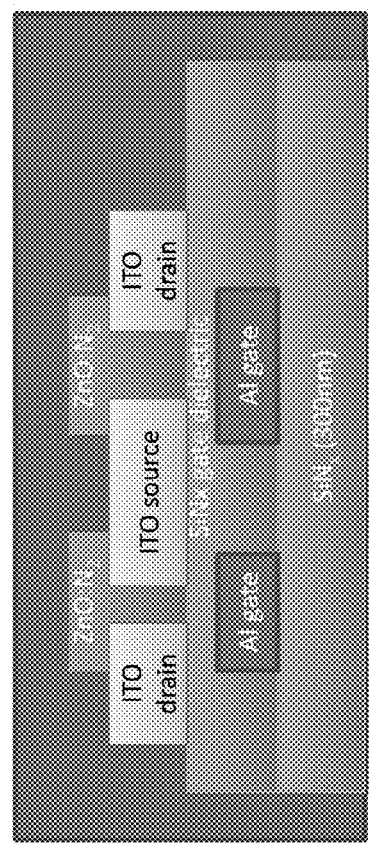
FIG. 9A
FIG. 9B $S_Z = \varepsilon_r \varepsilon_0 E^2 / Y$

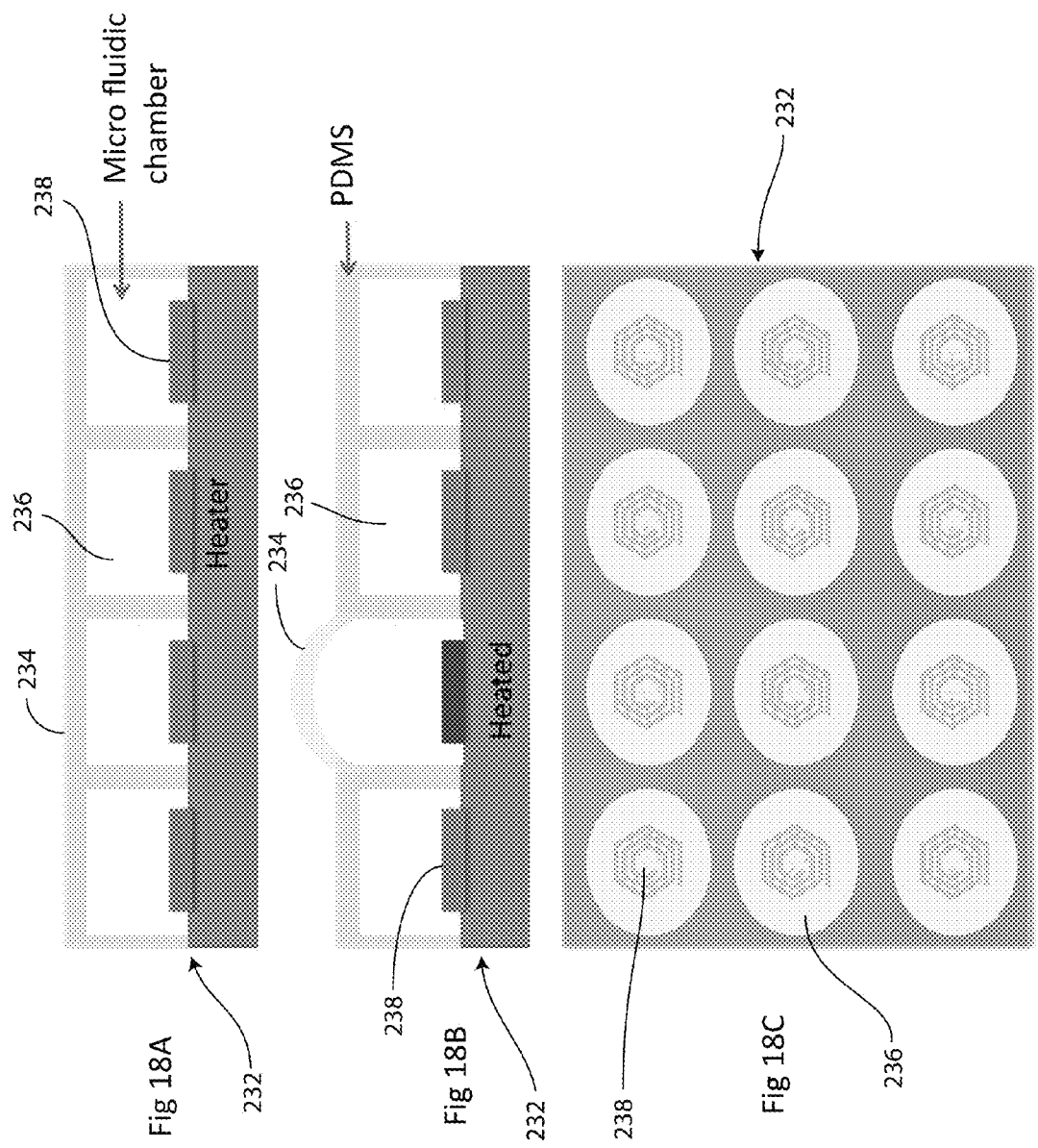

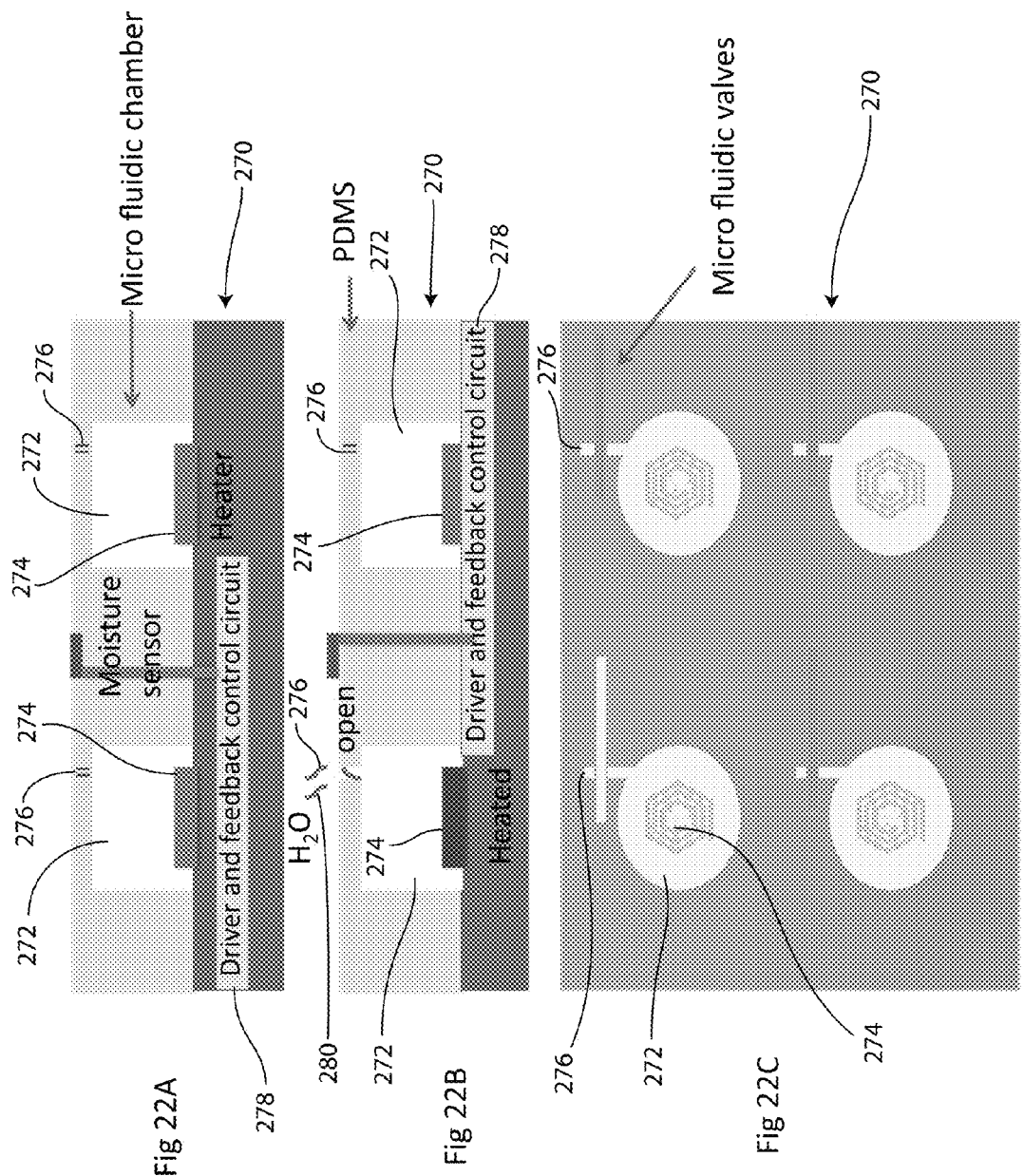

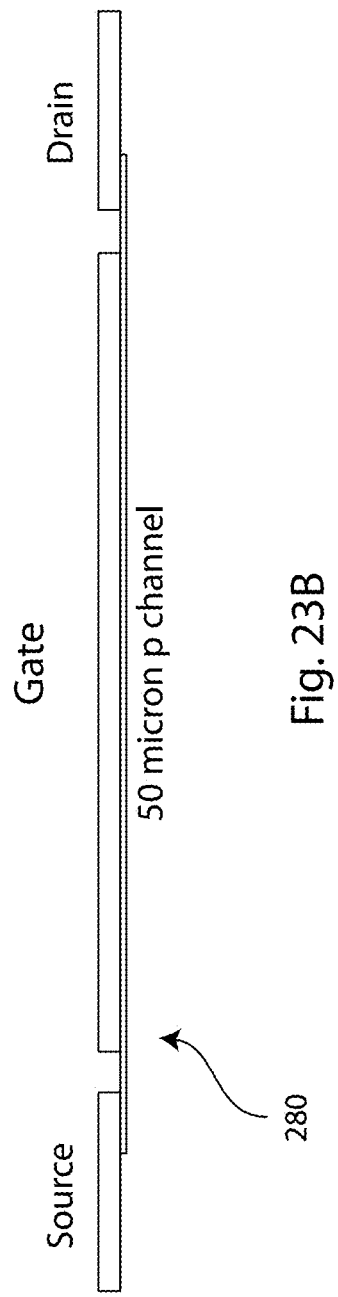

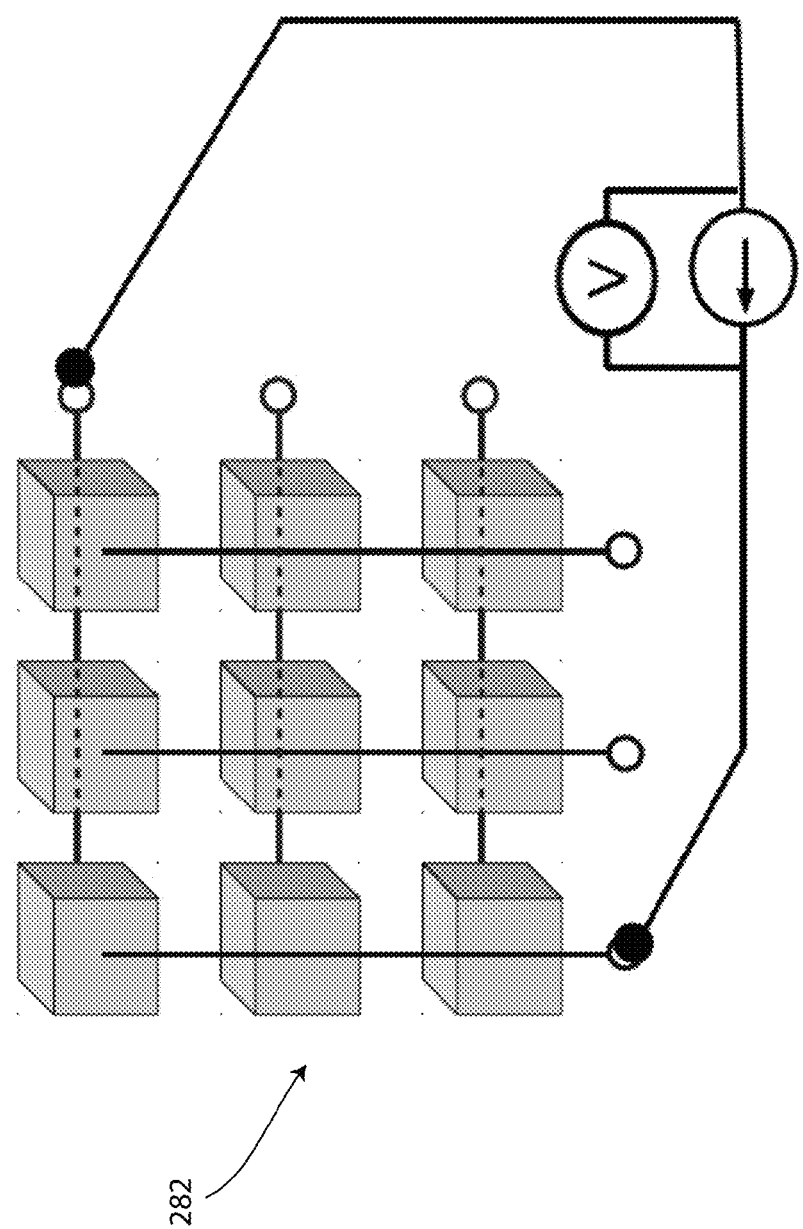

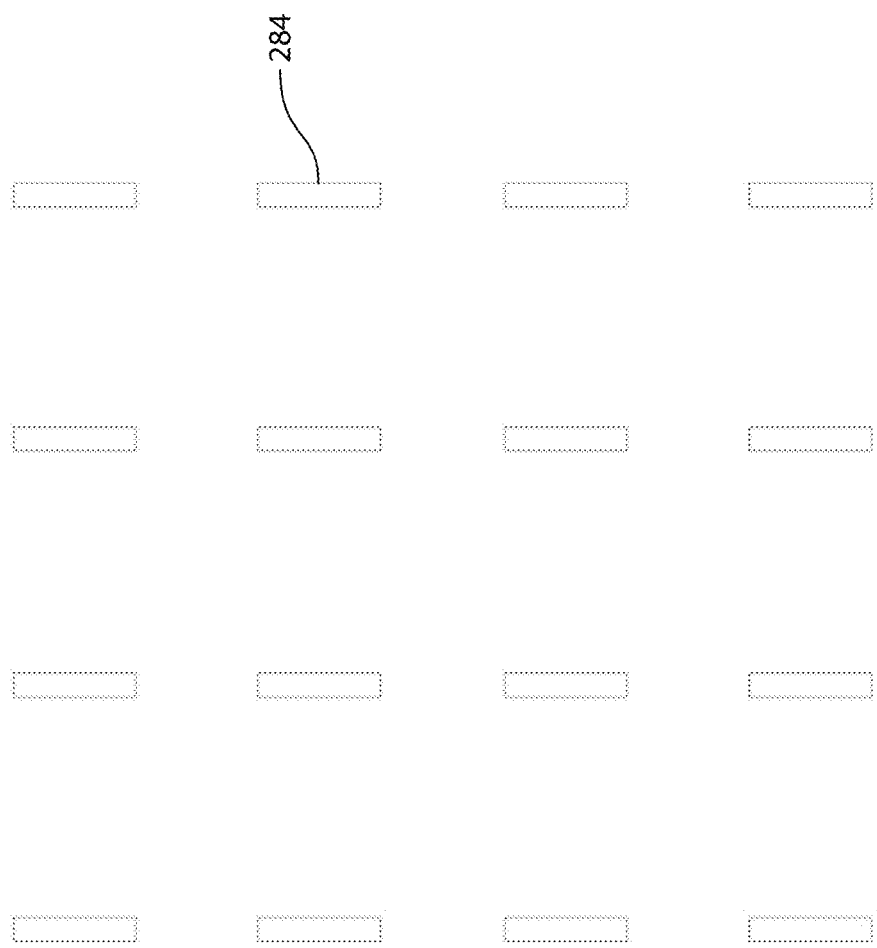

FIG. 27A-D

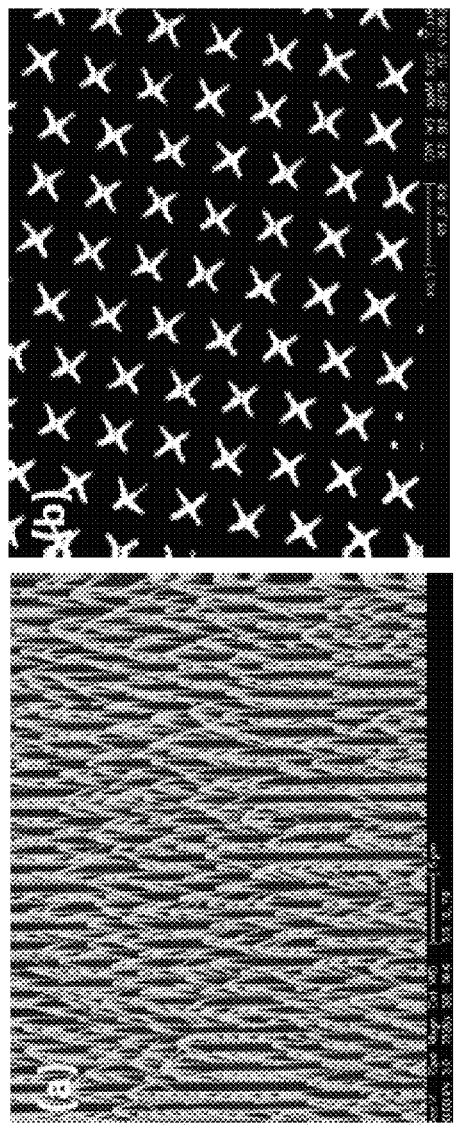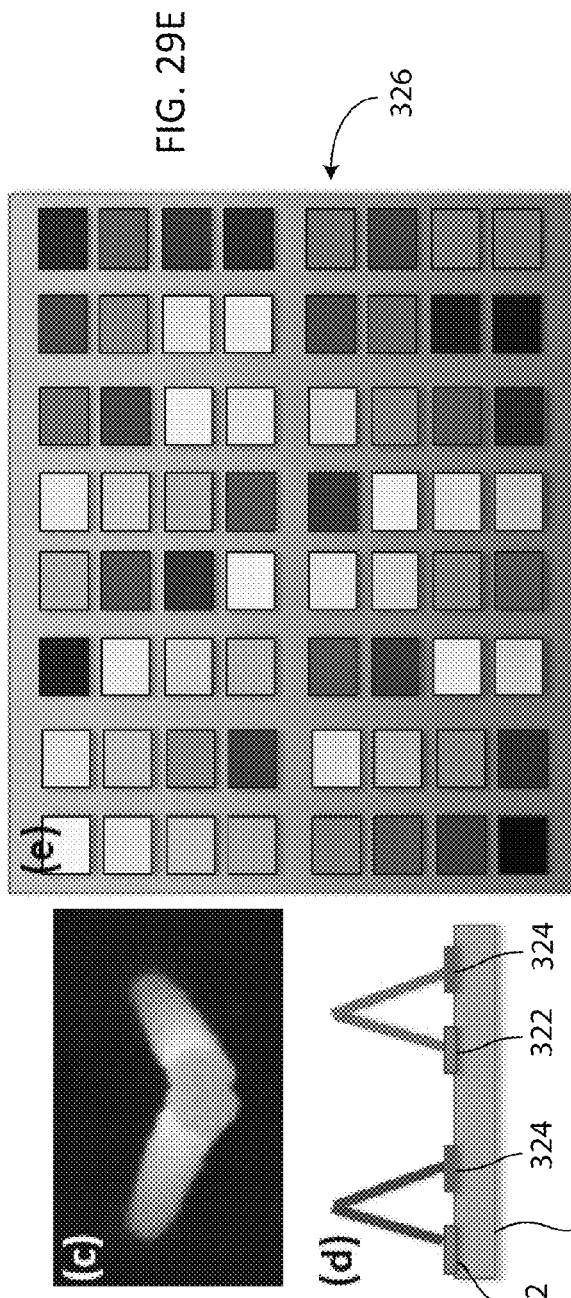
FIG. 29A
FIG. 29B
FIG. 29C
FIG. 29D
FIG. 29E

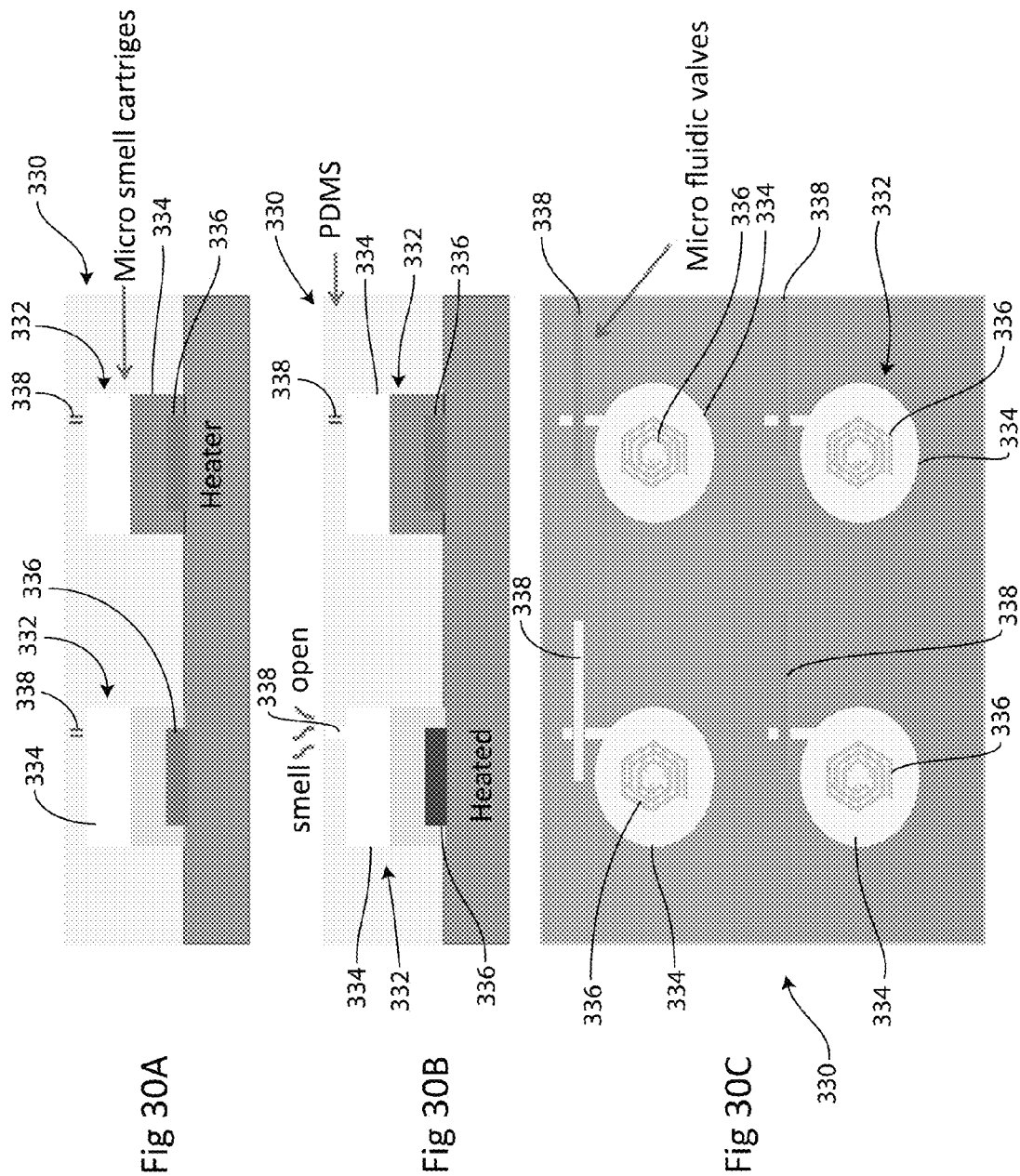

SYSTEMS AND DEVICES FOR RECORDING AND REPRODUCING SENSES

PRIORITY CLAIM

This application claims priority of U.S. Provisional Application Ser. No. 61/479,338, filed Apr. 26, 2011.

TECHNICAL FIELD

A field of the invention is data representation and communication.

BACKGROUND

Video is widely recorded, disseminated, and consumed in many applications such as, but not limited to, entertainment, teaching, and simulation. Video occurs mostly in two-dimensional (2-D) forms, but also exists in 3-D forms, and is presented on devices ranging from movie screens to small handheld devices (e.g., tablets, small laptop computers, phones, handheld game consoles, etc.). Mostly, only sight and sound play a role in video.

Haptic (touch) interfaces can be used on devices to enhance the user experience through vibration. For example, a mobile phone might vibrate differently depending on the signal source. Joysticks or other controllers in games vibrate depending on the current situation within the games. Haptic feedback created by an ultrasound phenomenon known as acoustic radiation pressure can be used to create a pressure sensation on a user's hand to recreate feel. Other systems use physical haptic feedback devices such as balls, sticks, or styluses to create haptic sense, for example in 3-D modeling.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 6A-6E show an example capacitive force or pressure sensor based on vertical piezoelectric nanowires, where FIG. 6A shows an example fabrication of PDMS microstructures, FIG. 6B shows an example optical image of a flexible sensor, FIG. 6C shows a cross-section SEM image of vertical ZnO nanowires, FIG. 6D shows a top-view SEM image of vertical ZnO nanowires, and FIG. 6E shows an example current response of the sensor to pressure;

FIGS. 8A-8F show an example ZnO pressure sensor according to an example embodiment, where FIG. 8A shows a structure of an example ZnO pressure and force sensor, in which the piezoelectric ZnO thin film serves as both TFT channel (for array reader) and pressure sensor, FIGS. 8B and 8C shows the SEM and optical micrograph of a ZnO pressure and force sensor, respectively, FIG. 8D shows an example transparent ZnO device, and FIGS. 8E-8F show the performance of an example ZnO TFT device;

FIGS. 9A-9B show a flexible ZnO sensor array embedded in transparent flexible PDMS according to an example embodiment, where FIG. 9A shows the peel-off from handling substrate and FIG. 9B shows the structure of an example flexible ZnO:N TFT after etching of Nickel metal layer;

FIG. 11A shows the current changes with weights, FIG. 11B shows the current changes with weights, FIG. 11C shows the current changes vs. pressure, and FIG. 11D shows measurement noise level;

FIG. 13A shows an example measure scheme, and FIG. 13B shows the layout of an example 8×8 ZnO sensor array readout circuit on a PCB board;

FIGS. 14A-14B show the surface plot and 2D plot of pressure measurement of a single pixel (dot) of the sensor array, FIG. 14C shows the surface plot and 2D plot of pressure measurement of 2 pixels (dots) of the sensor array, and FIG. 14D shows the 2D plot, 2D plot of local maximum value, and surface plot of pressure measurement of 2 pixels (dots) of the sensor array;

FIGS. 17A-17I show arrays of touch output transducers (Qibing Pei, UCLA), where FIGS. 17A-17H show various patterns of actuated transducers in the arrays representative of Braille, and FIG. 17I shows an enclosed actuator array;

FIGS. 18A-18C show example embodiment micro liquid-vapor actuator arrays in which the vertical diaphragm actuation is based on the volume expansion from liquid vaporization upon heating, where FIG. 18A shows the structure the micro fluidic chambers associated to addressable micro heater arrays (non-actuated state), FIG. 18B shows vertical actuation upon heating (actuated state), and FIG. 18C shows the top view of the micro actuator arrays;

FIG. 20A shows an example scheme of pressure sensor array, data transmission and processing by computer, and actuation of corresponding pixels of actuator arrays, and FIG. 20B shows an example pressure sensing by an 8×8 ZnO sensor array (two pixels—

Figure 21:
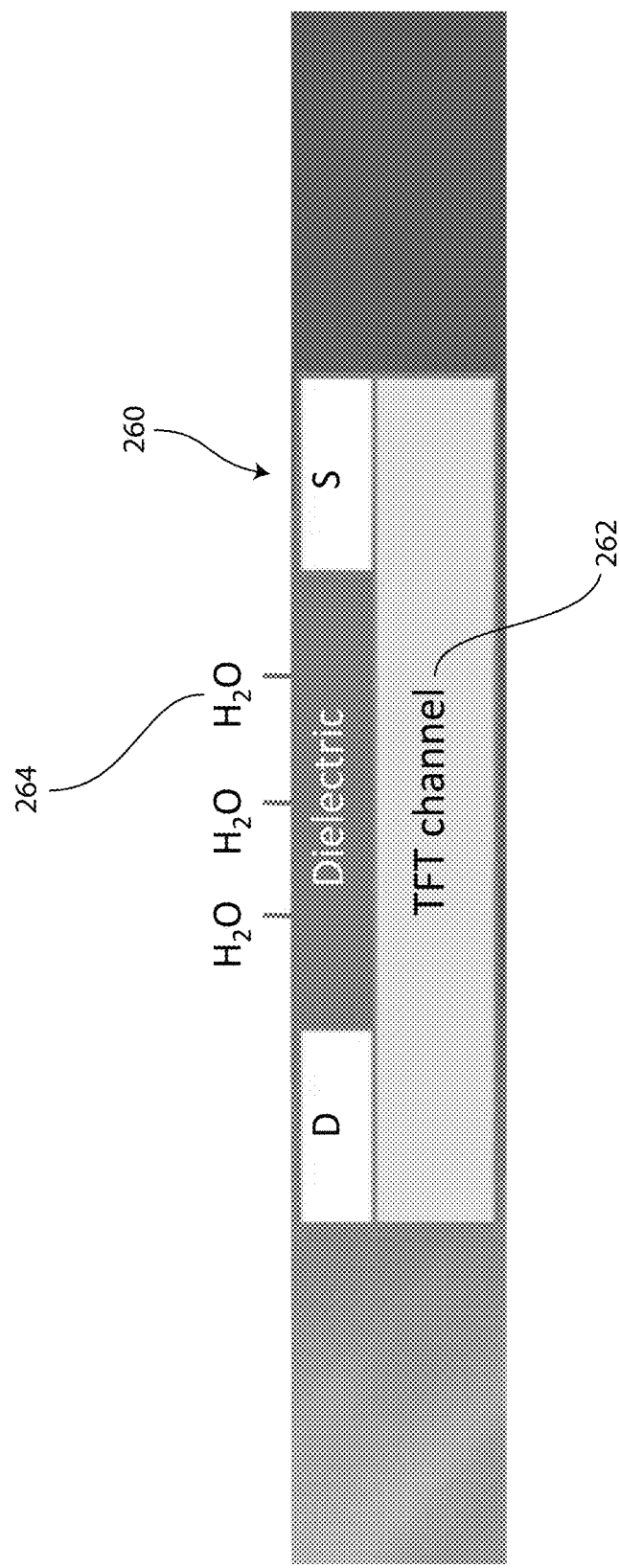
Figure 23A:
Figure 23C:
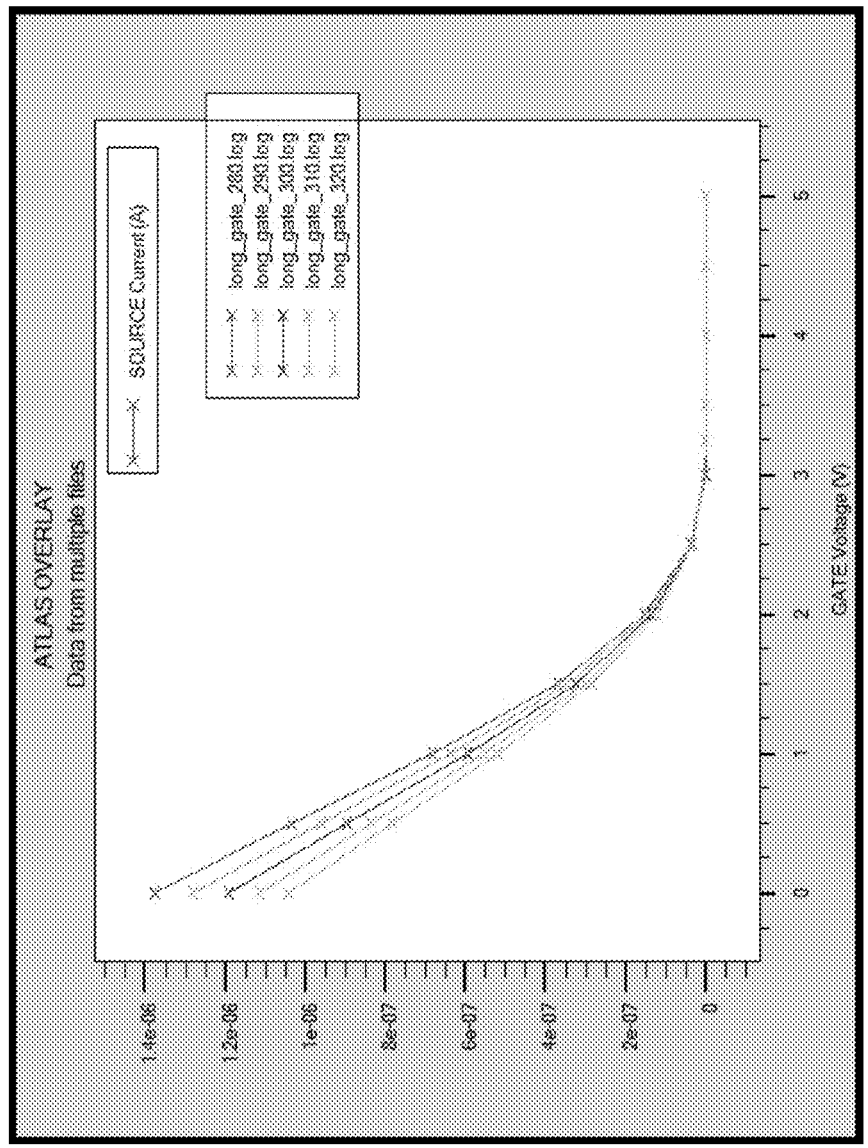
Figure 23D:
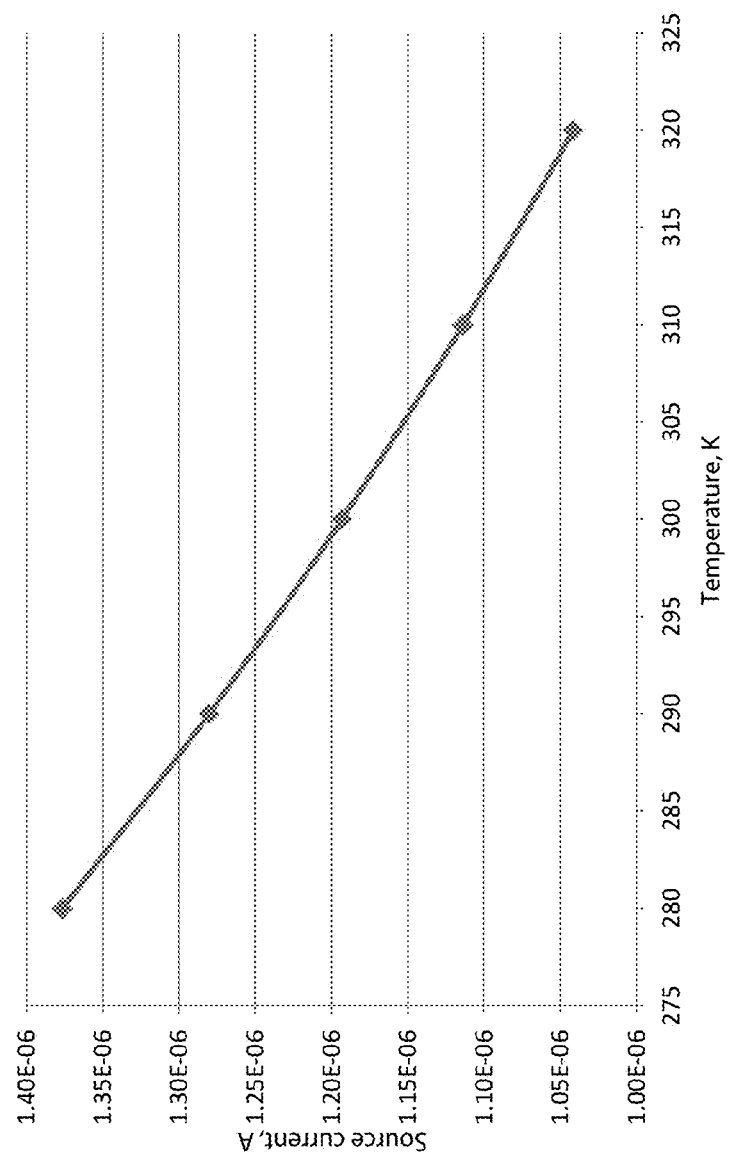
Figure 23E:
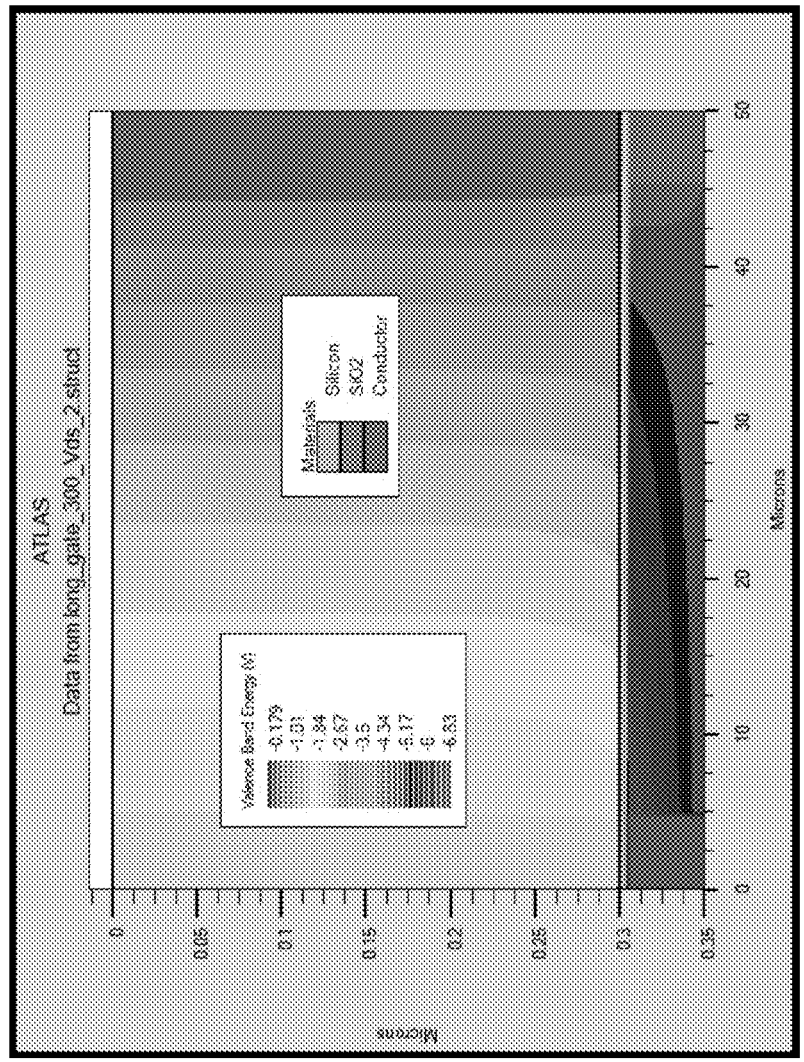
Figure 23F:
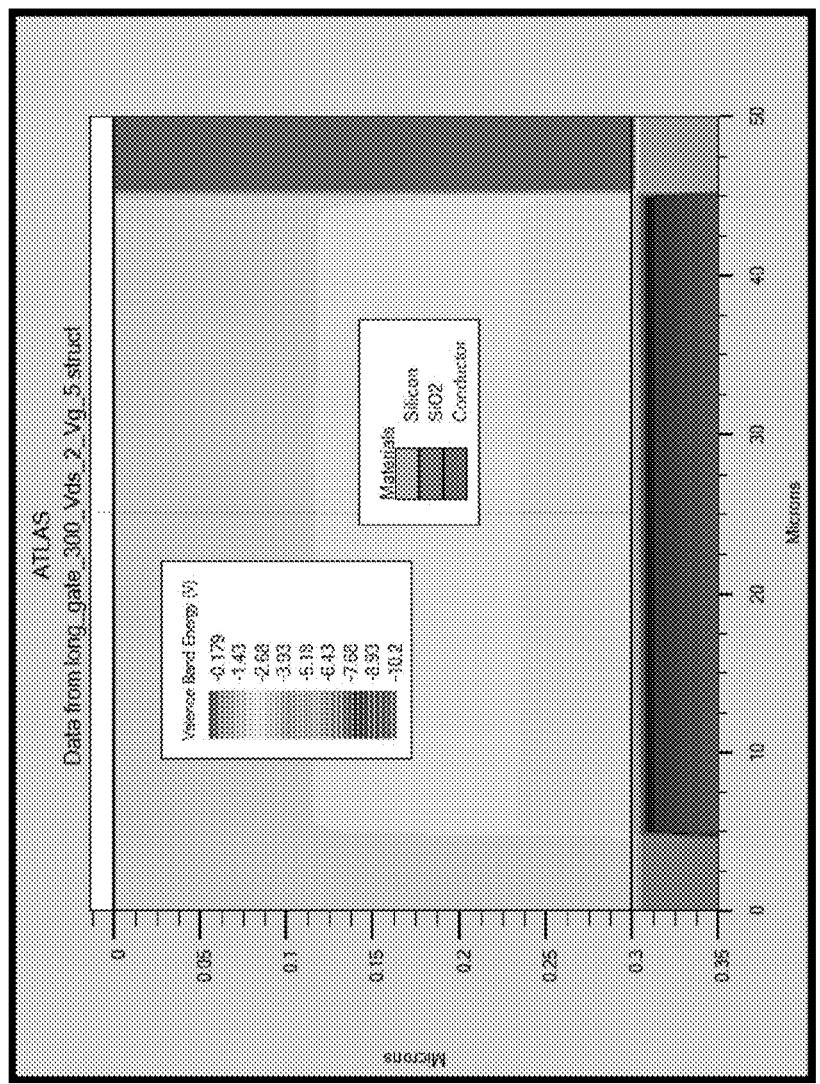
Figure 23G:
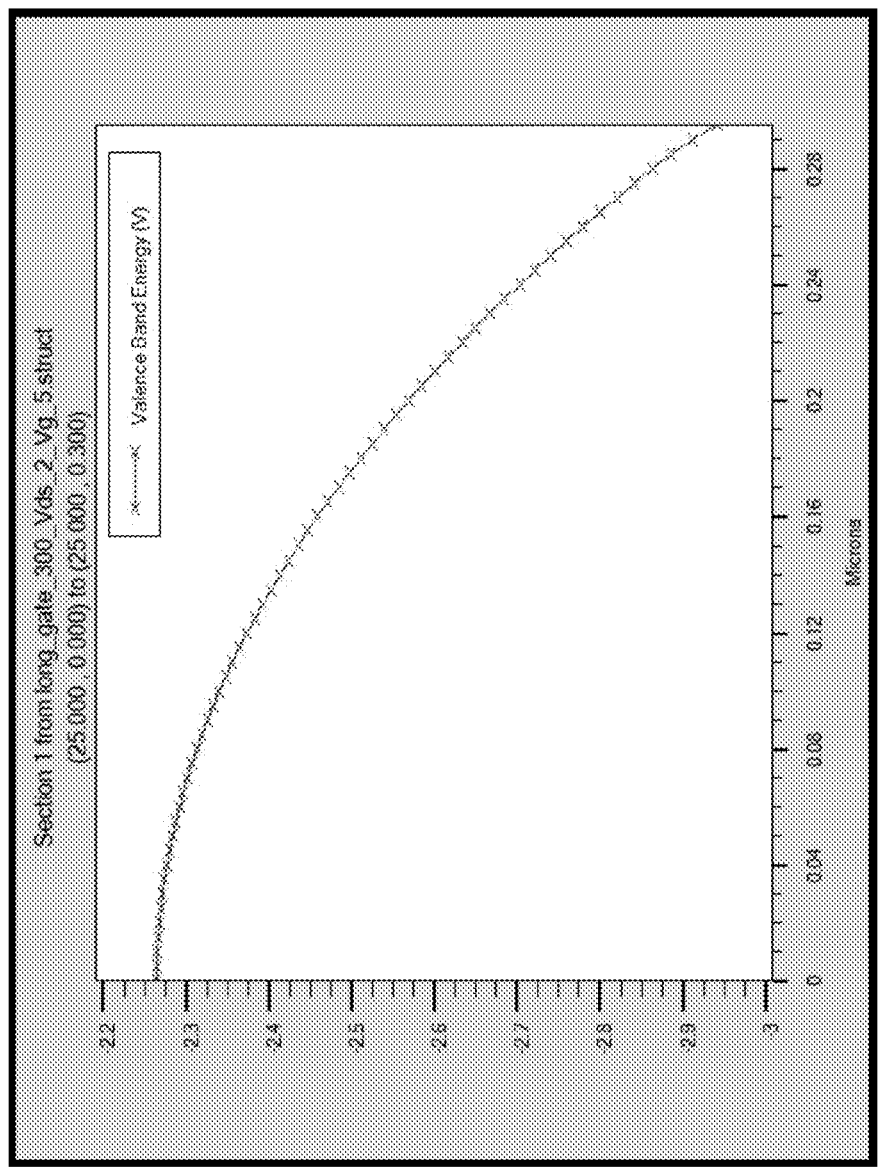
Figure 24C:
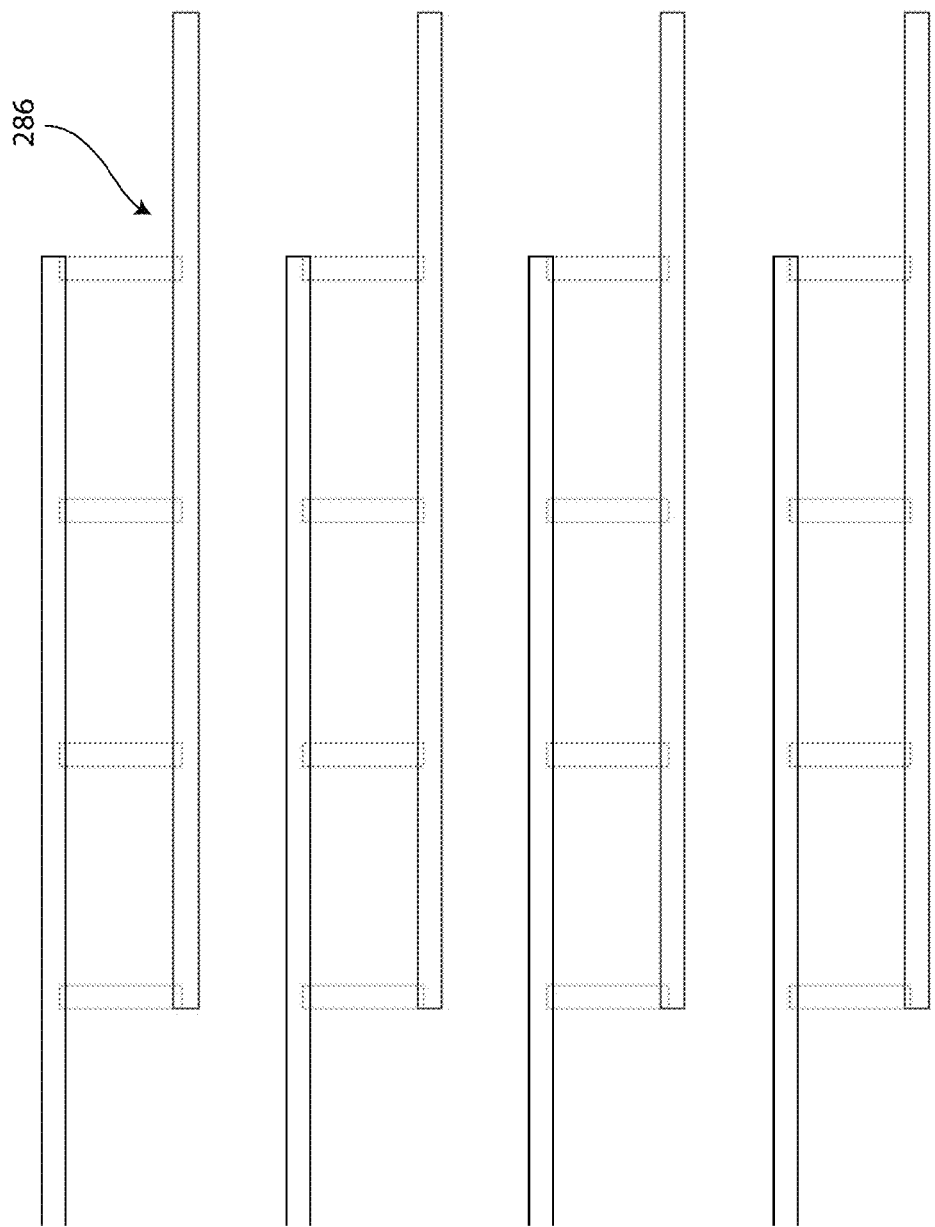
Figure 24D:
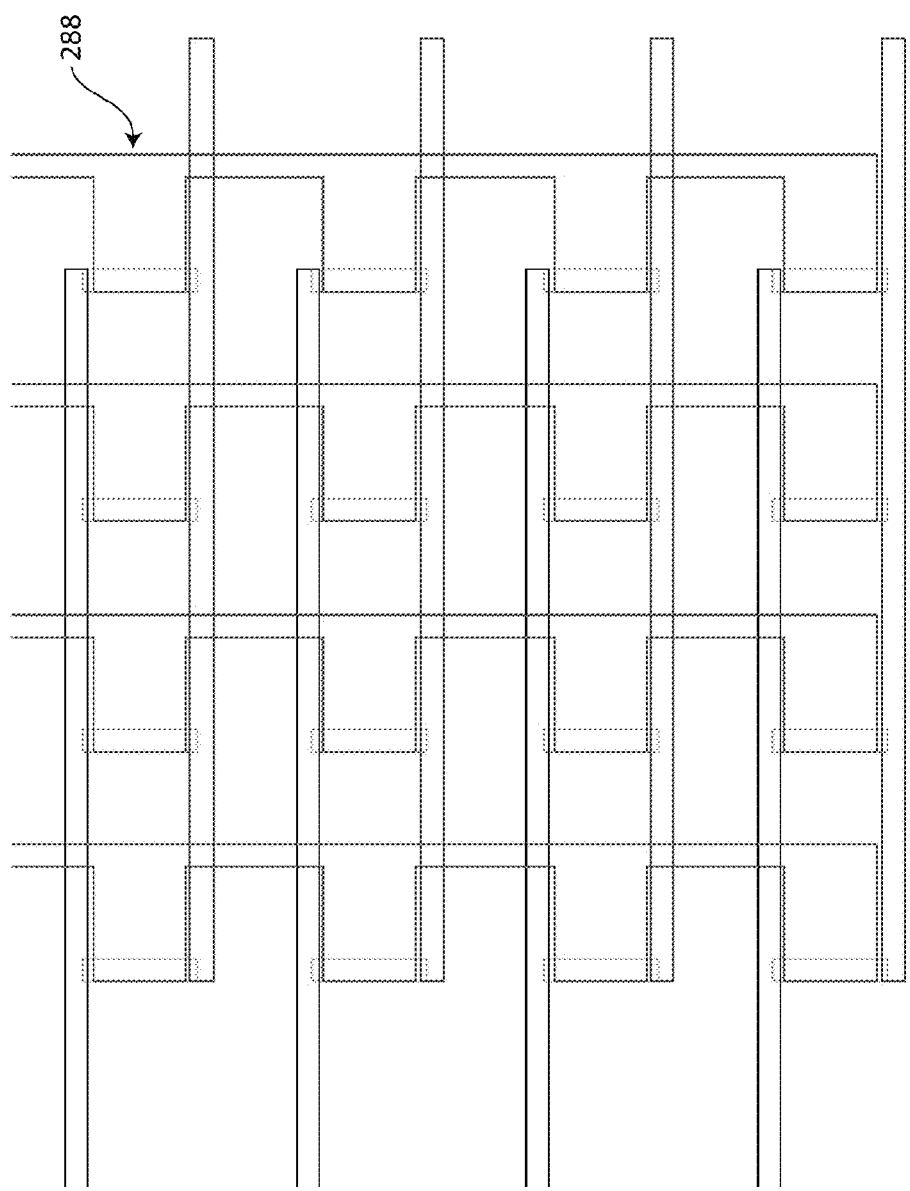
Figure 24E:
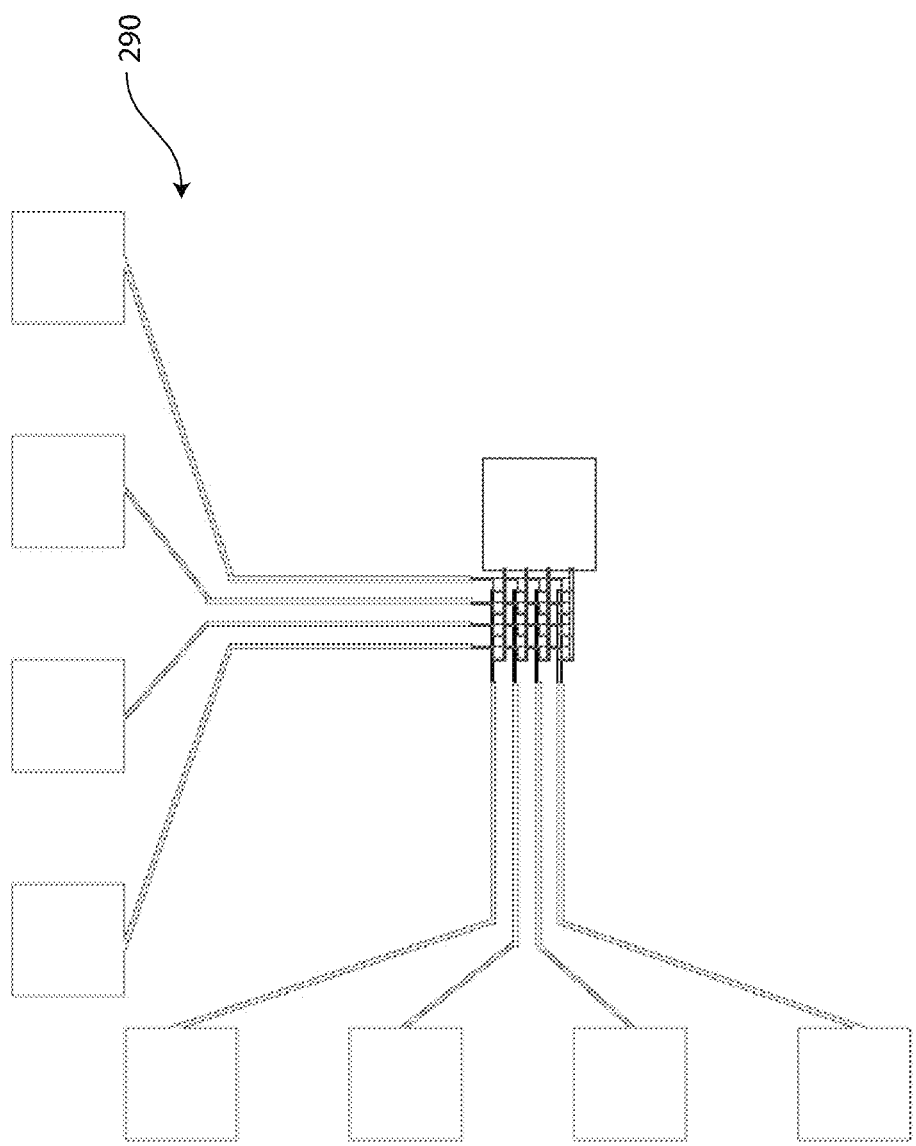
Figure 24F:
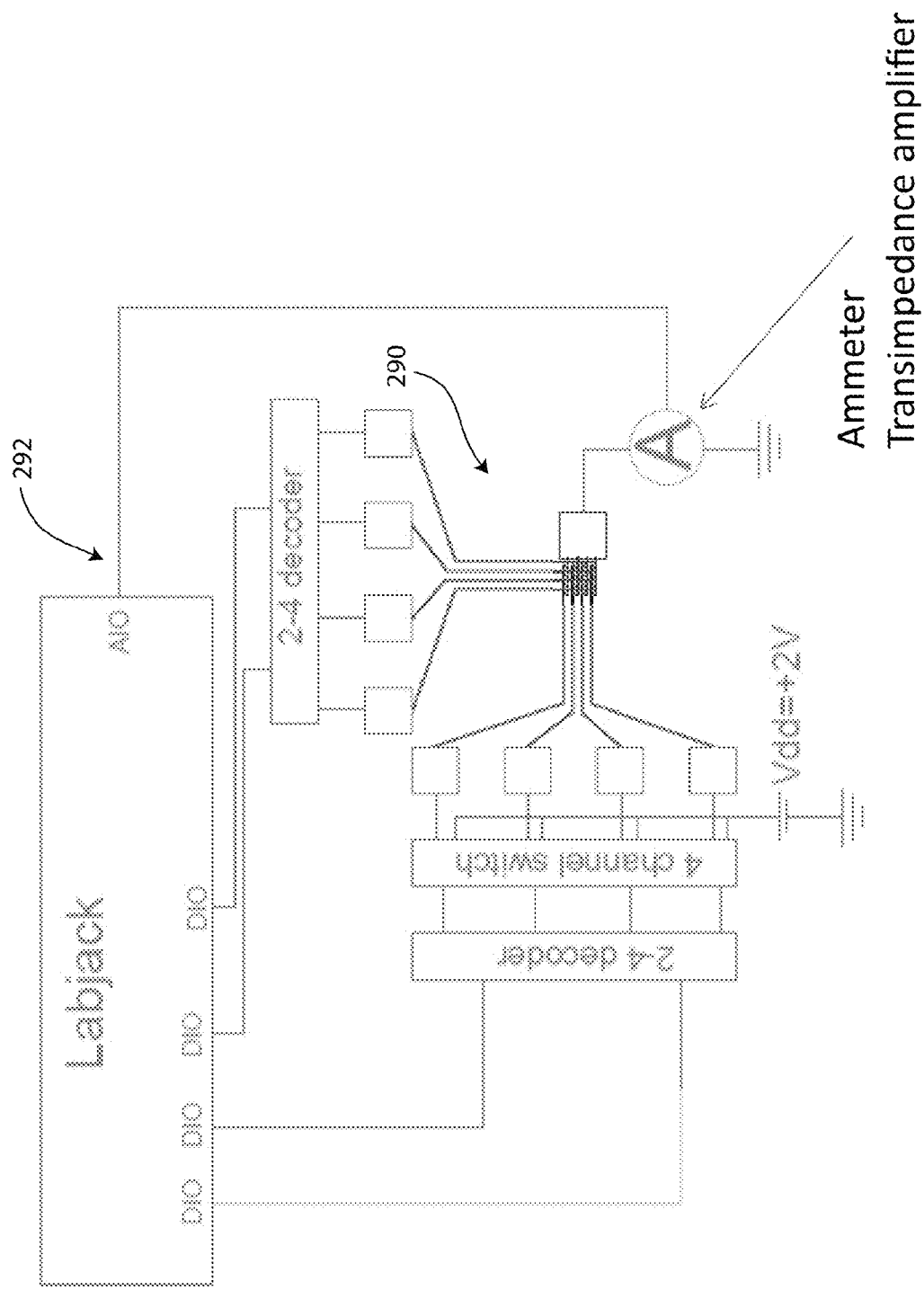
Figure 25:
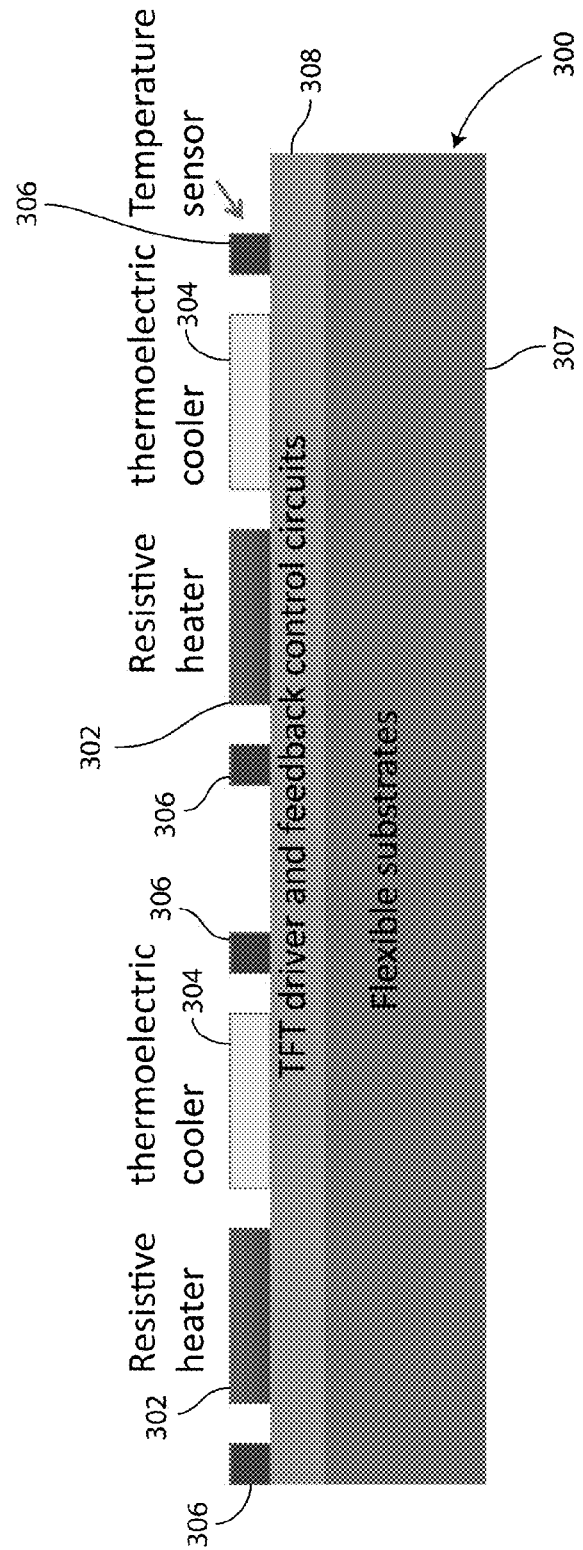
Figure 26:
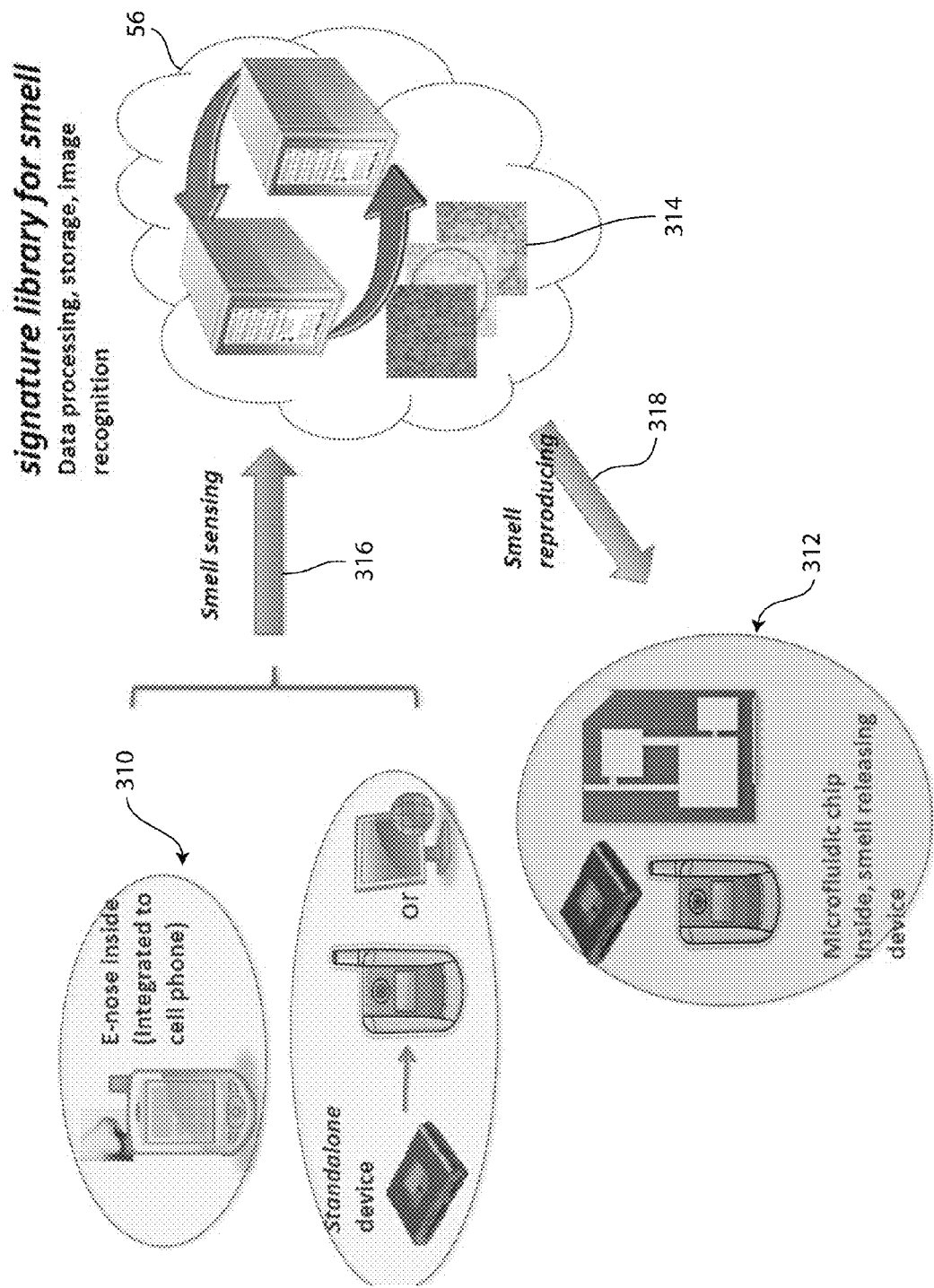
Figure 27:
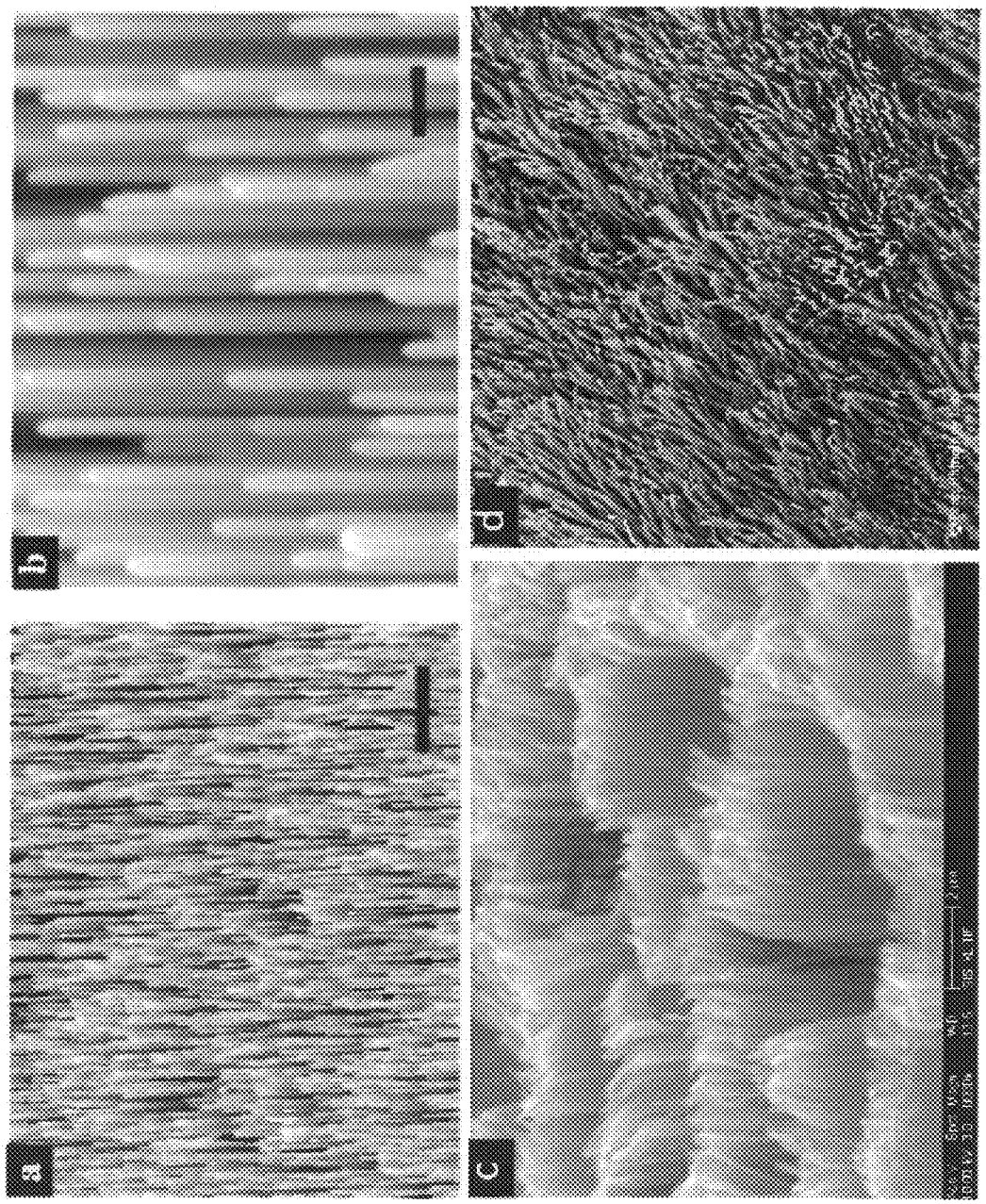
Figure 28:
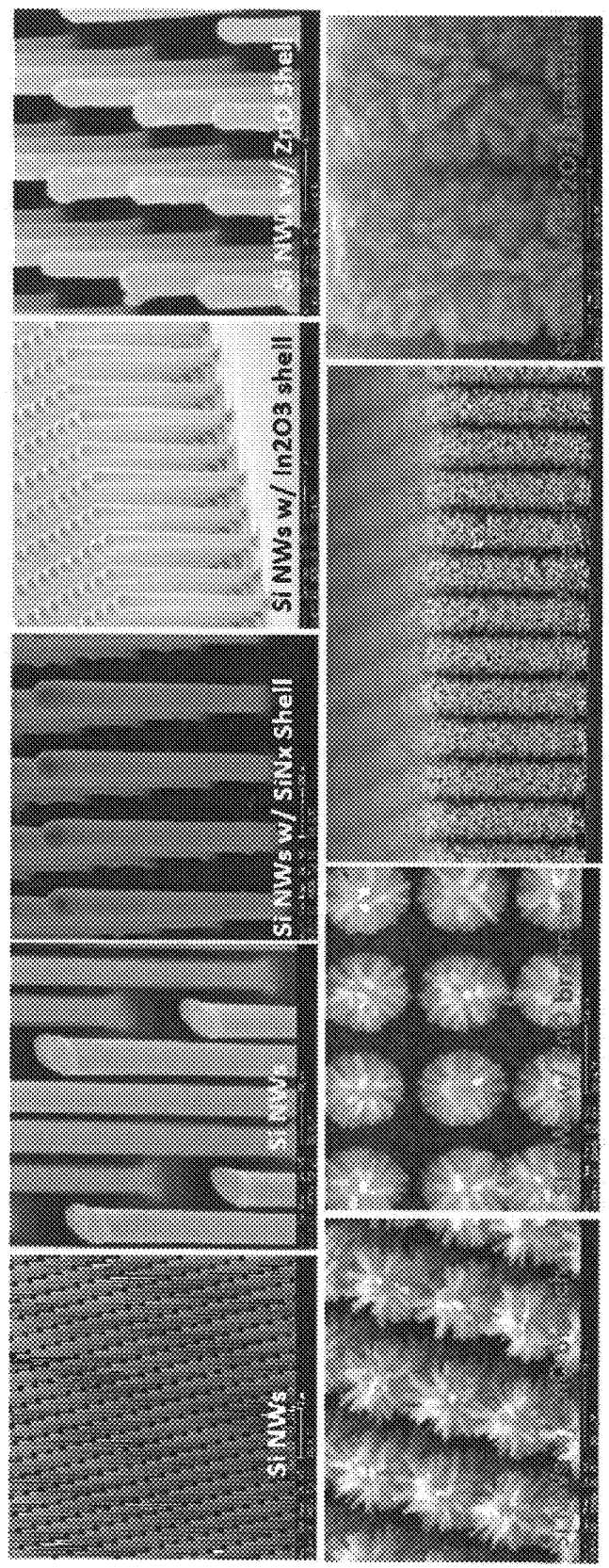

(3,6) and (6,7)), data transmission and processing by computer, and actuation of corresponding pixels in an 8×8 electroelastic polymer PIN actuator array;

FIG. 21 shows an example embodiment micro moisture sensor pixel;

FIGS. 22A-22C show an example embodiment moisture or water vapor micro chamber array, where FIG. 18A shows a structure including micro fluidic chambers associated to addressable micro heater arrays (cold state), FIG. 18B shows releasing of water vapor upon heating and simultaneous opening of an control microfluidic valve (heated state), and FIG. 18C shows the top view of the micro fluidic chamber arrays;

FIG. 23A shows a summary of micro temperature sensor technologies, including Si and Ge thermistors, resistance temperature detectors (RTDs), thermocouples, acoustic and optical, in comparison to the human skin of the resolution or detection sensitivity;

FIGS. 23B-23G show an example embodiment Si micro temperature sensor pixel, where FIG. 23B shows the design of a Si MOSFET temperature sensor, FIG. 23C shows simulation results of Id vs Vg at different temperatures, FIG. 23D shows current vs. temperature at zero gate bias, indicating the minimum detectable current change of 0.725 nA for 0.01 K sensing resolution, and FIGS. 23E-23G are simulation results of the band structure of the example p-Si sensor;

FIGS. 24A-24F show an example embodiment design Si micro temperature sensor array, where FIG. 24A shows the connection to a 3×3 Si MOSFET temperature sensor array, FIG. 24B-24D shows an example design of a 4×4 Si MOSFET temperature sensor channel, source and drain contacts, gate alignment, respectively, and FIG. 24E-24F show connection to an example readout circuit;

FIG. 25 shows an example embodiment temperature output method based on micro resistive heater and thermoelectric cooler arrays, with integrated temperature sensors and TFT driver and feedback control circuits, in which temperature and heat dissipation are controllable to reproduce the touch feeling, and in which the example system is disposed on flexible substrates;

FIG. 26 shows an example embodiment input and output method using smell input and output transducers, in which the electronic nose (e-nose) detects smell, the computer performs signal processing, image recognition to the signature of certain smell in the library, and sends signal to the output devices—the microfluidic arrays that release certain smell from the smell "cartridge" (integrated or stand alone devices);

FIGS. 27A-27C show scanning electron micrograph (SEM) images of vertical ZnO nanowire arrays by a chemical vapor deposition (CVD) growth (FIGS. 27A-27B) and vertical Si nanowires by a simple solution etching process (FIG. 27C);

FIG. 27D shows a cilia array in the lungs;

FIG. 28 shows SEM images of a large array of periodic Si nanowires (labeled NWs) with various surface shell (sheath) coatings;

FIG. 29A-29E show an example embodiment electronic nose based on vertical nanowire bridge sensor array, where FIGS. 29A-29C show bridges formed by dry etched vertical Si nanowires, including bundling up at the tips of vertical nanowires in very large area (FIG. 29A), a top view zoomed-in image indicating a periodical bundle-up of four nanowires at the tips (FIG. 29B), and two nanowires that "kiss" or pair up at the tips (FIG. 29C);

FIG. 29D shows example sensors with a nanowire bridge, with one wire disposed on a cathode pad (orange) and the other disposed on an anode pad (blue); and FIG. 29E shows an example 8×8 sensor array with color schemes indicating different surface treatments; and FIGS. 30A-30C show an example embodiment microfluidic chamber array, where FIG. 30A shows the structure the micro fluidic chambers associated to addressable micro heater arrays (cold and OFF state), FIG. 30B shows releasing of smell upon heating and simultaneous opening of an control microfluidic valve (heated and ON state), and FIG. 30C shows a top view of the micro fluidic chamber arrays, in which multiple valves can be opened to "synthesize" smells based on the gradients and composition from certain cartridges.

DETAILED DESCRIPTION

Though the majority of human cognition appears to depend on the senses of sight (vision) and hearing (audition), a significant portion relies on the senses of touch (tactition) and smell (olfaction). However, although it is known in the art to repeat visual sensation (e.g., image or color or motion) and listening (e.g., sound) sensation by audio and video recording and replaying, this has not been applied to the additional senses of touch and smell. Further, the haptic technologies that the present inventors are aware of provide no well-defined correlation between sight, sound, and touch information. In addition, there is not believed to be a sufficient object synthesis, where sight or sound (or both) and touch are used to recreate objects and environments.

An example embodiment allows touching sensations, smell sensations, or both, to be recorded and replayed in a manner generally analogous to video and audio recording (for instance). An example embodiment includes, among other things, a sense system that obtains and stores sight, sound (or subset thereof) as well as touch information, which permits recreation of a touch experience in addition to the sight sound (or both) information during playback. In an example system, touch information including contact or force data can also be obtained, stored, and reproduced. In an example system, smell data can additionally or alternatively obtained, stored, and reproduced. An example device and system extends current video representation to take into account touch and smell senses.

An embodiment system can obtain touch and smell input signals for an object, event, or environment, and create a new representation where at one or more of sight and sound, and one or more of touch and smell, are stored, registered, and correlated for the objects, events, or environments. Touch signals recorded can include, for instance, feel, temperature, shape, texture, hardness, and humidity. An electronic nose can be integrated and used to detect odor as well, and such data can be stored and registered. A data representation that includes video images, sound, and touch can also include odor, and specific touch related details such as shape, texture, hardness, temperature, moisture (humidity), etc., to permit recreation of the object using playback devices that take into account three or all four modes of image, sound, smell, and touch representation.

An embodiment system includes sense input transducers, which receive a sensation for sight, sound, touch, or smell depending on the particular transducer, and produce an input signal representative of the sensation. This input signal is received by a processor. The processor stores sense data (at least temporarily) based on the signal. Storage can be in temporary memory or in longer memory, such as but not limited to in a database. This sense data can be correlated with stored sense data from other sense transducers, including sense transducers representing other senses. For example, sense data from touch input transducers may be correlated with sense data from sight, sound, or smell (or subset of both) input transducers. Sense data from smell input transducers may be correlated with sense data from sight, sound, touch input transducers (or a subset thereof) to provide processed data. This correlation can provide additional data (meta data). Other meta data, such as location data, time data, as nonlimiting examples, can be further correlated with the sense data to provide the processed data.

The processor outputs one or more signals for reproducing sense information to one or more output sense transducers. In an embodiment, the processor outputs signals to one or more output sense transducers for multiple senses based on the processed data. The output sense transducers receive the signals from the processor and output sensations (sight, sound, touch, smell, or subsets thereof) in response to the signal to reproduce the particular sensations. When sense transducers output correlated sensations for multiple senses, this synthesized sense information can be perceived by a user, who can apply this information to create cognition of the virtual object, event, or environment that represents the original one.

The output sense transducers can be integrated with the input sense transducers on example devices to provide an integrated solution for interactive feedback (that is, both receiving and producing sense information). Alternatively or additionally, the output sense transducers can be part of a separate device that communicates with the input sense transducers' device. For example, one user may have a mobile device that receives sensory input via sense input transducers, and after processing, sense output transducers on another user's mobile device may reproduce or "play back" the sensations (including sensations from multiple senses). The processing may take place on either device. Though in an example embodiment the sense input transducers are disposed on the same device, this is not necessary. Similarly, the sense output transducers may, but need not be, disposed on the same device.

In an example embodiment, a sense device is embodied in a glove, where temperature and pressure input transducers are populated to record temperature and texture and hardness information. The glove's position in space (as well as the fingers' corresponding positions, in an example embodiment) can be computed using, for instance, a combination of computer vision systems (e.g., based on cameras) and localization techniques such as global positioning systems (GPS). The example glove can also have miniature cameras to record different views of the objects. The feel and shape of the object can be computed using a combination of pressure input transducers such as pressure detectors on the glove as well as video input transducers such as computer vision systems. In addition, smell can be recorded by smell input transducers such as integrated electronic noses. These signals can be communicated (e.g., transmitted) to a server, a recording device, or other communication devices or systems, using either wired or wireless transmission technologies. The signals (video or image, sound, aroma, and temperature, shape, texture, hardness, etc.) can be registered, correlated, and stored, and can also be coded using data coding techniques, and stored, transmitted, etc. to other devices.

An example synthesis device permits an object to be "played back" based upon data stored in a memory (e.g., a database) created from the sense device. The playback device in an embodiment can also be a glove that can create touch sensations associated with the data provided, synced with video and sound playback. In an example embodiment, the touch sensation is reproduced when the glove interacts with a 3-D video playback.

Smell sense has not been able to be recorded and "reproduced". Smell detection has been largely researched using electronic noses, but current electronic noses can suffer from low sensitivity. In an example embodiment, a electronic nose includes a large number of sensors (sensor arrays) that detect the odors and generate a 2D map of "signature", which signals are collected and recognized through signature matching (image recognition) with "signature library". Sensing mechanisms for an electronic nose include MOSFET and metal oxide chemo-FET (which measures the modulation in channel conductance upon gas molecules binding to the surface), quartz crystal microbalance (which measures the resonance frequency of a quartz crystal with changes in mass per unit area), conducting polymers (which change in volume and electricity upon gas absorption), microelectromechanical systems (MEMS) sensors (which measures modulation of surface acoustic waves), optical absorption (IR), and even mass spectrometry or ultra-fast gas chromatography.

Applications expand data collection, transmission, and presentation to include touch, smell, or a combination in addition to sight and sound. Storage and correlation allow a synthesis of multiple senses to recreate events, objects, and environments at a selectable time and location.

Examples will now be discussed with respect to the drawings. The drawings include schematic figures that are not to scale, which will be fully understood by skilled artisans with reference to the accompanying description. Features may be exaggerated for purposes of illustration. From the examples below, artisans will recognize additional features and broader aspects.

Figure 1:
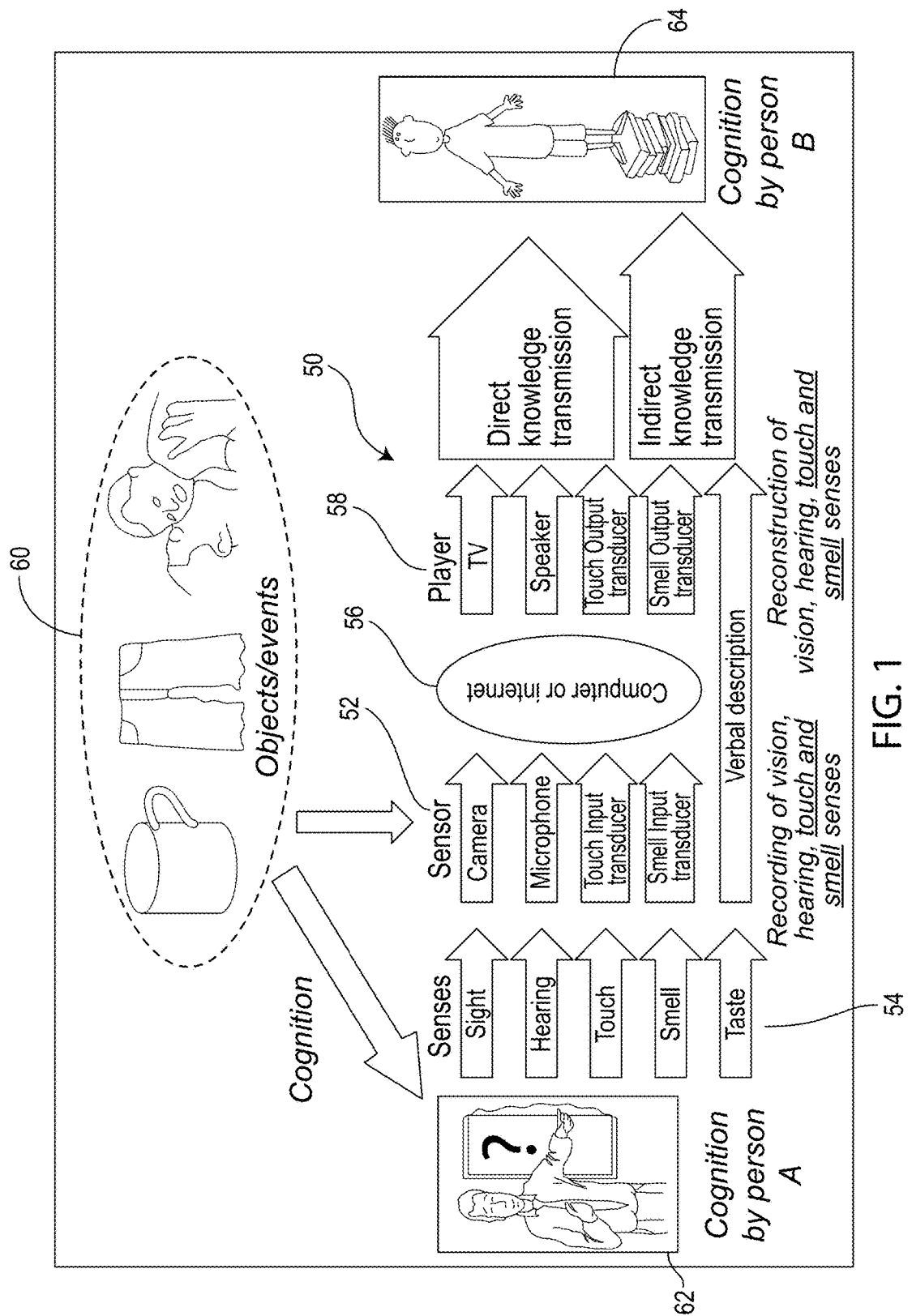
FIG. 1 shows a system for recording and reproducing sensations including touch and smell according to an example embodiment, indicating flow of sensory inputs and outputs.

An example system 50 is shown in FIG. 1. The example system 50 includes one or more input transducers 52, which provide input signals representative of respective senses (sight, hearing, touch, and smell) 54 to one or more processors 56 for data processing and integration. The processor(s) 56 in turn provide(s) output signals representative of the respective senses to output or interaction devices 58, including output transducers for playback of respective senses.

Figure 2:
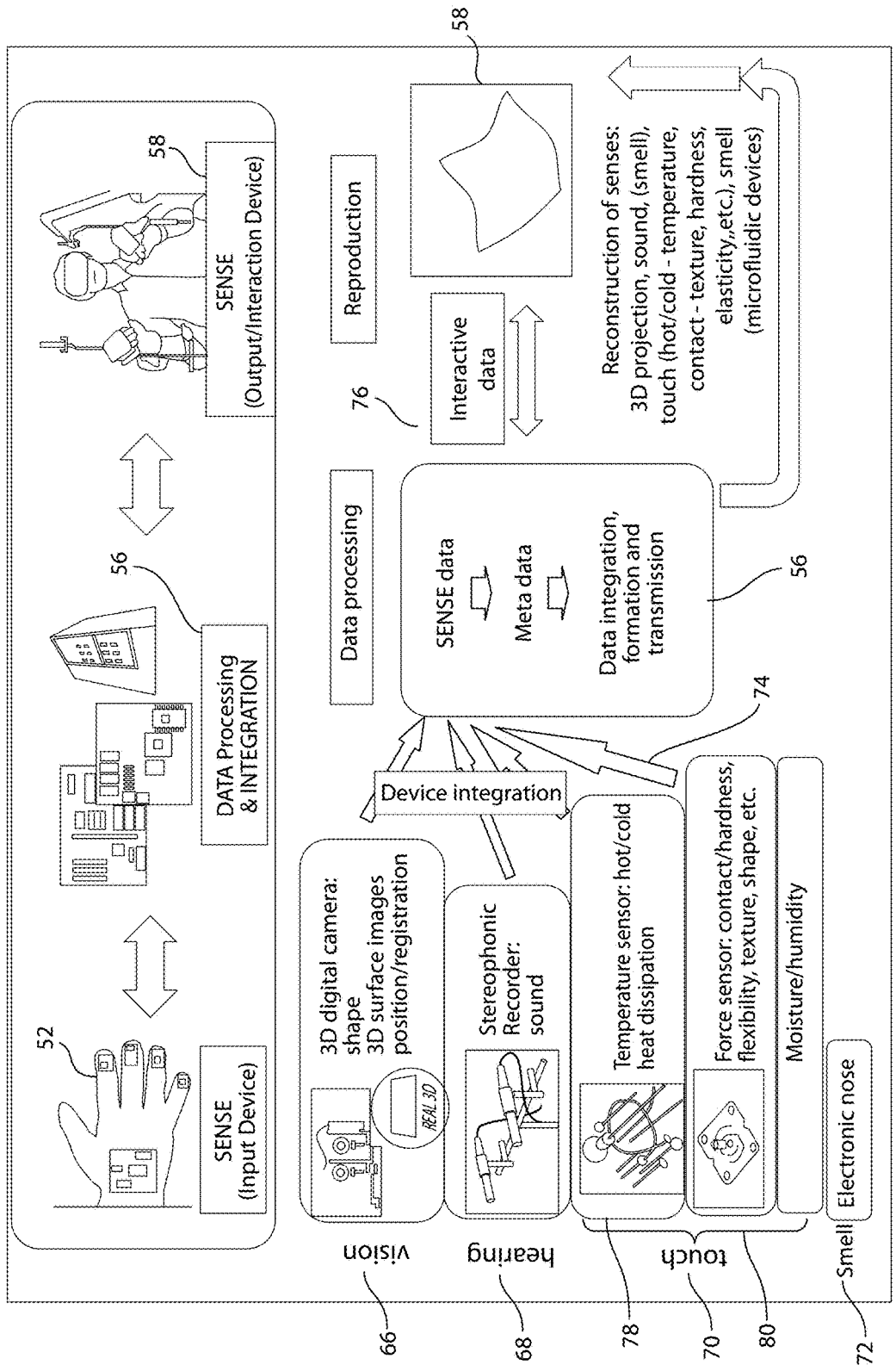
FIG. 2 shows the example system of FIG. 1, indicating example components for input and output sense transducers.

For example, in FIGS. 1-2, objects and events 60 are perceived by a person, e.g., person A 62, by cognition based on senses 54 including one or more of sight, hearing, touch, smell, and taste. In an example embodiment, sight, hearing, touch, and smell are recorded and reconstructed, providing a knowledge transmission to a user, e.g., person B 64, who by cognition can perceive the objects or events 60. Recording of sight, hearing, touch, and smell is performed, preferably simultaneously, by providing input transducers that receive sight 66, hearing 68, touch 70, and smell 72 inputs and produce input signals 74 representative of the respective sense. Such input transducers 66, 68, 70, 72 can be provided by integration on one or more devices. In a nonlimiting example input device shown in FIG. 2 for the input transducer 52, a glove includes a plurality of circuit boards, each including input transducers.

The input signals 74 from the input signal transducers 66, 68, 70, 72 are communicated to and recorded by the processor 56, e.g., as data. The processor 56 is coupled to the input transducers 66, 68, 70, 72 either wired or wirelessly for communication. The processor 56 can be, as nonlimiting examples, one or more of a suitably configured computer directly coupled to the input transducers 66, 68, 70, 72, an integrated circuit, or a networked computer (e.g., a server computer, client computer, cloud computer, etc.).

In the example system shown in FIGS. 1-2, the sight input transducers 66 are provided by a suitable camera (e.g., a digital camera, and in particular an embodiment a 3-D digital camera, though a 2-D digital camera can also be used), which receives (and preprocesses, as necessary or desired) a video or image input from the objects or events 60 and provides the input signal 74 representative of the video or image input. For example, sight input signals can be representative of shape, color, position, size, movement, etc. The hearing input transducers 68 are provided by a suitable microphone (e.g., a stereo recorder), which receives (and preprocesses, as necessary or desired) an audio input from the objects or events 60 and provides the input signal 74 representative of the audio input. Hearing input signals 74 can be representative of sound, proximity, location, etc.

The touch and smell senses in an example embodiment are provided by the touch 70 and smell 72 input transducers, which receive (and initially preprocess, as necessary or desired) touch and smell inputs, and provide the input signals 74 representative of the touch and smell inputs. Example touch sensations can be representative of contact (e.g., force, pressure, hardness, flexibility, texture, shape, humidity), temperature (hot, cold, heat dissipation), etc., and different touch transducers 70 may be provided for various touch sensations. These different touch transducers 70 can be integrated on one or more touch sense modules. Nonlimiting example touch sense modules include nanowire-based high-density flexible sensor array technology with high-accuracy temperature sensors, capacitive sensor arrays, piezoelectric sensor arrays, piezo-resistive sensor arrays, ZnO thin film or nanowire array based touch sensor array modules, and substrates for large-area information. Smell sensation can be provided by a smell transducer 72 such as an electronic nose (based on CMOS FET, conjugated polymers, MEMS, nanowire sensors, etc.).

Readout circuitry is provided for receiving the input signals 74 from the sense transducers 66, 68, 70, 72 and in an example embodiment preprocessing the signals to provide data from the input signals. Nonlimiting example pre-processing includes filtering, conditioning, amplifying, quantizing, etc. An example embodiment includes at least one of a touch input transducer such as (but not limited to) the touch input transducer 70 and a smell input transducer such as (but not limited to) the smell input transducer 72. One or more of the input transducers 66, 68, 70, 72 can be omitted in an example embodiment. Input signals 74 may also include information to assist in further processing, such as but not limited to meta data including time information, location information, etc. Alternatively or additionally, meta data can be provided from sources in addition to the sense input transducers. Additional meta data can be provided by the processor 56 processing the sense input signals 74 themselves (e.g., by correlating the signals, associating the signals with other data, etc.). In an example embodiment, meta data is determined by comparing the input sense signals to a library of signatures for the particular sense to determine if a particular object or event is present.

The processor 56 receiving the multiple input signals stores, at least temporarily, the input signals (that is, storing data representative of the input signals). Storage includes, but is not limited to, storage in memory (e.g., random access memory (RAM)), storage in more permanent media, such as but not limited to non-volatile memory, non-transitory machine-readable media, disk drives, etc. As a nonlimiting example, the input signals can be stored in a database co-located with the processor 56 or located separate from the processor. The storage of the signals can be in many different formats. An example storage method can include digitizing input signals, including sight, sound, touch, smell, or any combination thereof, and can store or organize the inputs according to spatial location, temporal frame or sequence of frames, etc. Storage of inputs can also include storage of fragments of inputs, and can include reassembled fragments from different spatial or temporal frames. A sense "databank" can be created in storage, which includes multiple stored sense inputs. This databank of senses can include sight, audio, touch, and smell (or any subset) stored sense data, and can be accessed by a user by a user request via a suitable interface (mobile phone, computer, terminal, etc.) to reproduce or play back any selected combination of the stored sense data.

An example processor 56 can process input signals 74 from one or more sense transducers 66, 68, 70, 72 and integrate them with input signals from one or more other senses. This integration can be, as a nonlimiting example, analogous to human cognition, though it is also contemplated that sense input signals can be integrated in additional ways. Integration can be based on, as nonlimiting examples, at least one of spatial and temporal similarity. For instance, input signals 74 representative of at one or more of video and audio information may be correlated with a location of a particular object. Input signals 74 that are representative of one or more of touch information and smell information may be correlated with the same location or a particular time. These input signals 74 can be integrated by correlating them based on the common location. Integration can also be with data from other sources.

Other sense information can be provided by additional sensors, and this information in an example embodiment can be integrated with other information from the input transducers. For example, additional touch sense transducers 70 such as (but not limited to) moisture or humidity sensor or sensor arrays can also be integrated to a glove fingertip to collect information. As another example, in medical applications, an oxygen sensor, etc., can be integrated to a fingertip to collect information from patients.

By processing, storing, and integrating the input signals 74 from the input transducers 66, 68, 70, 72, alone or with additional data, the processor 56 can then reconstruct sense information. To reconstruct or "play back" the sense information for reception and cognition by person B 64, the processor 56 provides (e.g., forms and transmits) output signals 76 representative of the respective senses to the output sense transducers 58 for each of the senses. In an example embodiment, these output sense signals 76 are provided by the processor 56 substantially together (as permitted by bandwidth, etc.) so that the output sense transducers 58 representing more than one sense can provide sensations simultaneously.

In the example system 50 of FIGS. 1-2, among the output sense transducers 58, the output transducer for sight is provided by a video monitor, e.g., a television. The output transducer for hearing is provided by an audio monitor, e.g., a speaker. The touch and sense output transducers are provided for providing touch and smell sensations, respectively. The outputs of the sight, hearing, and touch transducers (or a subset thereof) provide direct knowledge transmission of sight, hearing, and touch sensations (or a subset thereof) to a user such as person B 64. The smell sensation provided by the smell output transducer provides direct knowledge transmission related to the smell to person B 64 as well. In an example embodiment, taste sensation is also provided to a user as indirect knowledge transmission, for instance, as a verbal description, which can be processed by the processor 56, correlated with the other input signals 74, and delivered to Person B 64 as well via output devices such as video or audio monitors. Person B 64 can then process these multiple sensations (e.g., via cognition) to recreate the feeling to virtual objects or events. The output sense transducers 58 can be integrated on one or more devices, such as the output interaction device shown in FIGS. 1-2.

FIG. 2 shows example components for the input devices 52. The input device 52 includes integrated sense input transducers for vision 66, hearing 68, touch (including temperature, force, humidity, etc.) 70, and smell 72, each of which is integrated with the processor 56. Vision input transducers 66 include 3-D digital cameras to provide shape information and 3-D surface images including position and registration. Hearing input transducers 68 include a stereophonic recorder for sensing sound. Touch input transducers 70 include temperature sensors 78 for sensing hot and cold, heat dissipation, etc., and force sensors 80 for perceiving contact, hardness, flexibility, texture, shape sensors, moisture sensors for detect humidity, etc. The smell input transducer 72 includes an electronic nose for chemical sensing.

Each of these sensors 66, 68, 70, 72 are coupled (wired or wirelessly) to the processor 56 for communicating and processing the sensing input data 74. For example, the sense input data 74 can be processed to provide meta data or combined with additional meta data to integrate the data. The integrated data then can be processed to form and transmit sensory outputs.

To do so, the sense output signals 76 are output (e.g., transmitted) by the processor 56 to the output transducers 58 (reproduction devices) for reproduction. Preprocessing of output signals 76 from the processor 56 may be performed in an example embodiment. Vision output transducers include, for instance, 3-D projectors. Sound output transducers include, for instance, sound transducers. Smell output transducers include microfluidic devices with chemical "smell" cartridges. Example touch output transducers can reproduce hot and cold temperature, contact and hardness, texture, elasticity, humidity, etc., depending on the transducers used. Example touch output transducers include, but are not limited to, polymer-based electroactive actuators for optimum sensory information transmission, CNT-based actuators, flexible tactile sensors and temperature transmission module for 4-D metamedia data transmission, etc.

Data integration in the database can be provided by, for example, a 3-D image information acquisition module with 4-D metadata fusion engine technology to combine sensor, auditory, and gustatory information with 3-D image information. The processor 56 can also provide data compression, transmission, and play module development for 4-D metadata, 4-D metamedia regeneration engine technology for 4-D interaction, and 4-D metamedia standardization.

Figure 3A:
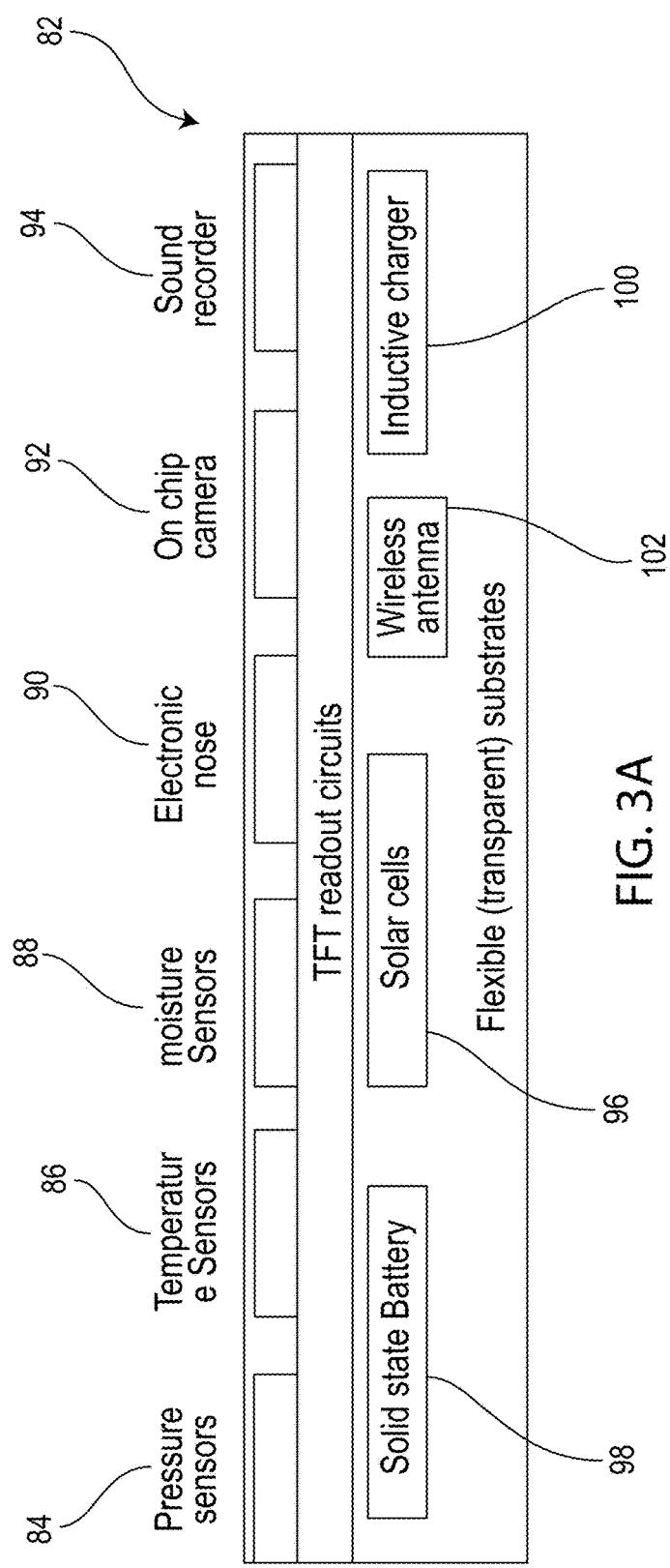
FIGS. 3A-3B show an example array of integrated devices in a system with sight, sound, touch and smell sense input and output transducers, respectively.
Figure 3B:
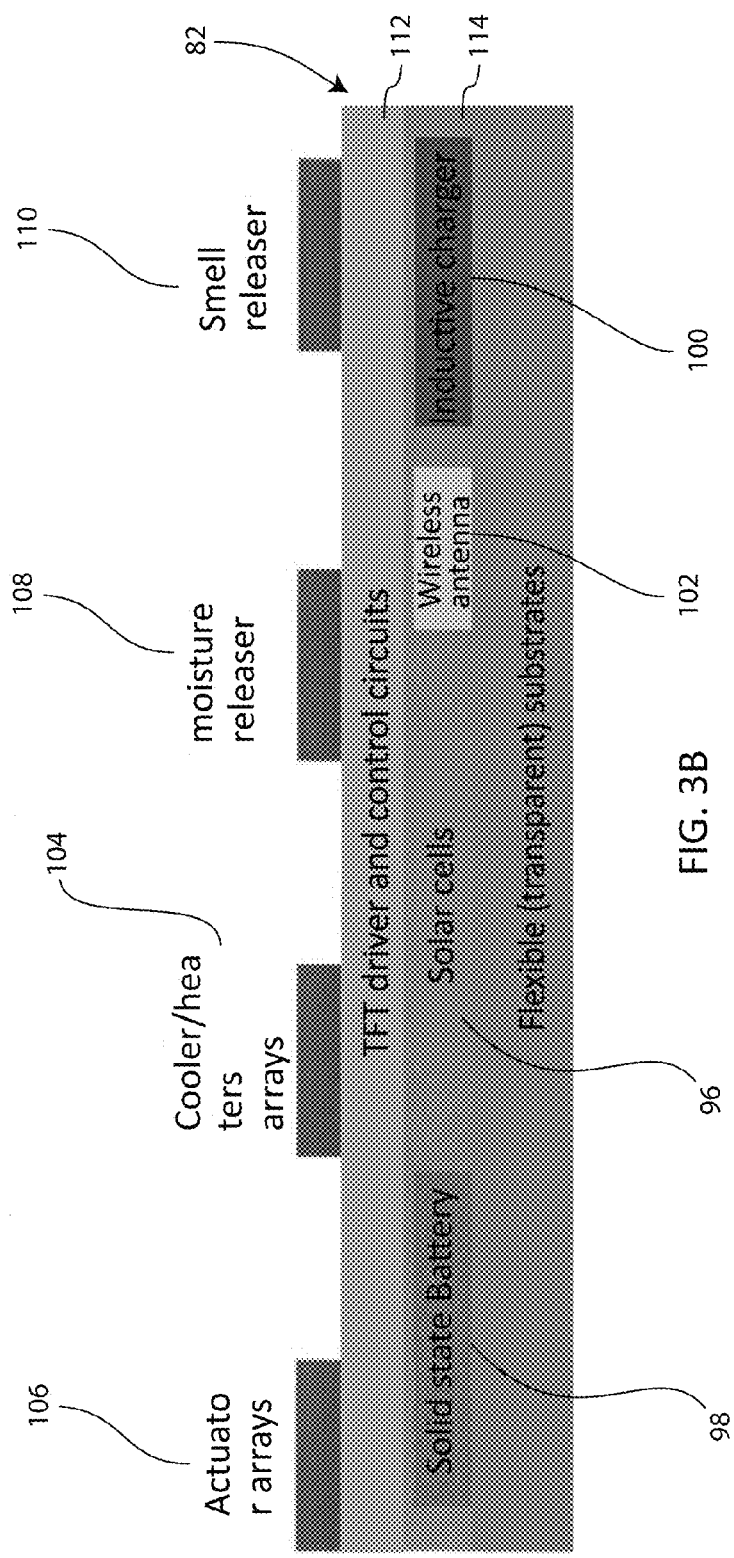

FIGS. 3A-3B illustrates example components for the input devices and output devices. FIG. 3A shows a system 82 having an example array of integrated devices including integrated sense input transducers for vision, hearing, touch, and smell, each of which is integrated with a processor (e.g., processor 56). Touch input transducers include pressure sensors 84, temperature sensors 86 for sensing hot and cold, heat dissipation, etc., moisture sensors 88 for detecting humidity, etc. Other force sensors can include, but are not limited to, sensors for perceiving contact, hardness, flexibility, texture, shape sensors, etc. An electronic nose 90 for sensing smell can be provided in an example embodiment, as can an on-chip camera 92 for sensing video. Sound can also be recorded by the on-chip camera 92, a sound recorder 94, or both a camera and a sound recorder. Integration can be based on, as nonlimiting examples, capacitive pressure sensors, conductive sensors, conductive polymer composite nanomaterials (CNT, nanowires, etc.) sensors, piezoelectric sensors such as $BaTiO_3$, $Pb(Zr_xTi_{1-x})O_3$, or PZT, ZnO, CdS, GaN, or PVDF, nylon, and PBLG, etc., polymers, piezoresistive sensors based on, for example, Si, and optical pressure sensors based on Bragg grating, optical interference, wavelength shift (photonic crystals), etc., and micro temperature sensors including thermistors, resistance temperature detectors (RTDs), thermocouples, acoustic and optical sensors, MOSFET and metal oxide chemo-FET, quartz crystal microbalance, microelectromechanical systems (MEMS) sensors, nanowire FET, etc., moisture sensors, and electronic noses based on MOSFETs, metal oxide FETs, nanowire FETs, quartz crystal microbalance, conducting polymers, MEMS sensors, IR absorption, etc., and others as will be appreciated by those of ordinary skill in the art.

Power for the system 82 can be provided by, as nonlimiting examples, one or more of flexible solar cells 96, batteries 98, inductive coupling antennas 100, which in an example embodiment can be based on thin film or nanomaterials (nanoparticles, nanotubes, nanowires, etc.), as will be appreciated by those of ordinary skill in the art. A wireless antenna 102 can be used for communication to and from the system 82.

FIG. 3B shows example components of the system 82 including integrated sense output transducers for touch, and smell, each of which is integrated with a processor (e.g., processor 56). Touch output transducers include micro heater and cooler pairs or arrays 104 for reproduction of sensing hot and cold, heat dissipation, etc., actuator arrays 106 to recreate touch sensation of contact, hardness, flexibility, texture, and shape, moisture releaser 108 for releasing water vapor or other liquid vapor, and a smell releaser 110, which can include, as a nonlimiting example, smell microfluidic cartridges to release smells. A thin film transistor (TFT) driver and control circuits 112 can be provide for driving and controlling the sense output transducers. The components can be disposed on a substrate, such as but not limited to a flexible, transparent substrate 114, a fabric, etc. Integration can be based on, as nonlimiting examples, piezoelectric actuator arrays, electroactive Polymers (EAPs) actuators (based on dielectric polymers, ionic EAPs such as PVC gels), carbon nanotubes (CNTs), organic or polymeric FETs, pneumatic actuators, shape memory alloys (SMAs) devices, etc., and resistive using metal wires or coils such as Pt, and thermoelectric array coolers based on thin film, nanowire arrays, or nanoparticle composites, etc. The output transducers 104, 106, 108, 110 can be powered using the solid state battery 98, solar cells 96, and inductive charger 100. The wireless antenna 102 can be provided to receive output signals or transmit signals.

Figure 4A:
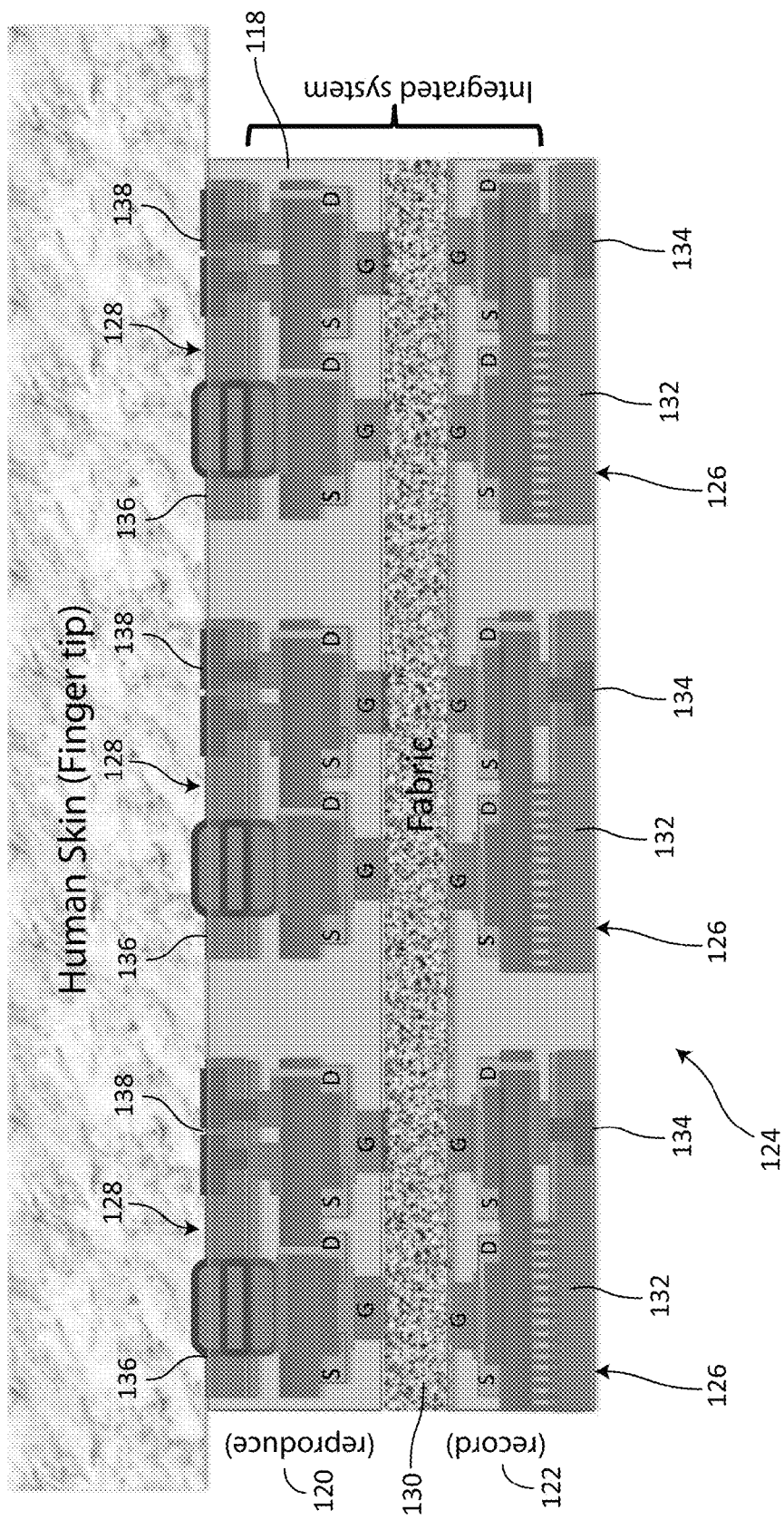
FIGS. 4A-4C show an example array of touch sense input and output transducers, according to an example embodiment.
Figure 4B:
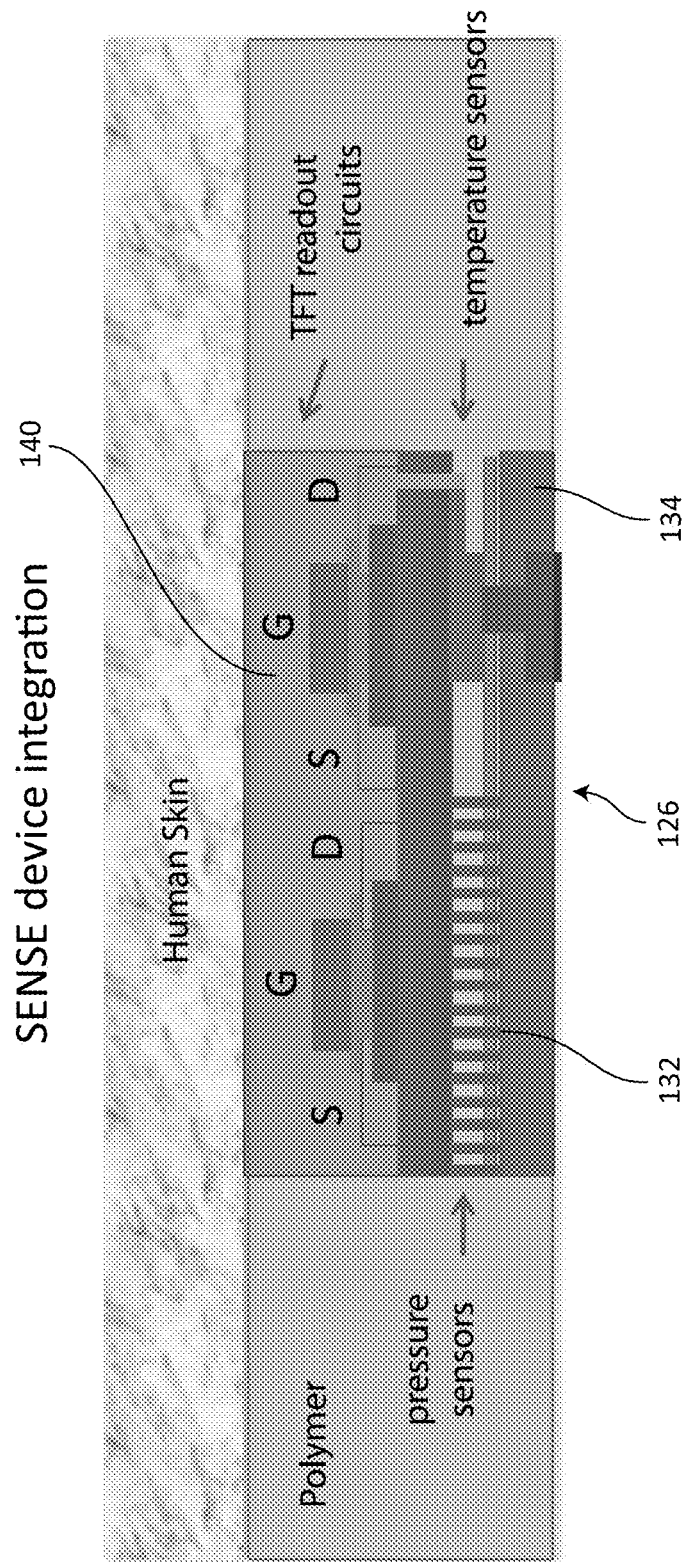
Figure 4C:
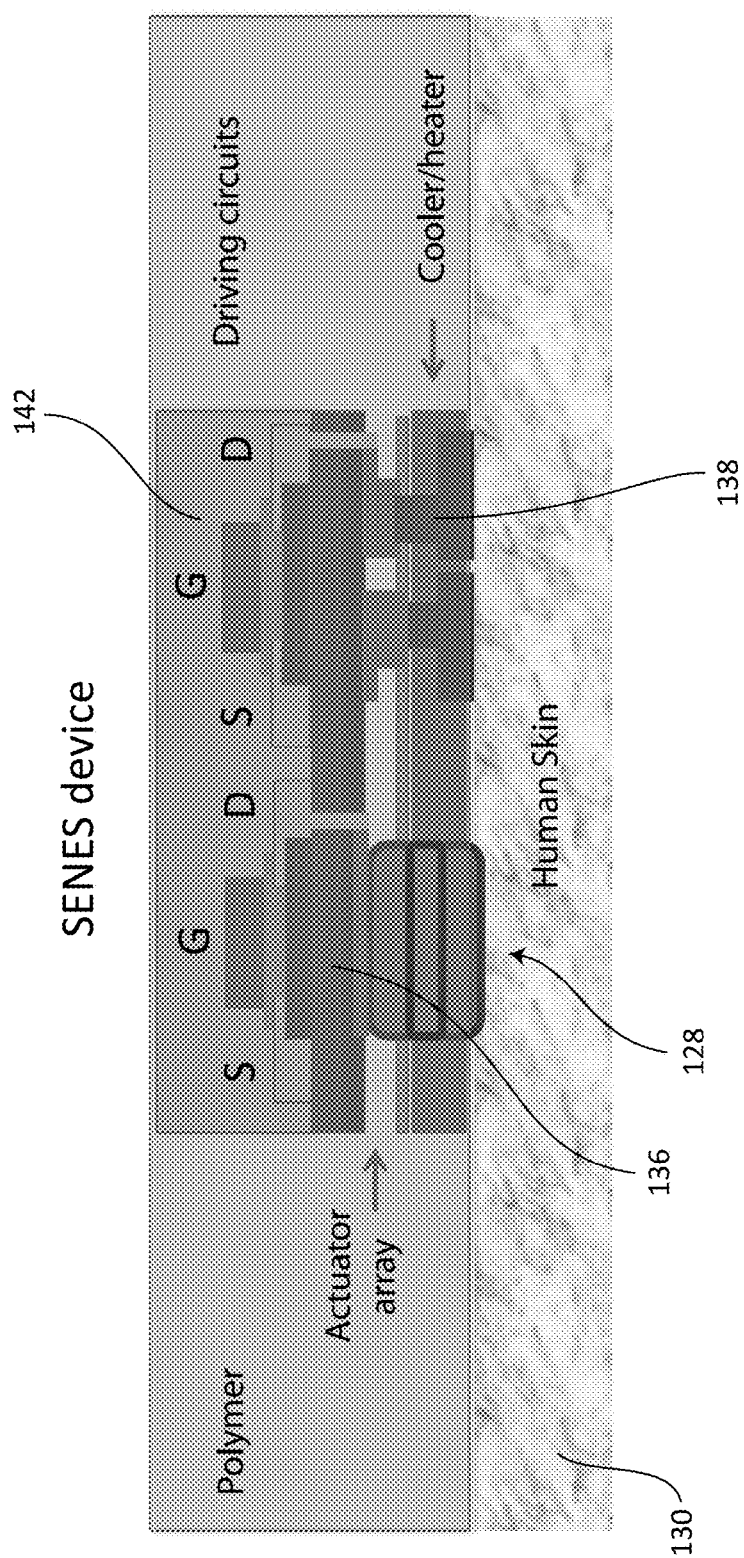

FIGS. 4A-4C show additional example components for the input devices and output devices specific for touch sense. FIG. 4A shows integration 118 of output transducers 120 and input transducers 122 with one another (and in some examples with the processor 56) on the flexible substrate so that the processor 56 both outputs and receives interactive data. Alternatively, the output transducers 120 can be remote from the input transducers 122 (e.g., when sending a signal representative of touch sensations between devices over a network). If the sense input transducers 122 and sense output transducers 120 are located on different devices, the processor 56 can be disposed on either device, or at a separate location (e.g., in the cloud).

Example input and output transducers for touch and smell senses will now be discussed. It will be appreciated, however, that other touch and smell input and output transducers can be provided, integrated, and employed. Further, input and output transducers for sight and sound can include any suitable device or system for performing sight and sound data collection and output according to example methods.

FIG. 4 shows an example touch sense array 124 according to an embodiment. The example array in FIG. 4A includes (as example only) three touch input transducers 126, particularly pressure and temperature sensors, and an array of three touch output transducers 128, particularly electric actuators, disposed on a substrate 130. Preferably, the substrate 130 is a relatively thin sheet of flexible material (e.g., fabric, flexible plastic), though other substrates are contemplated. The example substrate 130 shown in FIG. 4A can be, for instance, a simulation of artificial skin for a human finger-tip. In an example embodiment, the touch input transducers are integrated with the touch output transducers by providing an active matrix of transistors, e.g., thin film transistors (TFTs) coupled to each of the transducers.

Though only three transducers are included in each array shown for the purposes of clear illustration, the example array 124 can be scaled to as many transducers as needed to provide a desired pixilated surface for sensing. Further, while one-dimensional arrays are shown in FIG. 4, arrays can also be two-dimensional for both the touch input transducers and the touch output transducers.

Each of the touch sensors 126 in this example system includes a pair of devices. The (left) device 132 is for sensing pressure or force, and the right device 134 is for sensing temperature. Each of the electric actuators includes a pair of devices as well. The (left) device 136 outputs force and pressure, and the right device 138 outputs temperature (hot, cold, heat dissipation).

FIGS. 4B and 4C show the separated sensing system (FIG. 4B), including the input transducers 126, and the reproducing system (FIG. 4C), including the output transducers 128. The pressure sensor 132 and the temperature sensor 134 are coupled to a TFT readout circuit 140 for reading the results. In the output transducer 128 shown in FIG. 4C, the force and pressure output transducer (actuator array) 136 and the temperature output transducer (cooler/heater) 138 are coupled to driving circuits 142 for driving the transducers.

Figure 5A:
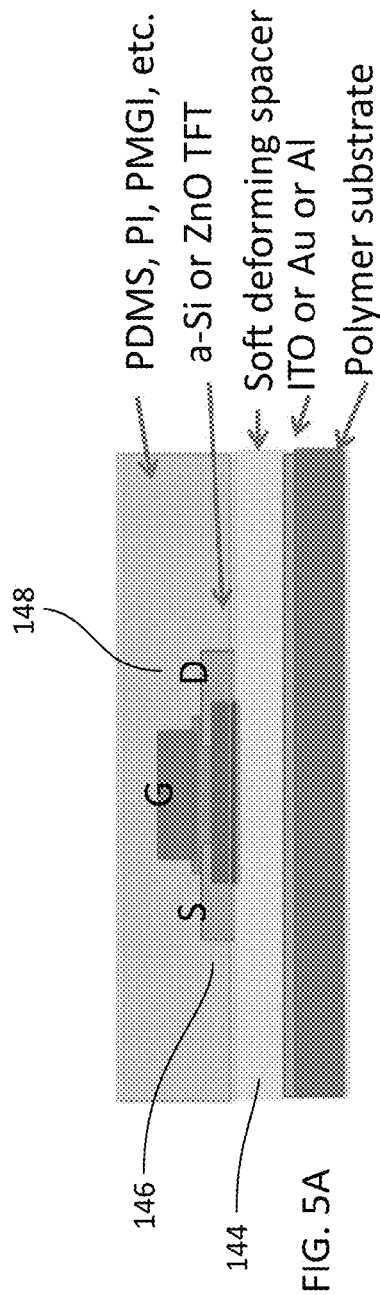
FIGS. 5A-5B show an example array of force and pressure sense input transducers based on capacitance (FIG. 5A) and piezoelectric or piezo-resistive materials (FIG. 5B)
Figure 5B:
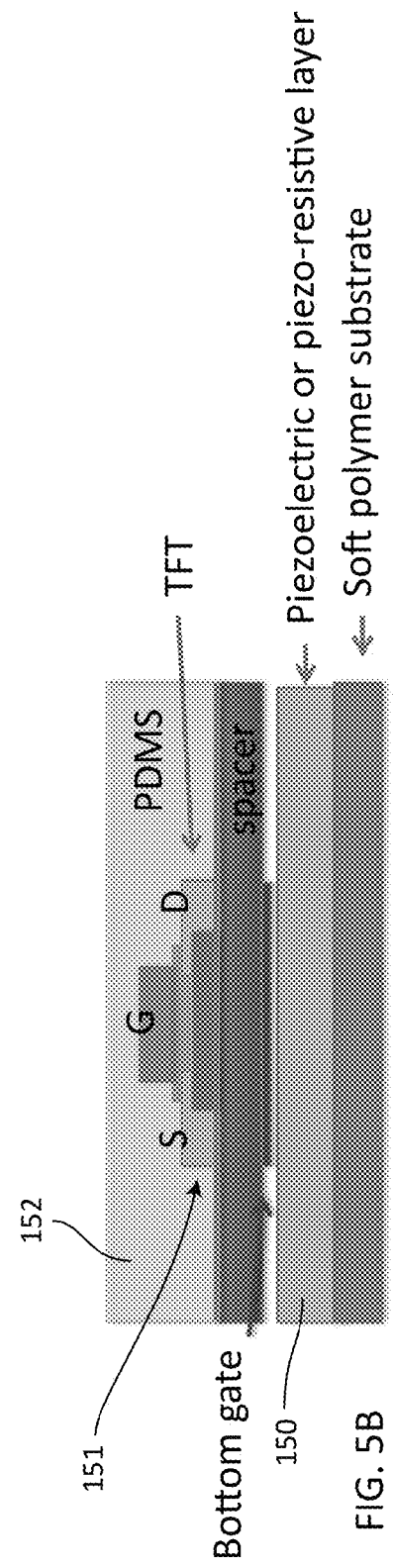

FIGS. 5A-5B show an example embodiment in which a single sensor is connected to a TFT device 146, which are connected in large arrays for sensing touch in large areas. FIG. 5A shows the structure of a flexible capacitive pressure sensor 144 with active components embedded in a flexible polymer matrix 148, such as, in a nonlimiting example, PDMS. The deforming spacer 144 can be soft polymers or polymer with nano or micro structures such as holes, pyramids, pillars, etc. FIG. 5B shows the structure of a pressure sensor 150 based on piezoelectric or piezo-resistive active components 152 embedded in a flexible polymer matrix 152, such as, in a nonlimiting example, thin films, nanowires, nanotubes, etc. from $BaTiO_3$, $Pb(Zr_xTi_{1-x})O_3$, or PZT, ZnO, CdS, GaN, etc. oxide or semiconductors, or PVDF, nylon, and PBLG etc. polymers.

FIGS. 6A-6E show an example touch input transducer 160 embodied in a ZnO nanowire force and pressure sensor (piezoelectric sensor) that can be part of a force sensor array. The example touch input transducers 160, coupled to a transistor 161, employs nanostructures to transmit pressure on the transducers. FIG. 6A shows an example device structure embedded in soft polymers 162 such as Polydimethylsiloxane (PDMS) flexible substrate (also shown in FIG. 6B). FIG. 6C and FIG. 6D show SEM images of vertically aligned ZnO nanowires in a side and top view, respectively. FIG. 6E shows a current change (spikes) in a TFT channel with pulsed pressure application.

Figure 7:
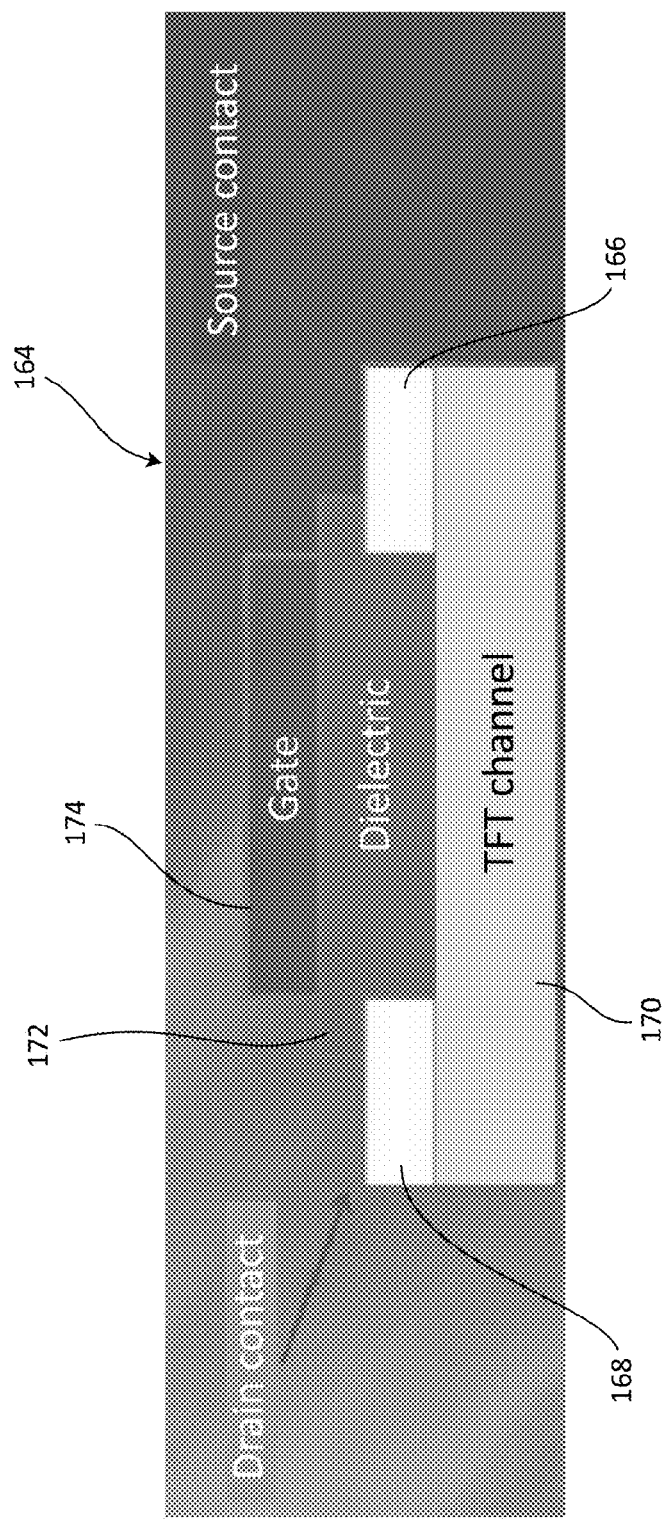
FIG. 7 shows a TFT device for reader and driver according to an example embodiment.

In FIGS. 3-6, all of the sensors or actuators are driven by transistors, such as TFTs. The transistors are part of an active matrix, which selectively drives and receives signals from the input devices, and selectively drives the output devices. FIG. 7 shows the structure of a TFT device 164, where the active channel material can be thin films, nanowires, nanotubes, nanoparticles, etc. Other nonlimiting examples include semiconductors, such as Si, Ge, SiGe, III-V, II-VI, metal oxide, conjugated polymers or organic molecules, etc. Examples of processing approaches include (but are not limited to) CVD, MOCVD, MBE, sputtering, thermoevaporation, sol-gel, spin-coating, drop-coating, contact transfer, etc. The transistors include a source contact 166, a drain contact 168, a TFT channel 170, a dielectric 172 (e.g., $Al_2O_3$ or $SiO_2$) disposed between the source contact and the drain contact, and a gate layer 174.

Figure 8A:
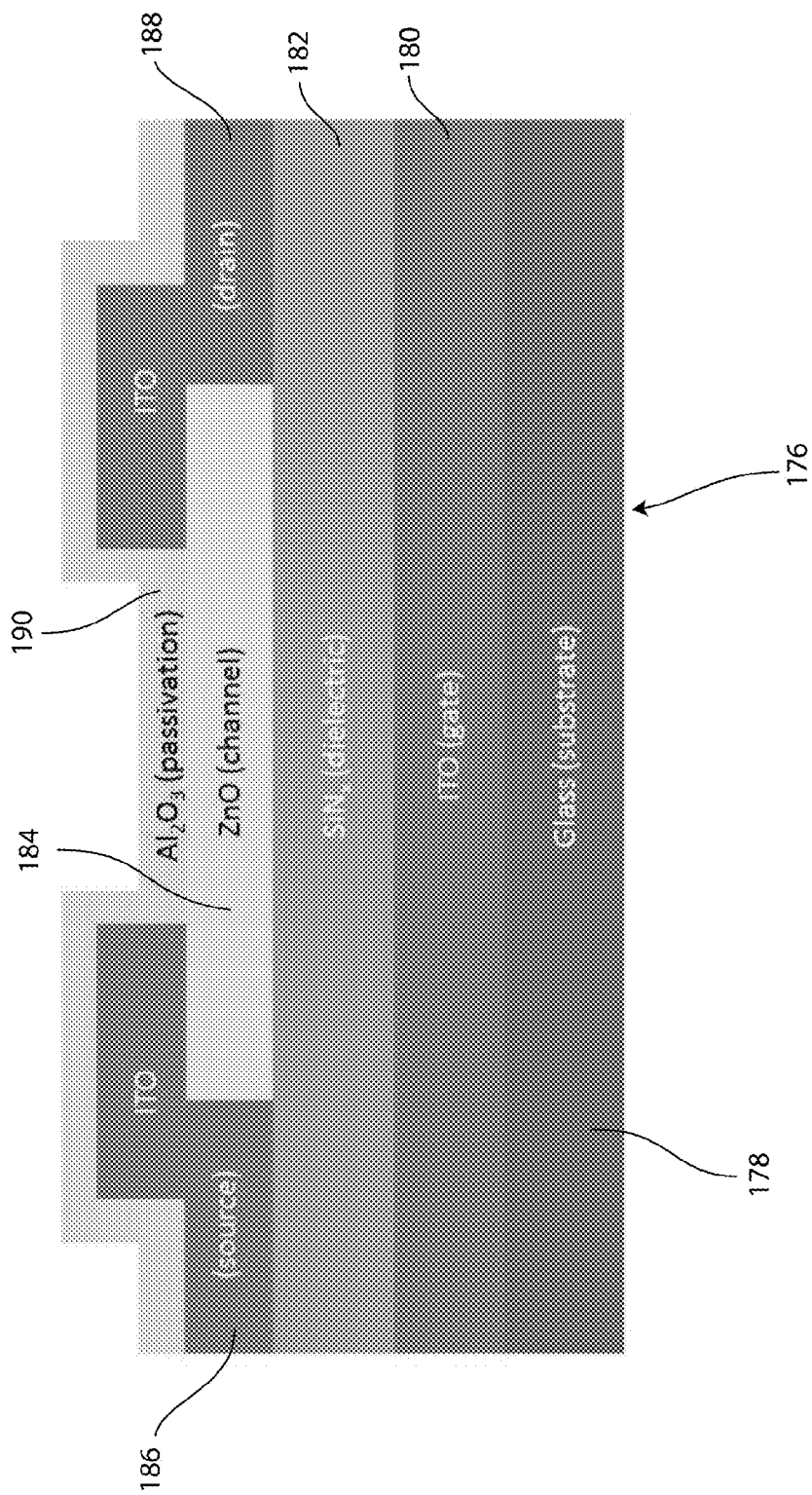
Figure 8B:
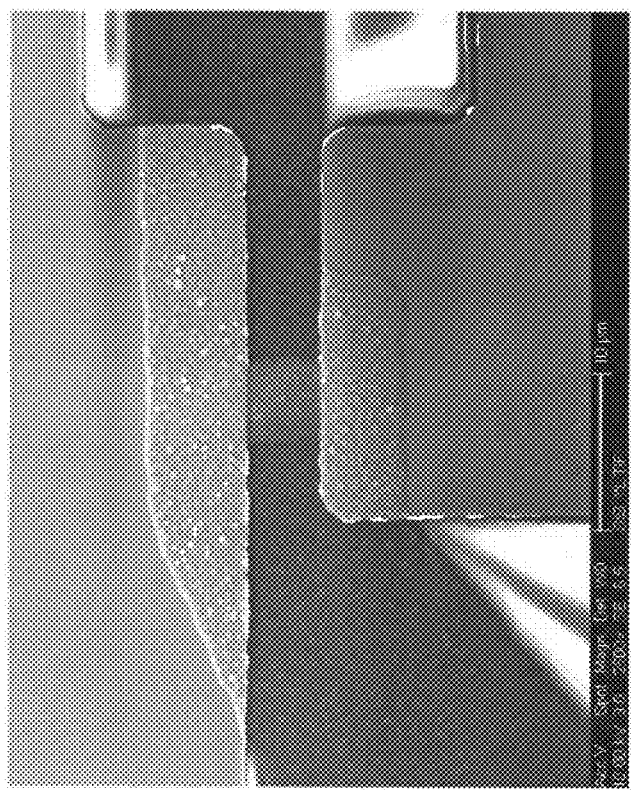
Figure 8C:
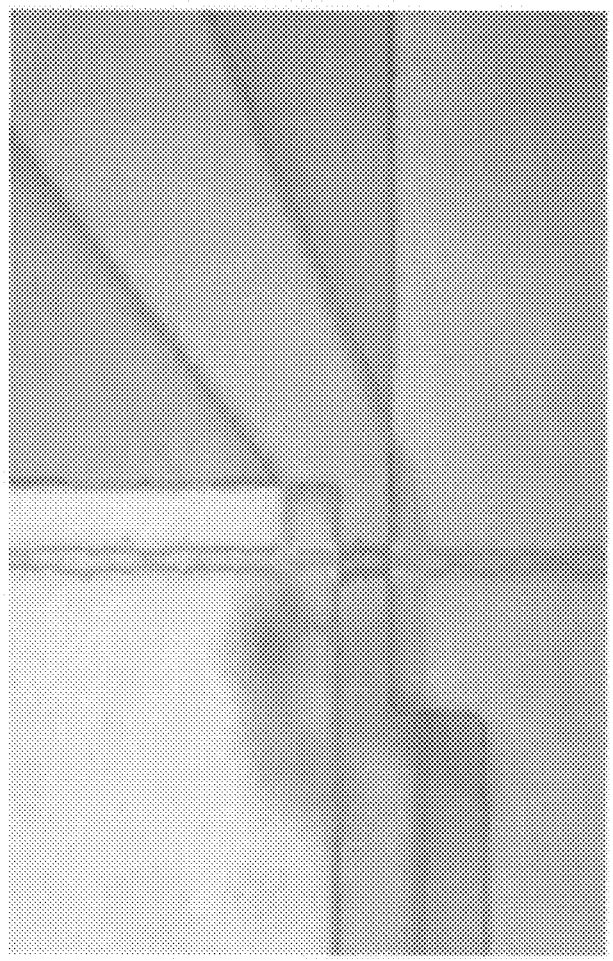
Figure 8D:
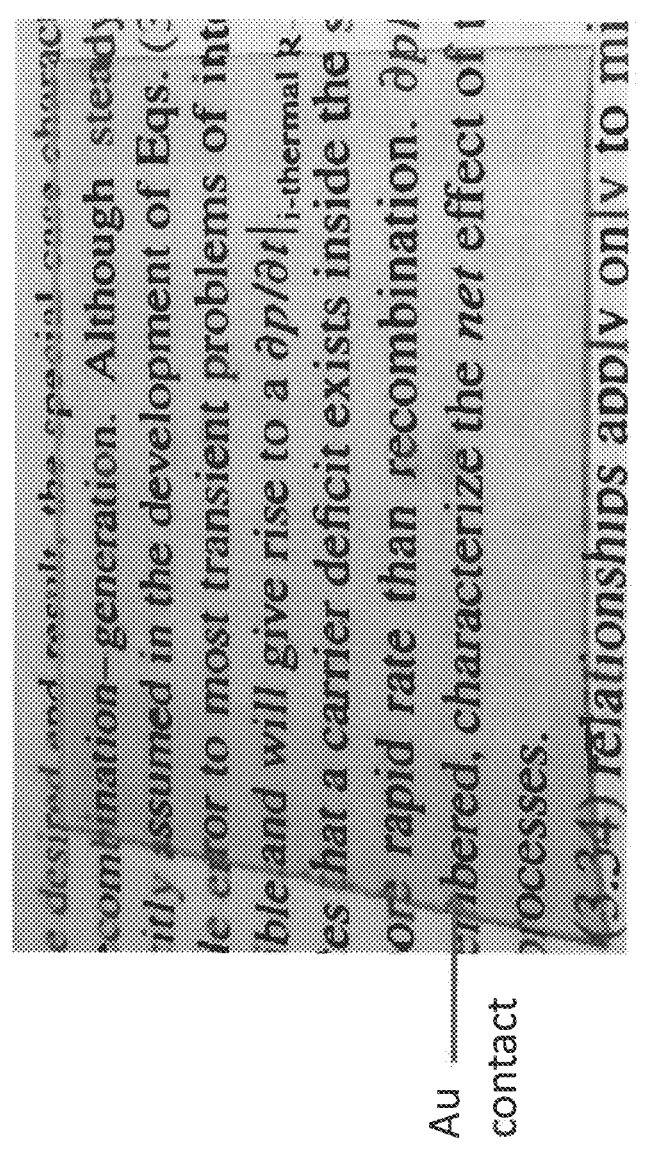
Figure 8E:
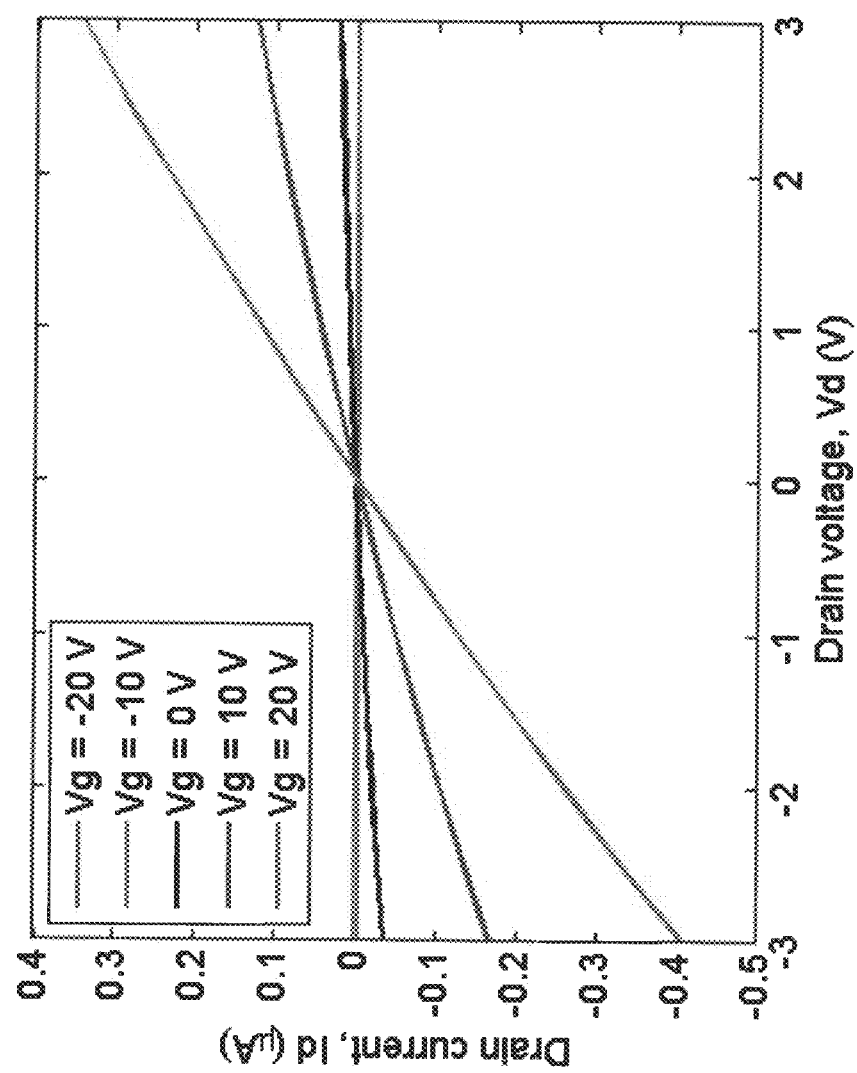
Figure 8F:
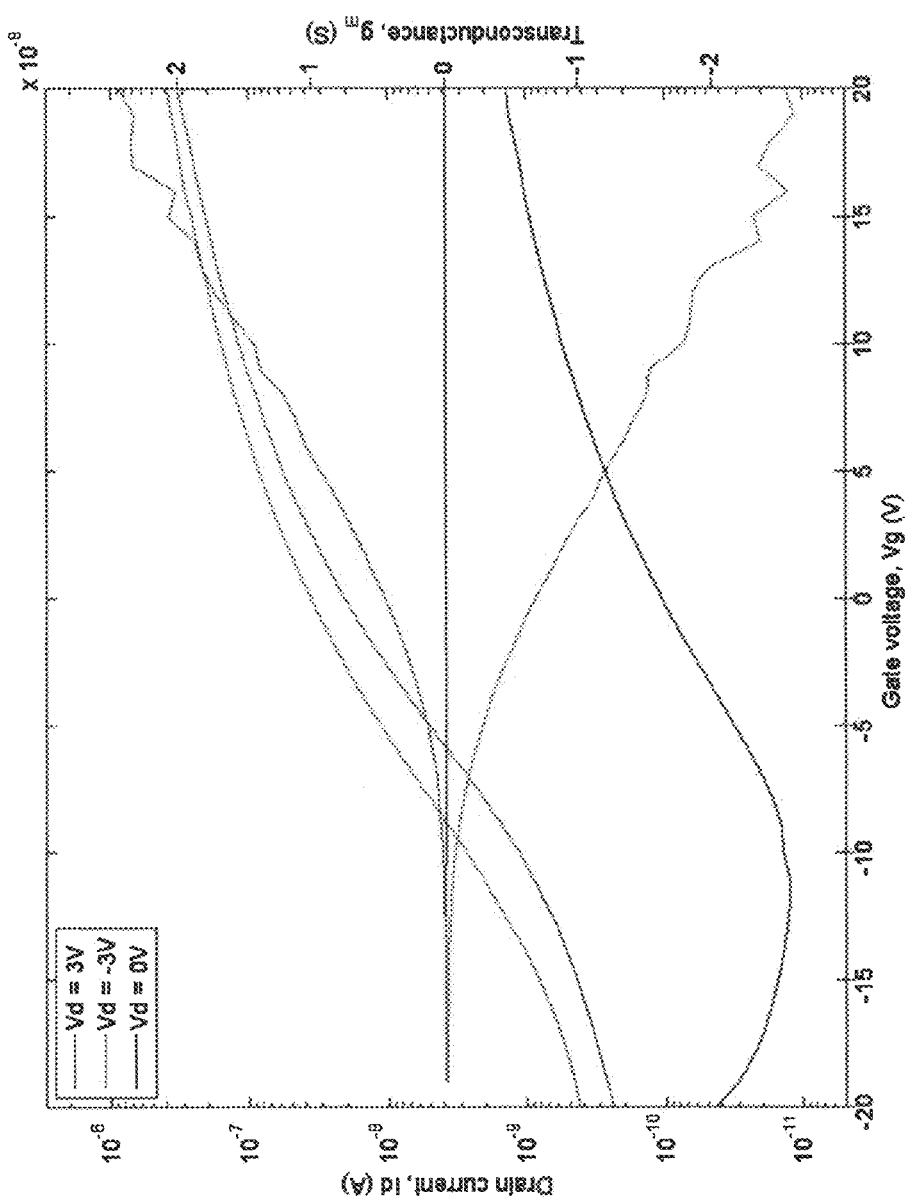

FIG. 8A shows an example piezoelectric sensor 176 based on sputtered ZnO thin film transistors. The sensor 178 includes a substrate (e.g., glass), an ITO gate 180, a dielectric 182, a channel 184, a source 186, a drain 188, and a passivation layer 190 disposed over the sensor. An example sputtering process is done in the mixture of nitrogen and argon. FIGS. 8B-8C show SEM and optical micrograph images of an example ZnO TFT. FIG. 8D shows an optical photo showing that the example device is fully transparent. FIG. 8E shows a source-drain current (Id) vs. drain voltage. The example device can be turned off at −20V. FIG. 8F shows log scale Id-Vd curves, and the ON/OFF ratio is about 1,000.

Different approaches can be utilized for the fabrication of the flexible devices, including, as a nonlimiting example, direct deposition of thin films, sol-gel, nanowires, nanotubes, organic and polymeric semiconductors on a flexible polymer substrate, such as PDMS, PI, PMGI, etc. Another example is to use a two-step lift-off process such as the process developed by Xiaolin Zhang of Stanford University, shown by example in FIGS. 9A-9B. FIG. 9A shows a reverse device structure 192 on an Ni coated $SiO_2$/Si substrate 194 and the lift-off in water due to solution hydroxides formed at the Ni and $SiO_2$ interface 196. A follow-up step of removal of the Ni layer leads to fully flexible and transparent TFT devices and arrays.

An example TFT for driving a capacitance or piezoelectric sensor, and other input and output transducers, and reading results (output signals) from the input transducers, is preferably provided by a flexible, large scale TFT array, resulting in an active TFT matrix. An example TFT reader and driver is shown in FIG. 7. Preferably, a large area TFT is provided, and each pixel includes an FET.

An example TFT reader or driver allows integration and individual addressing of multiple devices in an array. Further, an example array structure can reduce the number of electrodes otherwise needed. For example, for an N×N array, individually addressing the devices would require $2N^2+1$ electrodes (sources grounded). On the other hand, an example array addressing requires $2 Log_2N+1$ electrodes (sources grounded). As nonlimiting examples, a flexible TFT, single sensor device can include an 8×8 sensor array reader, and an 8×8 actuator array driver. This can provide, for example, 8×8 sensor arrays and 8×8 array actuators on a flexible substrate, with sensor dimension 100×100 $\mu m^2$.

Another nonlimiting example embodiment provides 8×8 sensors arrays on a flexible substrate, and an 8×8 actuator array at 250×250 μm².

Figure 10A:
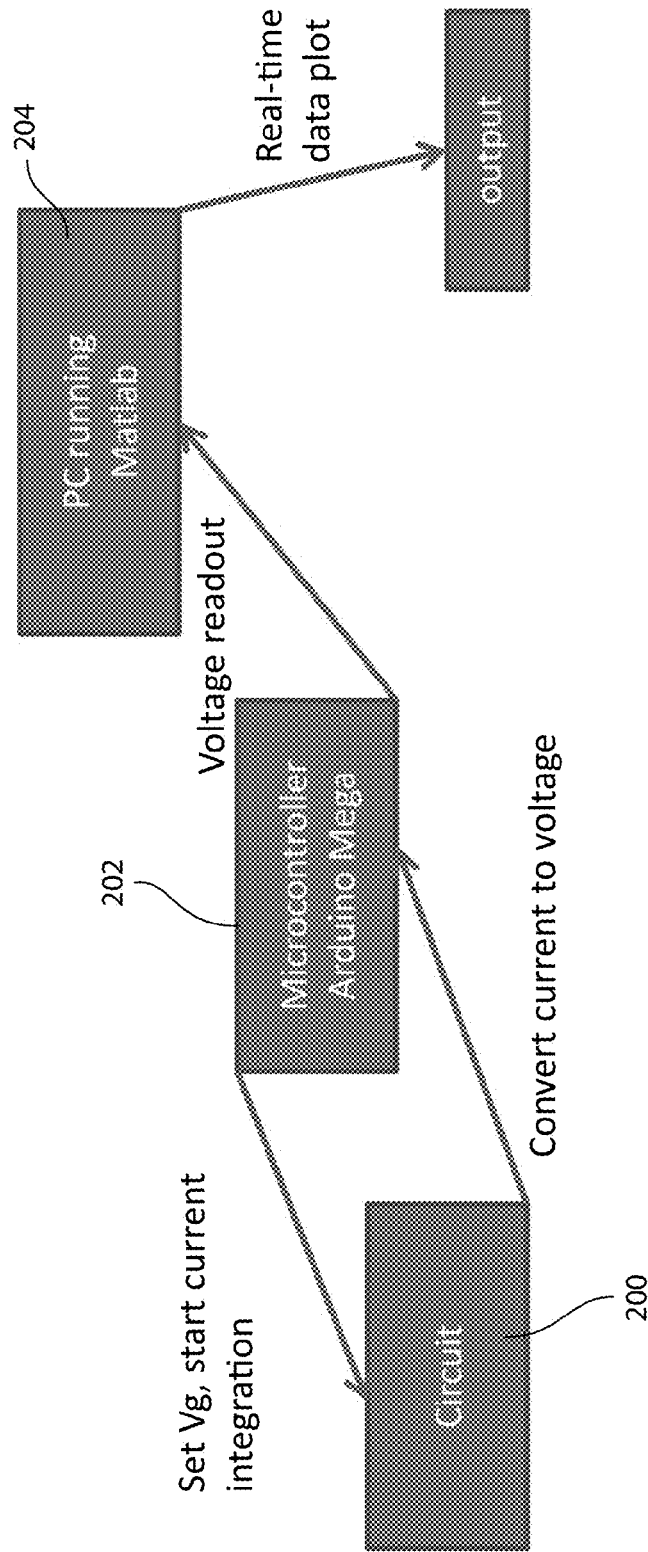
FIG. 10A shows an example embodiment measure scheme, where
Figure 10B:
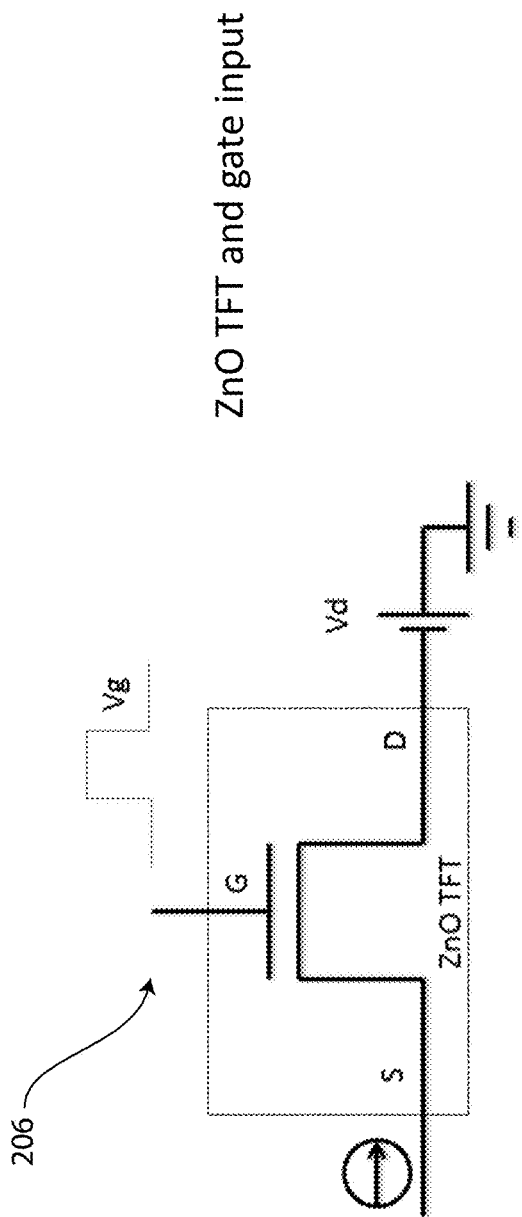
FIGS. 10B-10E show an example measurement circuit for single ZnO:N devices.
Figure 10C:
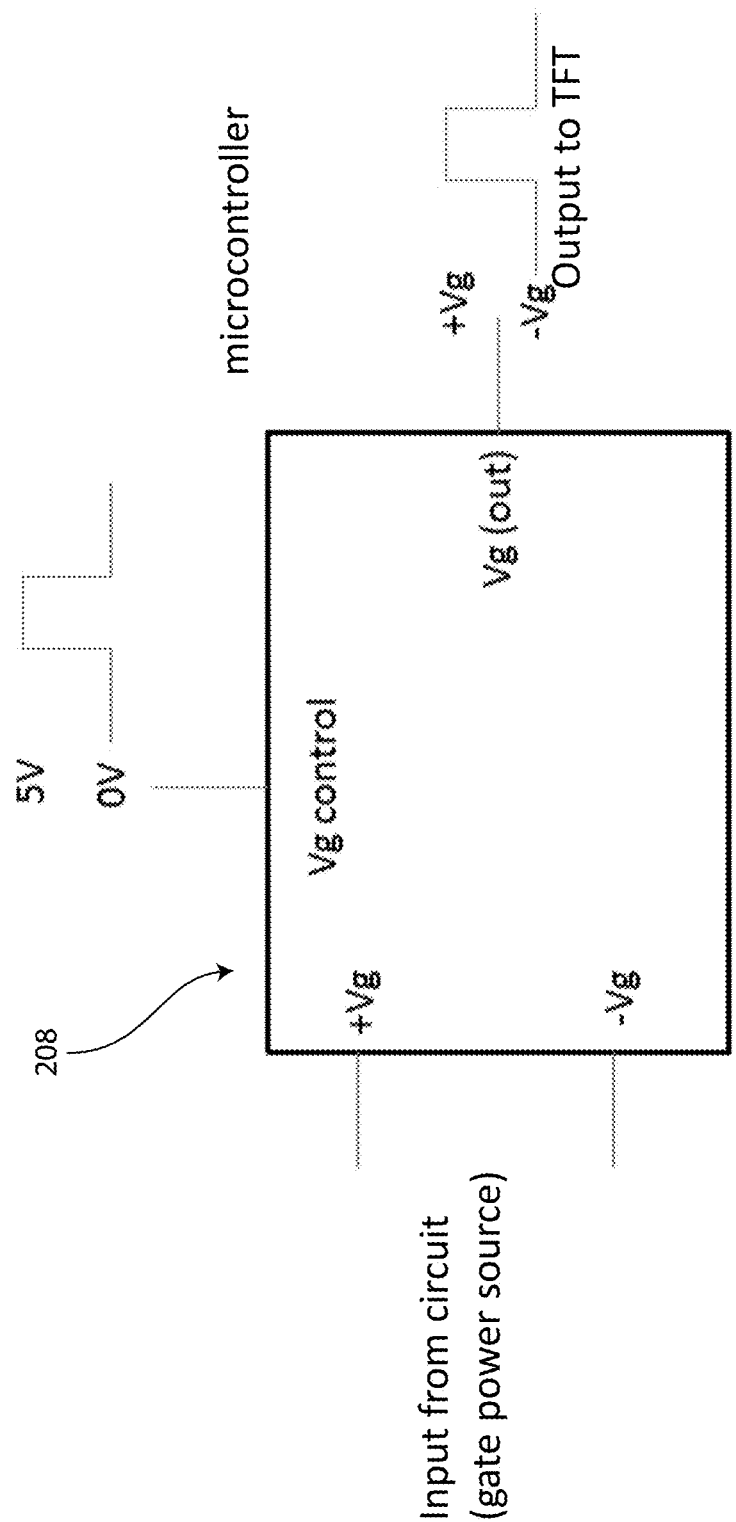
Figure 10D:
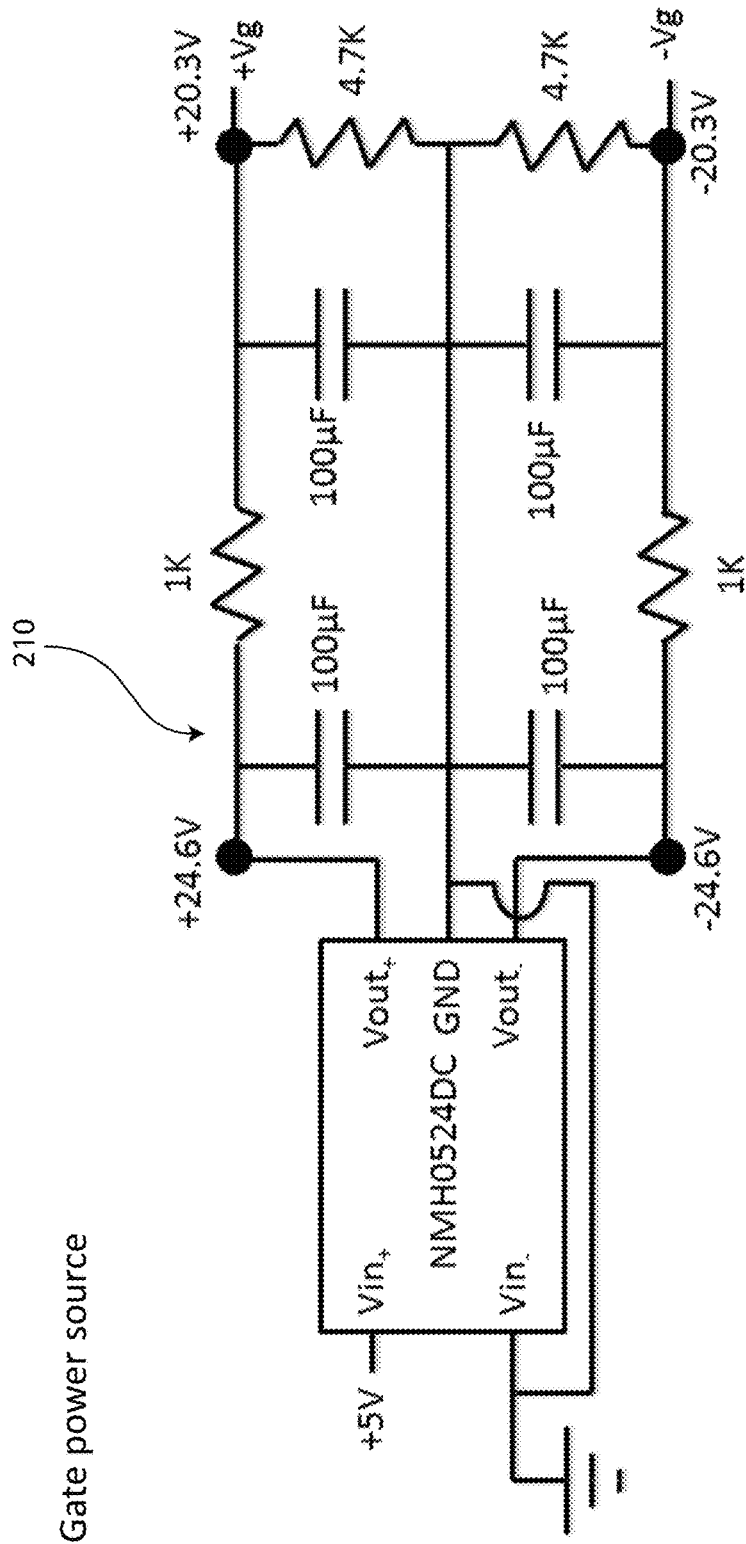
Figure 10E:
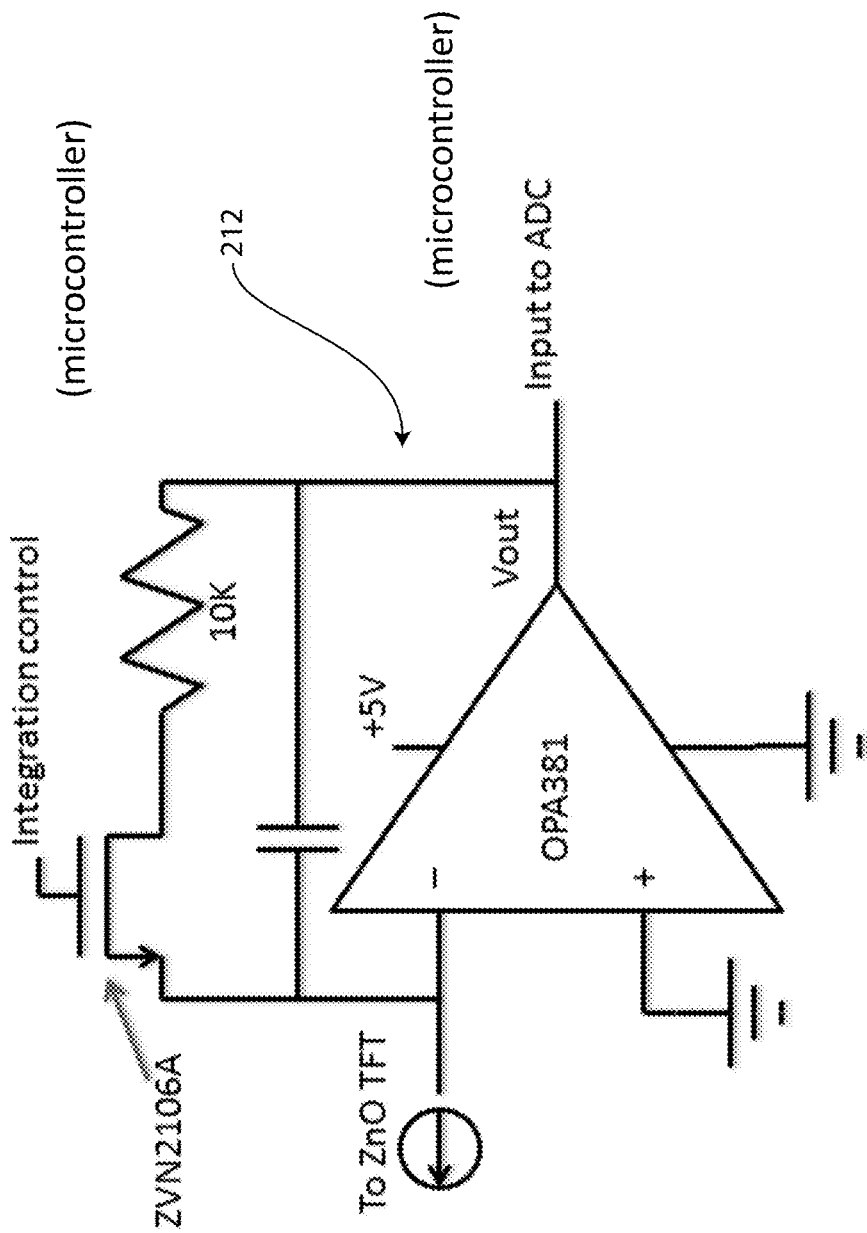
Figure 10F:
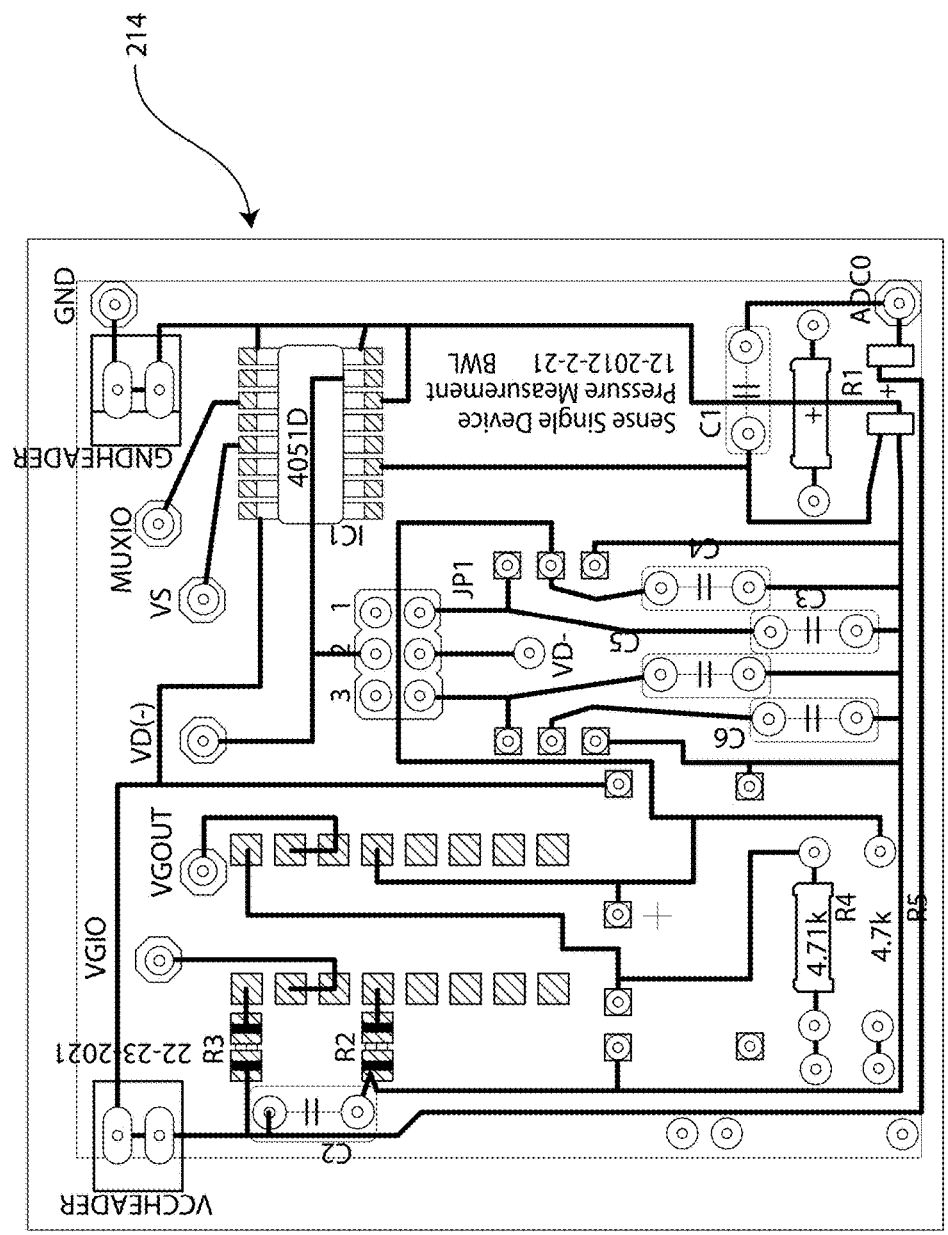
FIG. 10F shows the layout of an example ZnO device readout circuit on a PCB board, where a trans-impedance amplifier is incorporated on board to take advantage of the Arduino's ADC and data can be transmitted to a PC through USB or wirelessly.
Figure 10G:
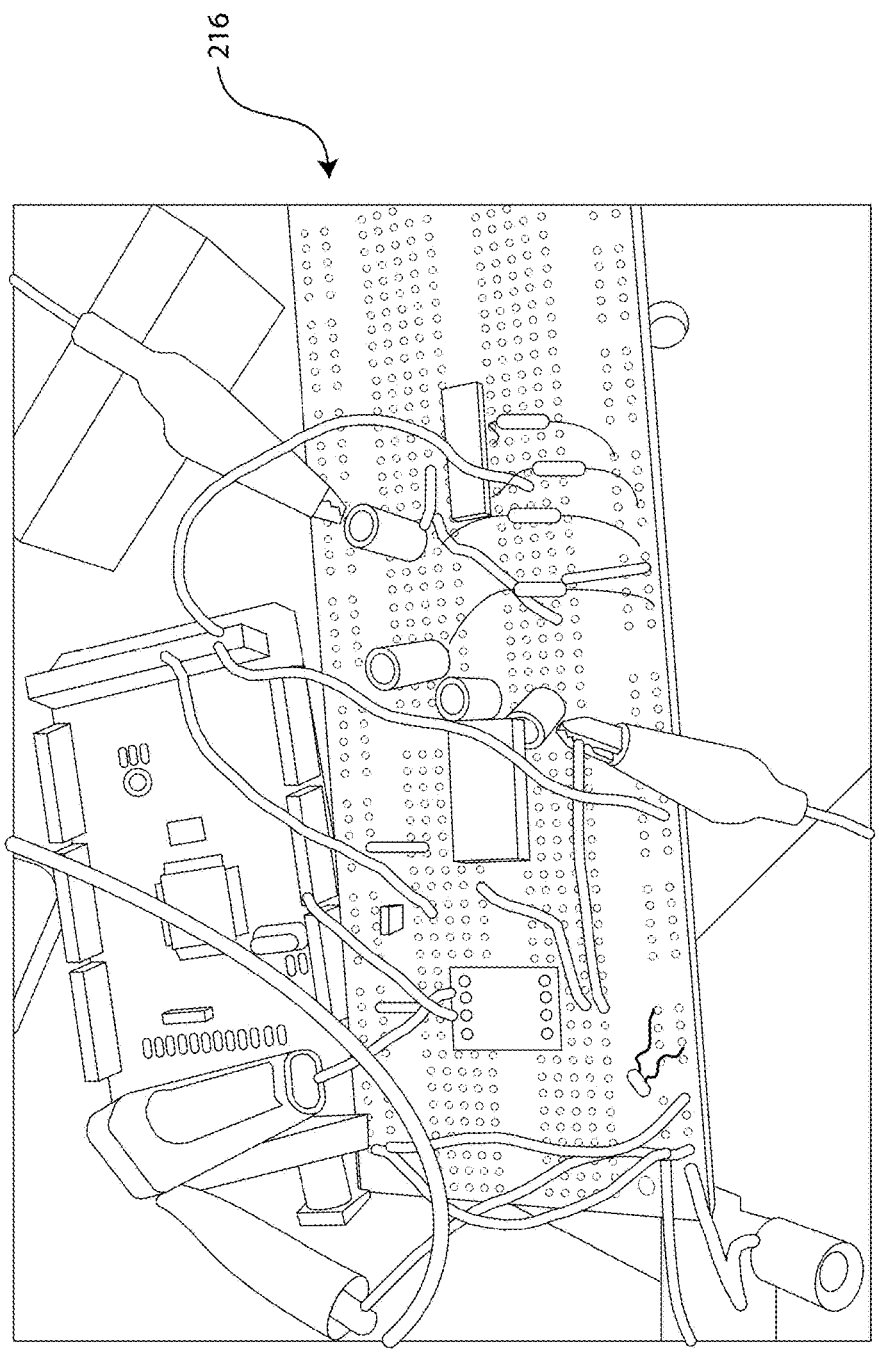
FIG. 10G shows an example reader setup.

FIG. 10A shows the measurement flow chart of a single TFT device. Vg is set for a circuit 200, and current integration is started. Current is converted to voltage. A microcontroller 202 (e.g., Arduino Mega) receives the result, and a voltage readout is provided. A computer 204 (e.g., a PC running suitable instructions) provides a real-time data plot. FIGS. 10B-10E show circuits of an example ZnO TFT device to the gate input and microcontroller, including a ZnO TFT and gate input 206 (FIG. 10B), an input 208 (FIG. 10C), a gate power source 210 (FIG. 10D), and a microcontroller circuit 212 (FIG. 10D). FIGS. 10E-10G show the example circuit layout on a PCB board 214 and a measurement setup 216, respectively.

Figure 11A:
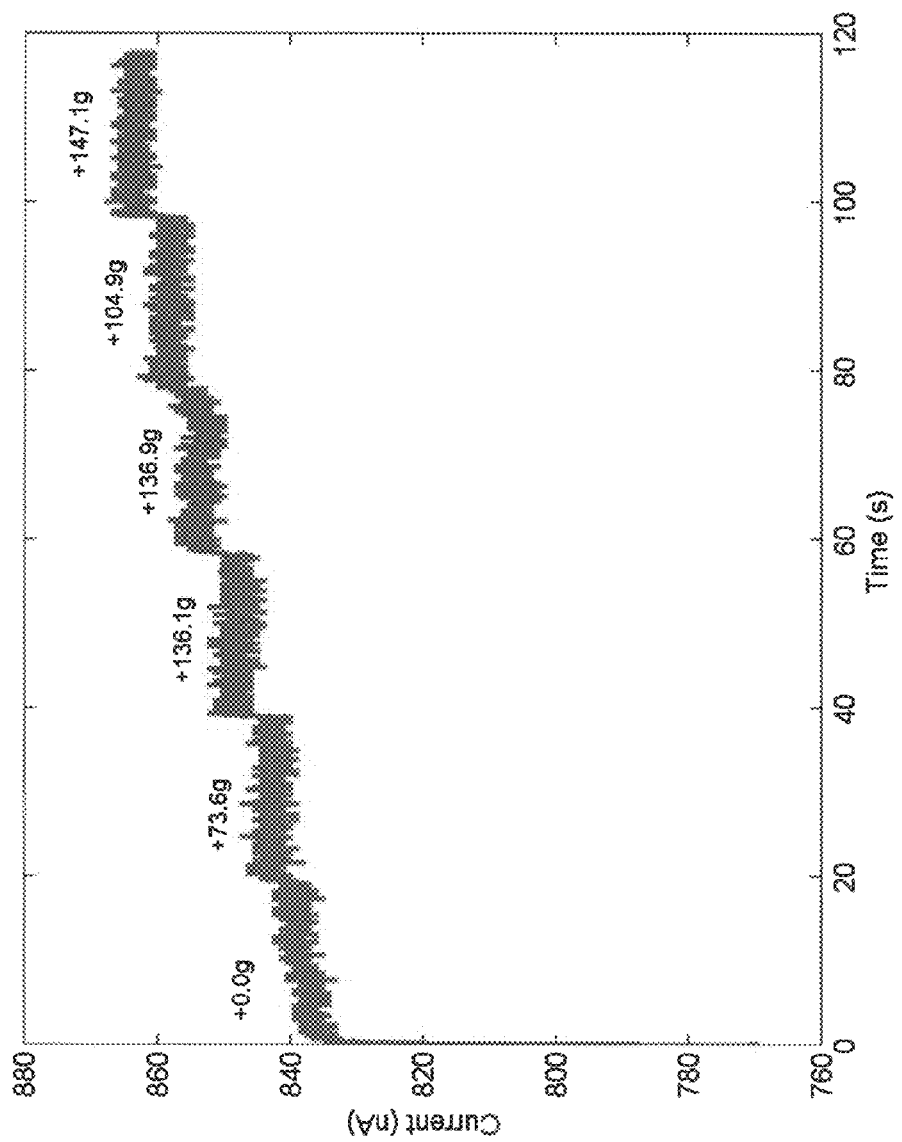
FIGS. 11A-11D show an example embodiment ZnO pressure sensor, where
Figure 11B:
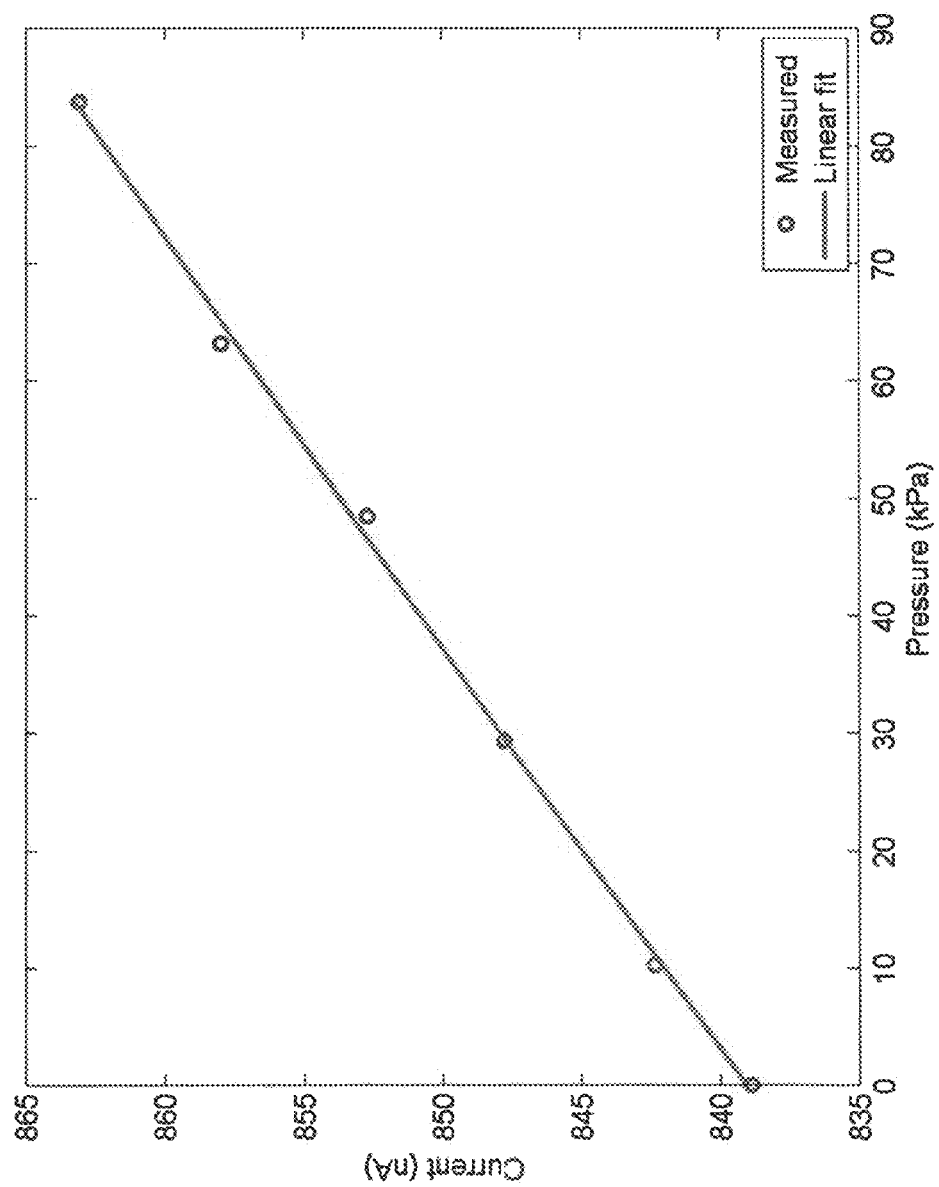
Figure 11C:
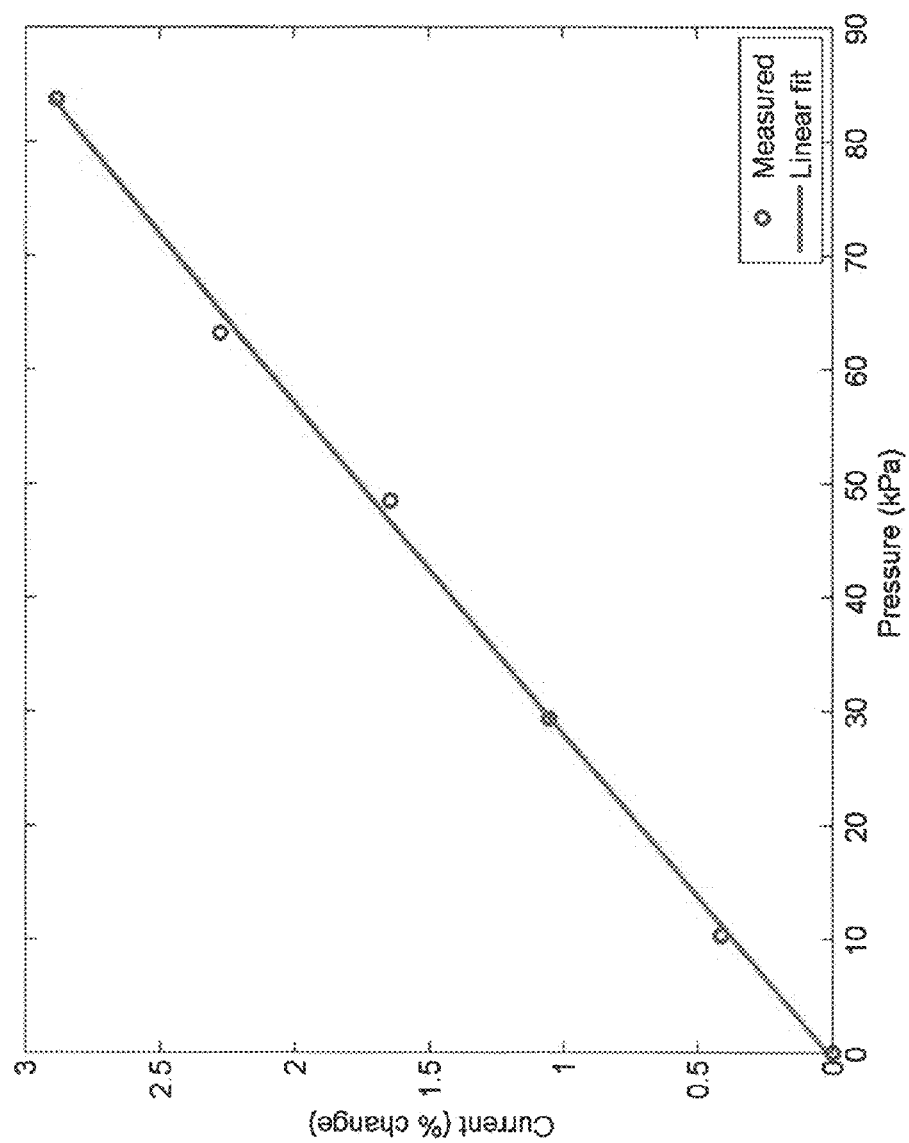
Figure 11D:
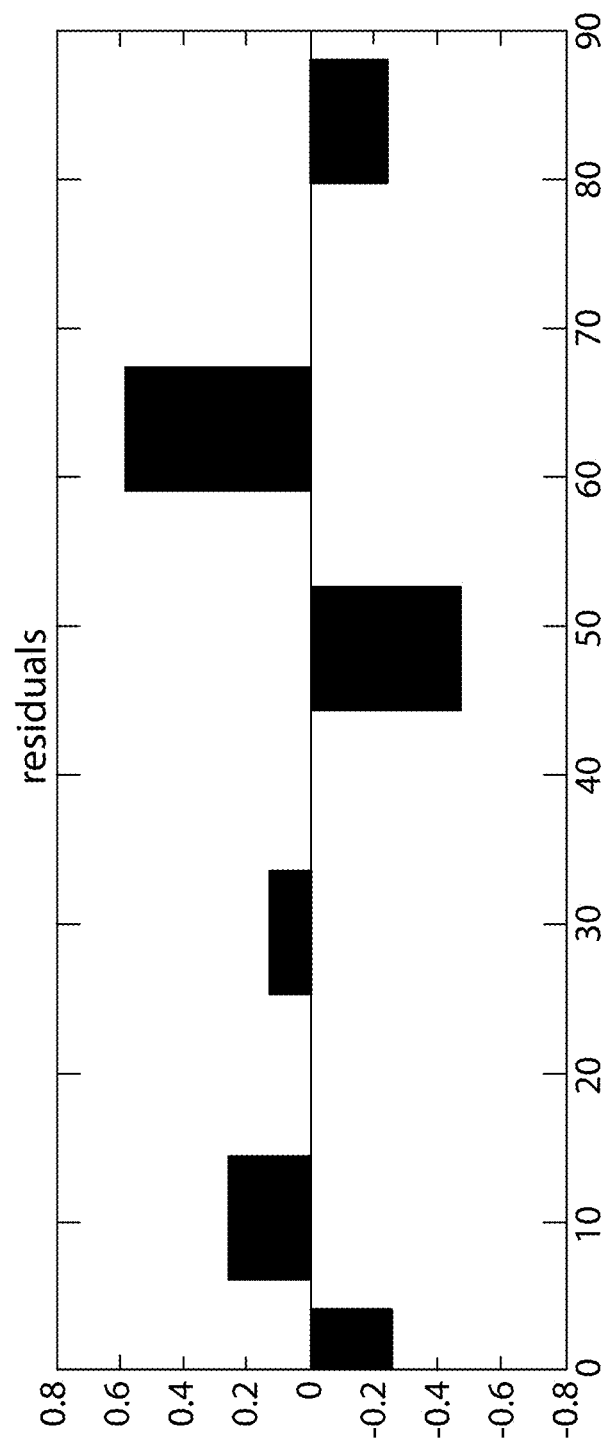

FIG. 11 shows the performance of a single example ZnO thin film pressure sensor, where FIG. 11A shows current change with the addition of weights on the ZnO:N thin film sensor. FIG. 11B shows the current vs. pressure plot. FIG. 11C shows net current change percentage vs. pressure, which is a linear straight line, indicating the very high sensitivity of the example ZnO thin film sensors. FIG. 11D shows the noise level of each measurement at different pressures.

Figure 12:
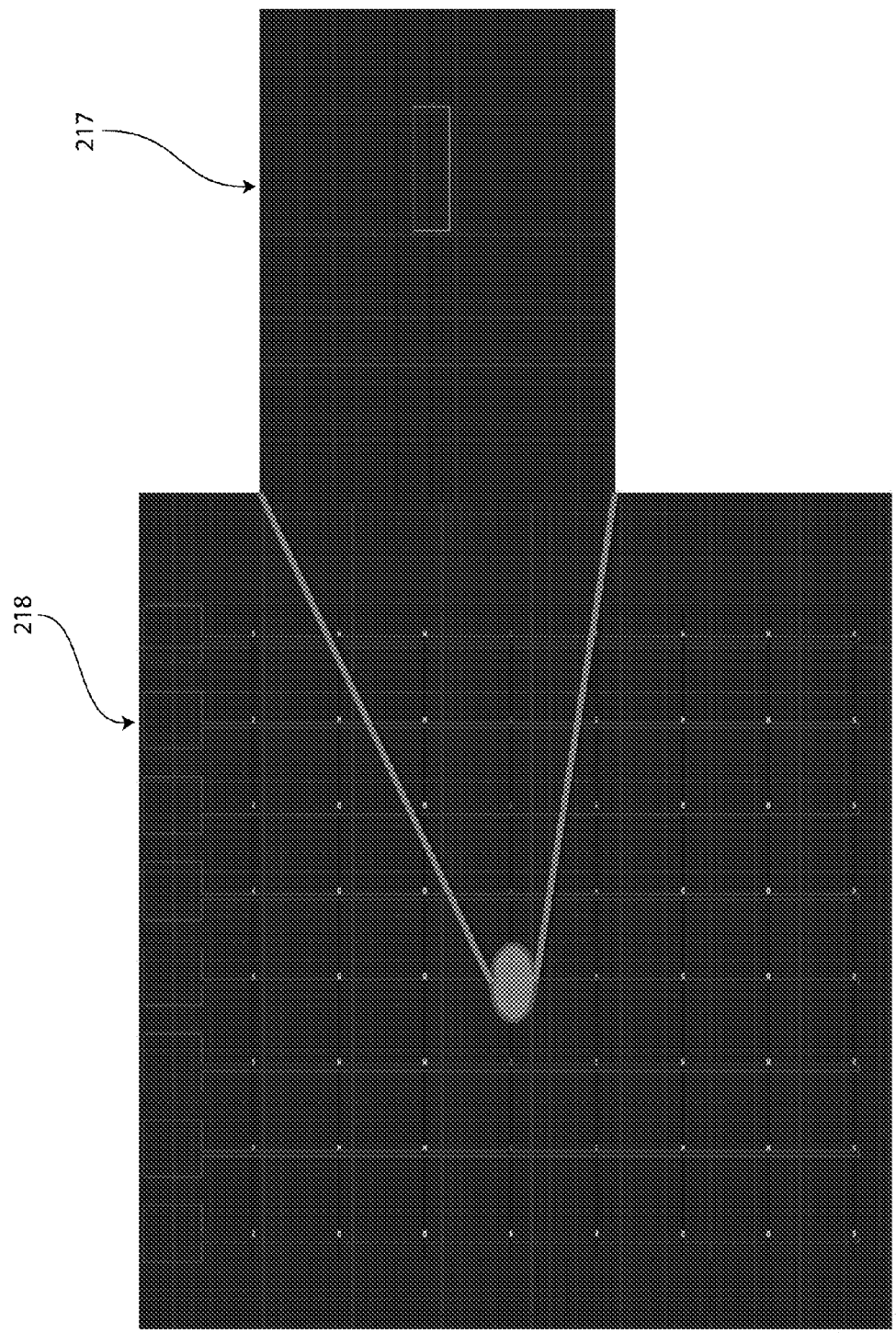
FIG. 12 shows an example embodiment layout of an 8×8 ZnO sensor array.

FIG. 12 shows the layout of an example 8×8 ZnO sensor 217 in a TFT array 218, where the one common source contact (blue) and the separate drain contacts (blue) are in the horizontal direction (as the array is oriented in FIG. 12), and the gate lines (red) are in the vertical direction. The example channel width can be designed and fabricated to be 5, 10, 20, 50, 100, etc. micrometers.

Figure 13A:
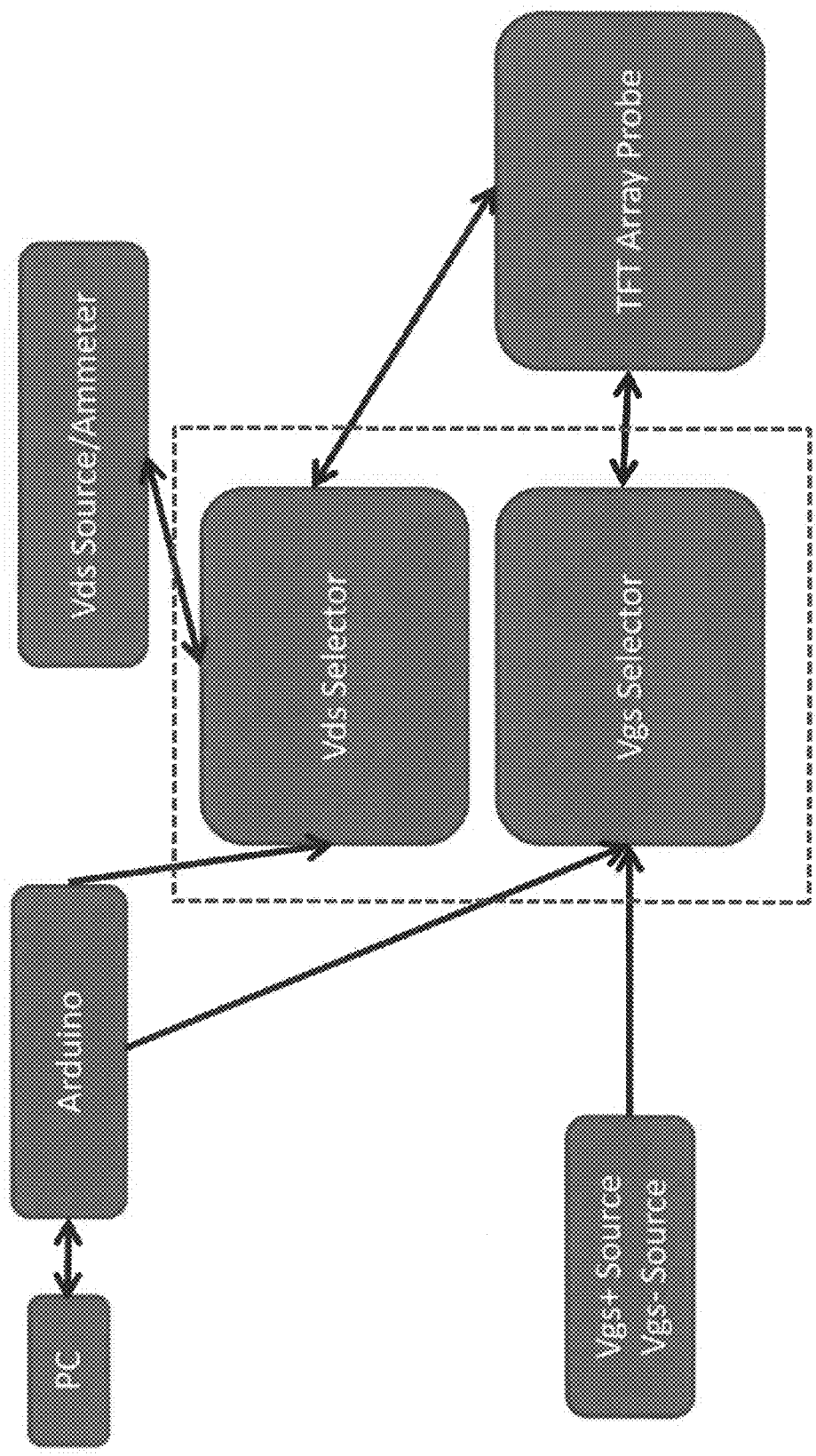
FIGS. 13A-13B show an example embodiment readout circuit for an 8×8 ZnO sensor array, where
Figure 13B:
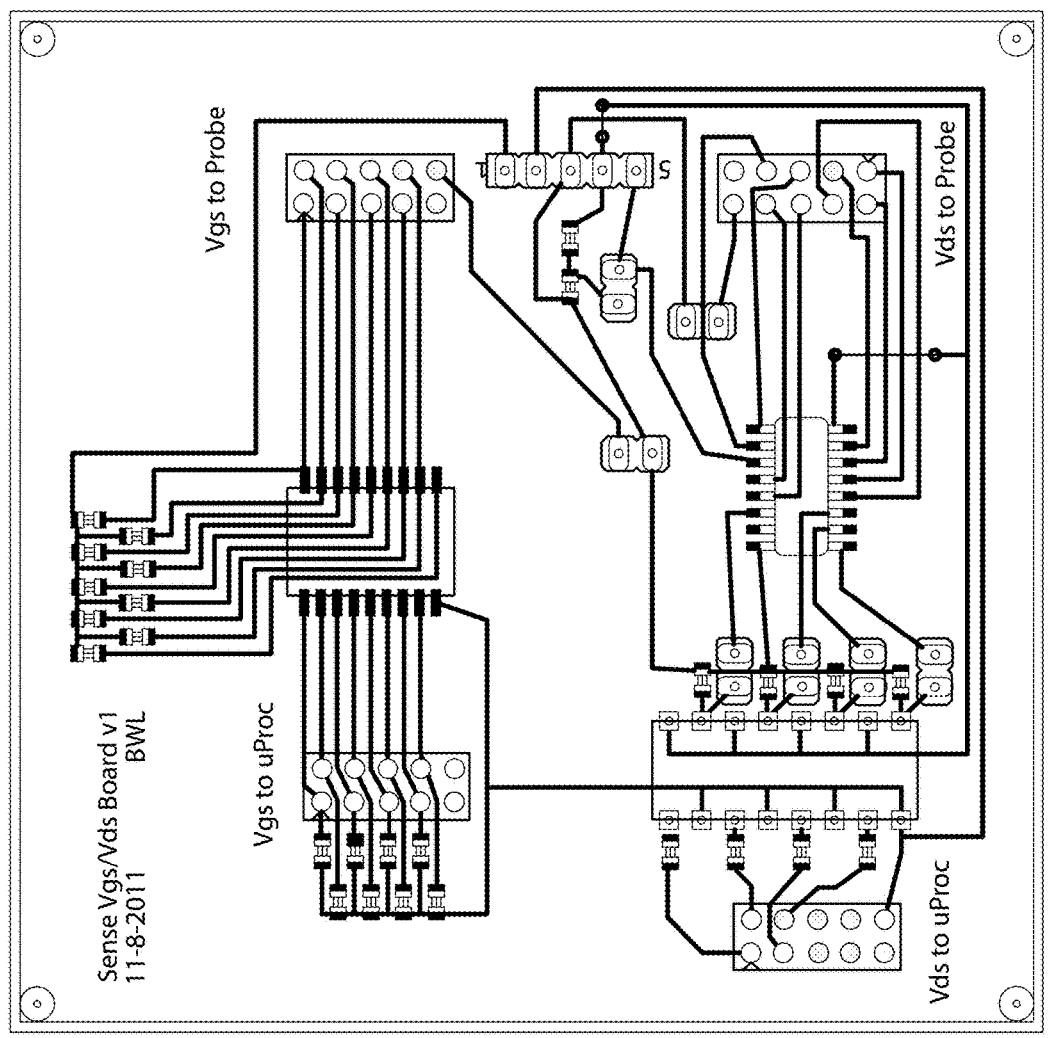

FIG. 13A shows a measurement flow chart of the example TFT array 218, where the single devices are measured by selecting individual Vds and Vgs controlled by a processor, such as but not limited to an Arduino chip. FIG. 13B shows an example circuit layout on a PCB board.

Figure 14A:
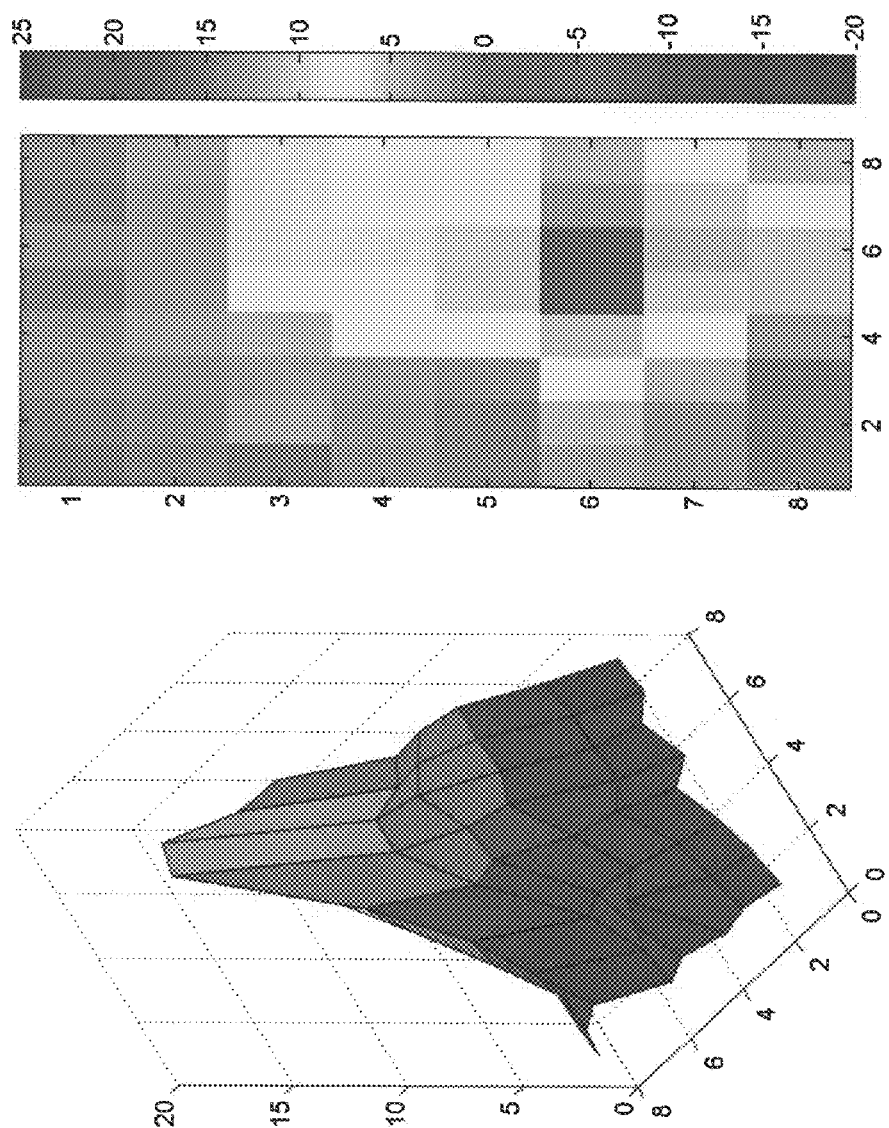
FIGS. 14A-14D show readout signals of an example 8×8 ZnO sensor array, where
Figure 14B:
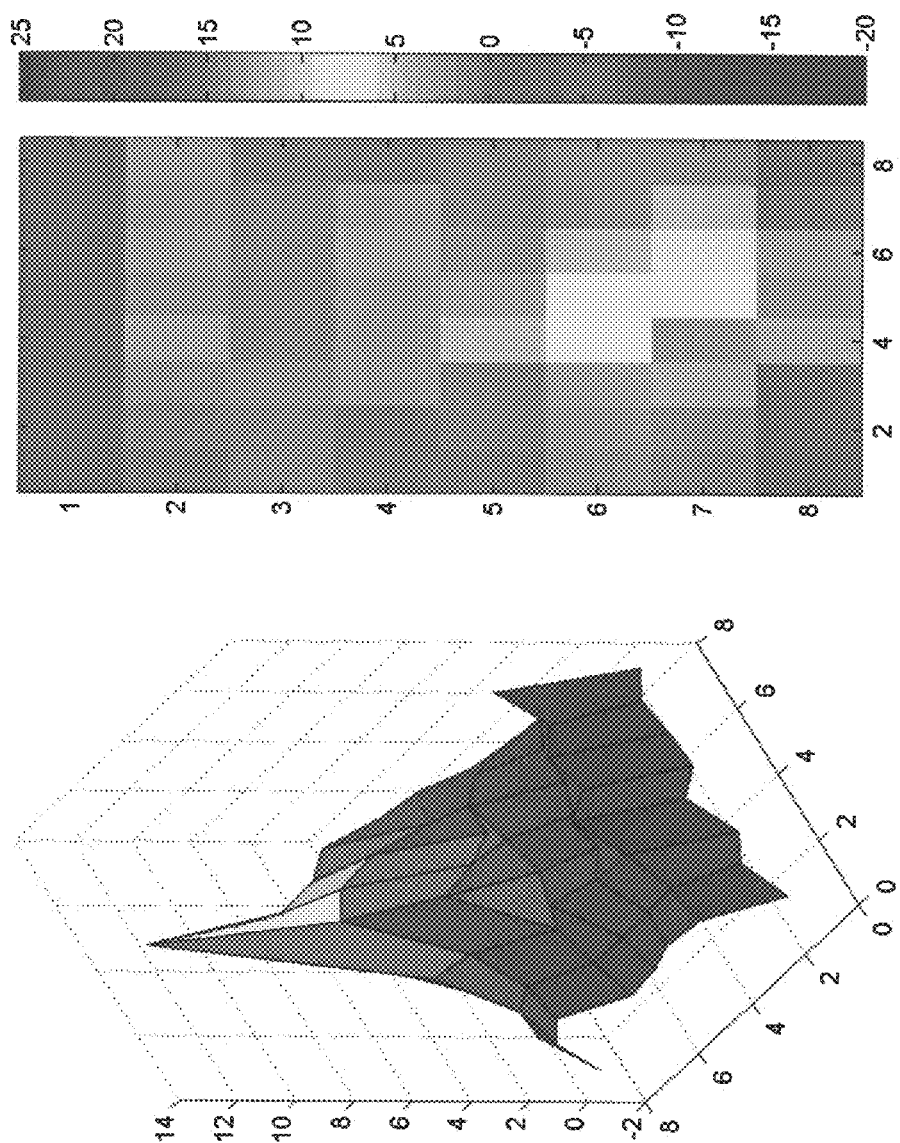
Figure 14C:
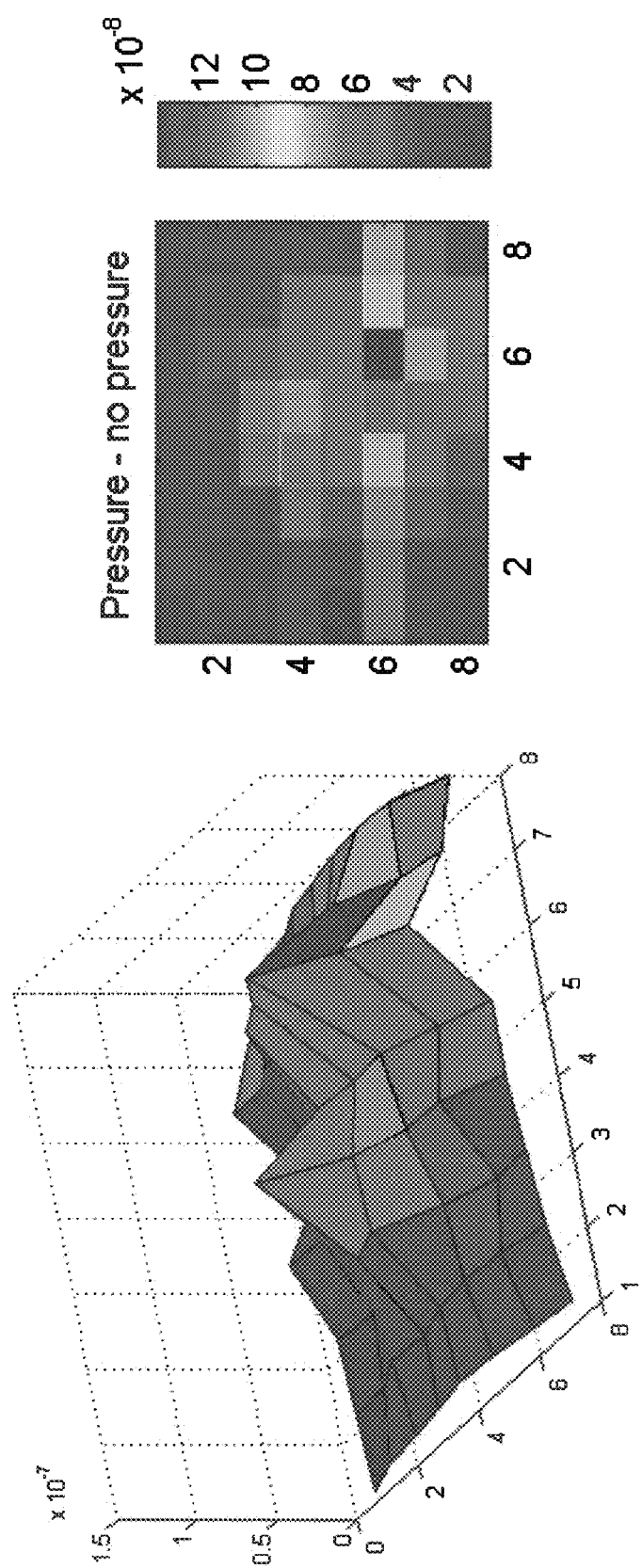
Figure 14D:
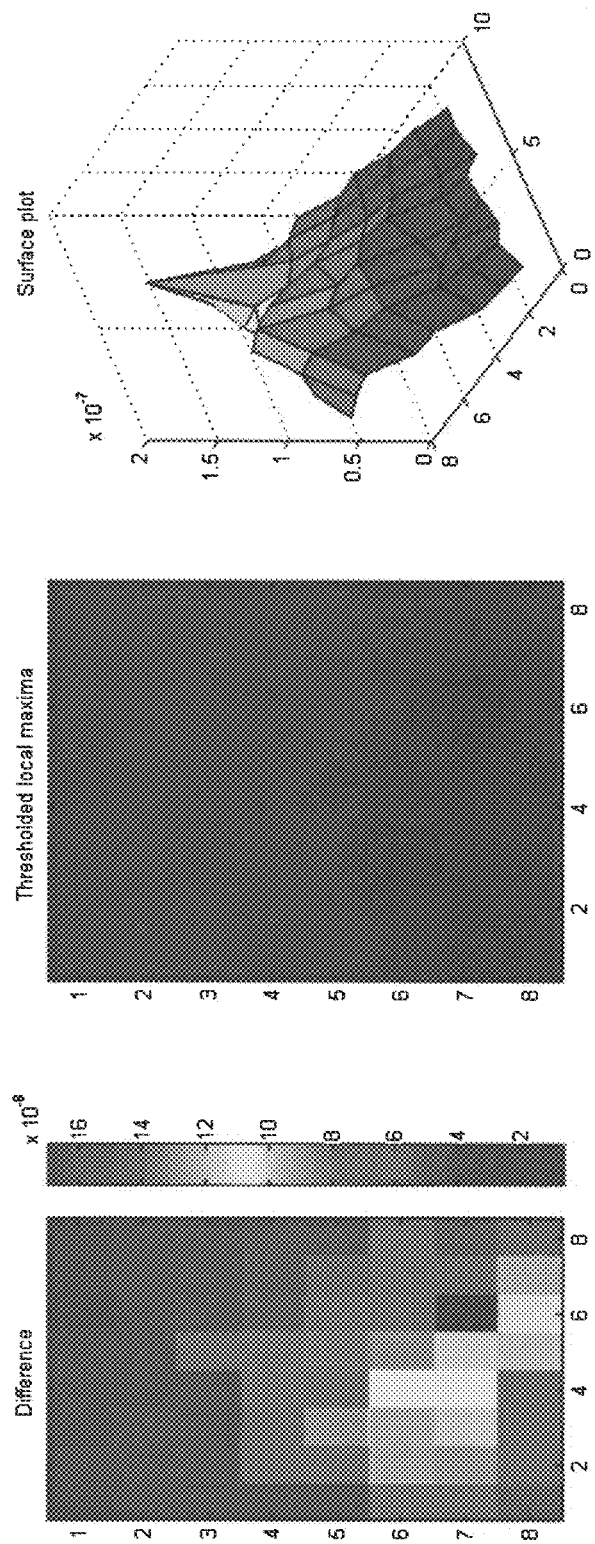

FIGS. 14A and 14B show the measured current of one single pixel in the example 8×8 array. Both 2D current map and 3D surface plots are shown. FIG. 14C shows a surface plot and 2D plot of pressure measurement of 2 pixels (dots) of the example sensor array. FIG. 14D shows the 2D plot, 2D plot of local maximum value, and surface plot of pressure measurement of 2 pixels (dots) of the example sensor array.

Figure 15A:
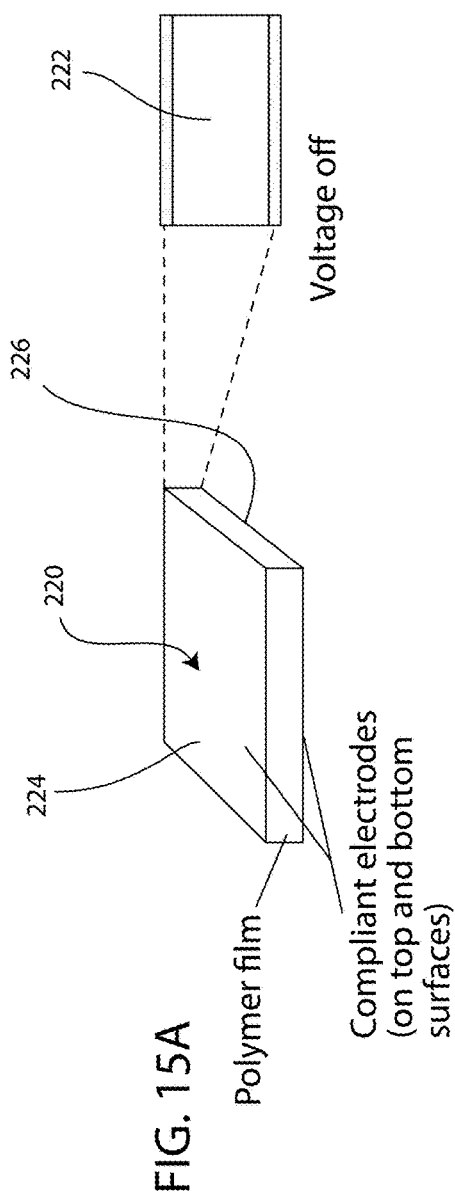
FIGS. 15A-15B schematically show an example electrostatic polymer actuator in a non-actuated (FIG. 15A) and actuated (FIG. 15B) state.
Figure 15B:
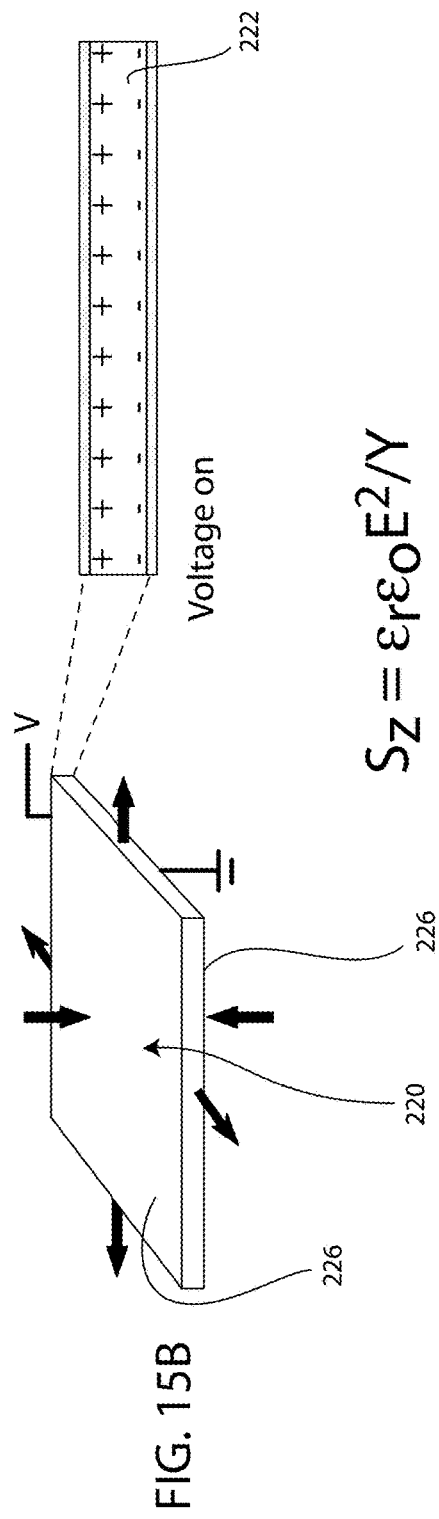

FIGS. 15A-15B and 16A-16B show an example touch output transducer embodied in an electrostatic polymer actuator 220. In operation, the example electrostatic actuators 220 behave as compliant variable capacitors that deform under electrical load due to electrostatic forces. The example electrostatic actuator includes a soft, flexible polymer (e.g., elastomer) dielectric material 222 sandwiched between upper 224 and lower 226 compliant electrodes, such as CNT network, on top and bottom surfaces, respectively. The upper electrode 224 is coupled to a voltage source V (e.g., from the driver matrix), and the lower electrode 226 is grounded. When voltage is turned off, the electrodes 224, 226 remain in a non-deformed state (FIGS. 15A and 15A). When voltage is on (FIGS. 15B and 16B), electrostatic forces are generated, pulling the upper and lower electrodes 224, 226 towards one another. This deforms the flexible dielectric material 222, increasing the active (planar surface) area and lowering the height of the actuator 220.

FIGS. 17A-17I show arrays 230 of additional example touch output transducers for providing tactile feedback in various respective actuation states, each embodied in a diaphragm actuator. Each diaphragm actuator is disposed and fabricated on a thin, flexible plastic substrate such as polyimide (PI). The example diaphragm actuators have a 1.5 mm dot size with a dot-to-dot spacing of 2.5 mm. Similar to the electrostatic actuator 220 in FIGS. 15-16, each diaphragm actuator includes an upper compliant electrode, a lower compliant electrode, and a flexible polymer (e.g., elastomer) dielectric material disposed between the upper and lower electrode to form a general dot shape. The array of diaphragm actuators can be formed by depositing an array of flexible dielectric polymer (e.g., elastomer) on the lower flexible electrode, and PI. An example actuation causes an increase in the active area of the diaphragm actuator, which results in a vertical displacement.

The example diaphragm actuators can be operated in constant or pulsed voltage at various frequencies via suitable actuators (e.g., the TFT active matrix) to provide different tactile sensations. Such example diaphragm actuators are capable of dynamic tactile feedback where fast response and low forces are desired (e.g., 0.1-100 Hz).

Particular example diaphragm actuators such as those shown in FIGS. 17A-17H provide a vertical displacement of over 0.5 mm, which is the required dot height for Braille. By providing arrays of example diaphragm actuators in sufficient numbers to represent Braille symbols, and selectively actuating individual diaphragm actuators, a communication system can be provided. Such arrays of actuators with suitable drivers, processors, power supplies, etc., can be disposed on many devices (e.g., mobile phone (including smart phones), electronic book reader, computer, tablet computer, etc., electronic panels, signs, etc., or as a peripheral to another device, for providing feedback. FIG. 17I shows an example enclosed array of diaphragm actuators.

The response speed of example actuators is preferably moderate to fast depending on the flexible polymer (e.g., elastomer) used. In a nonlimiting example embodiment electrostatic actuator, the flexible polymer is embodied in highly prestrained acrylic elastomers (e.g., 3M VHB 4910/4905 series adhesive) and silicon elastomers. Peak performance values for both materials, measured using planar expansion actuators are provided in Table 1 below. The acrylic films are capable of extremely high actuation strains, in excess of 300% in area, and moderate stress outputs (7.2 MPa peak blocking pressure), though viscoelastic effects in some an embodiment may limit their application frequency range to a few tens of Hz. Silicones are capable of more modest actuation strains and stresses (e.g., ~60% area strain and 3 MPa respectively) due to their higher stiffness and lower dielectric constant, but they are capable of being operated at higher frequencies, e.g., up to a few hundred Hz, at a reasonable level of performance. Actuator pressure (p) of the actuator is given by $$= \varepsilon_0 \varepsilon_r E^2 = \varepsilon_r \varepsilon_0 \frac{V^2}{d^2},$$

where $\varepsilon_0$ and $\varepsilon_r$ are the permittivity of free space and dielectric constant respectively, E is the electric field across the film, V is the applied voltage, and d is the film thickness.

TABLE 1

Performance of Dielectric Elastomer Materials [3, 4]

| Material | Actuation Strain (%) | | Actuation Pressure (MPa) | Maximum Efficiency (%) | Frequency Response |
|---|---|---|---|---|---|
| | Planar | Thickness | | | |
| VHB Acrylic | ~300 | 75 | 7.2 | 60-80 | Medium |
| Silicone | 63 | 40 | 3.0 | 90 | Fast |
| IPN | 300 | 75 | 5.1 | — | Medium |

Figure 16B:
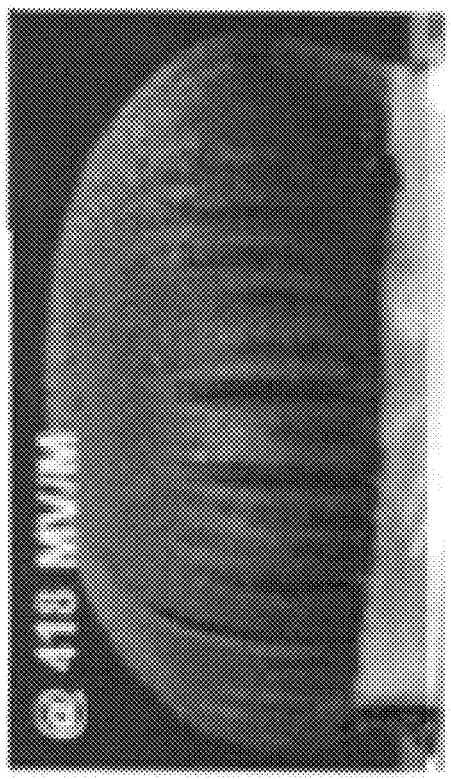
FIGS. 16A-16B show an example electrostatic polymer actuator (Qibing Pei, UCLA), in a non-actuated (FIG. 16A) and actuated (FIG. 16B) state.
Figure 16A:
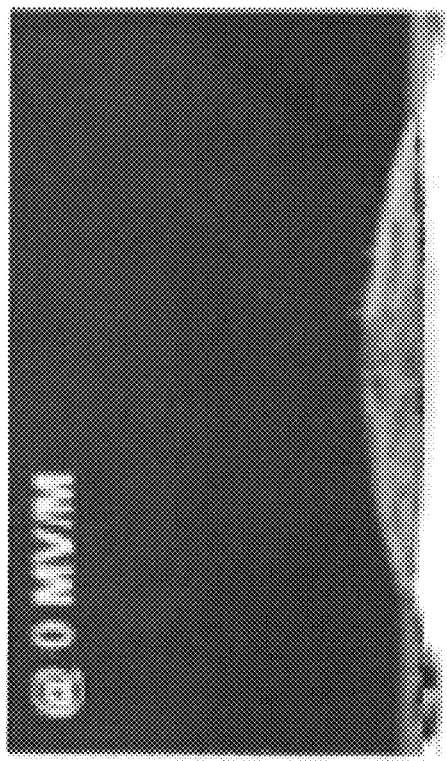
Figures 17A, 17B, 17C, 17D, 17E, 17F, 17G, 17H:
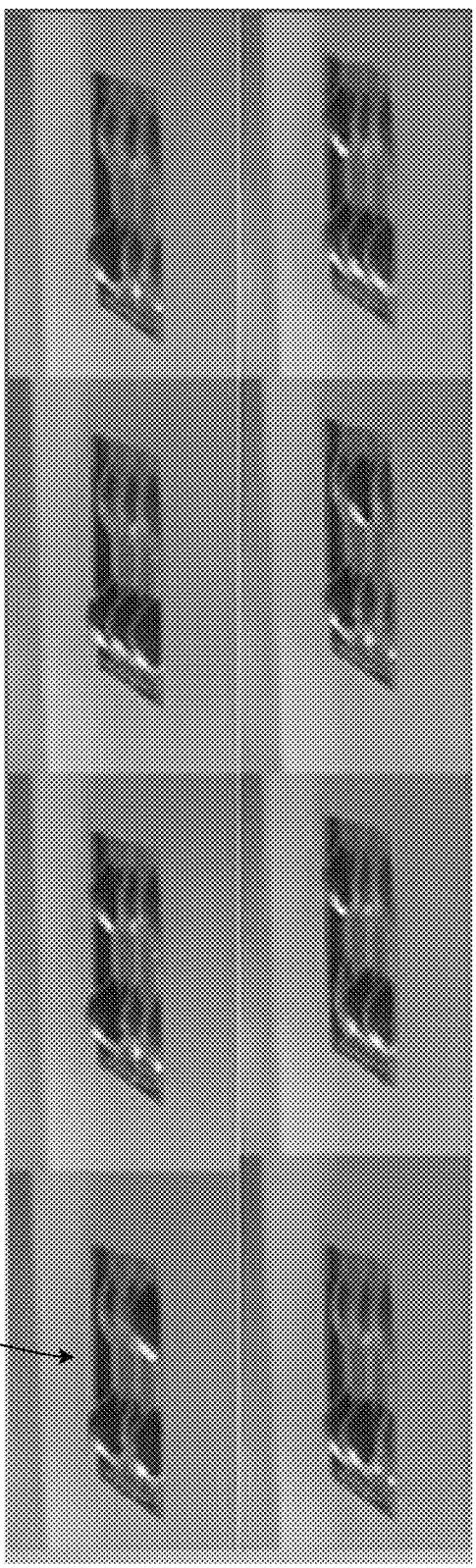
Figure 171:
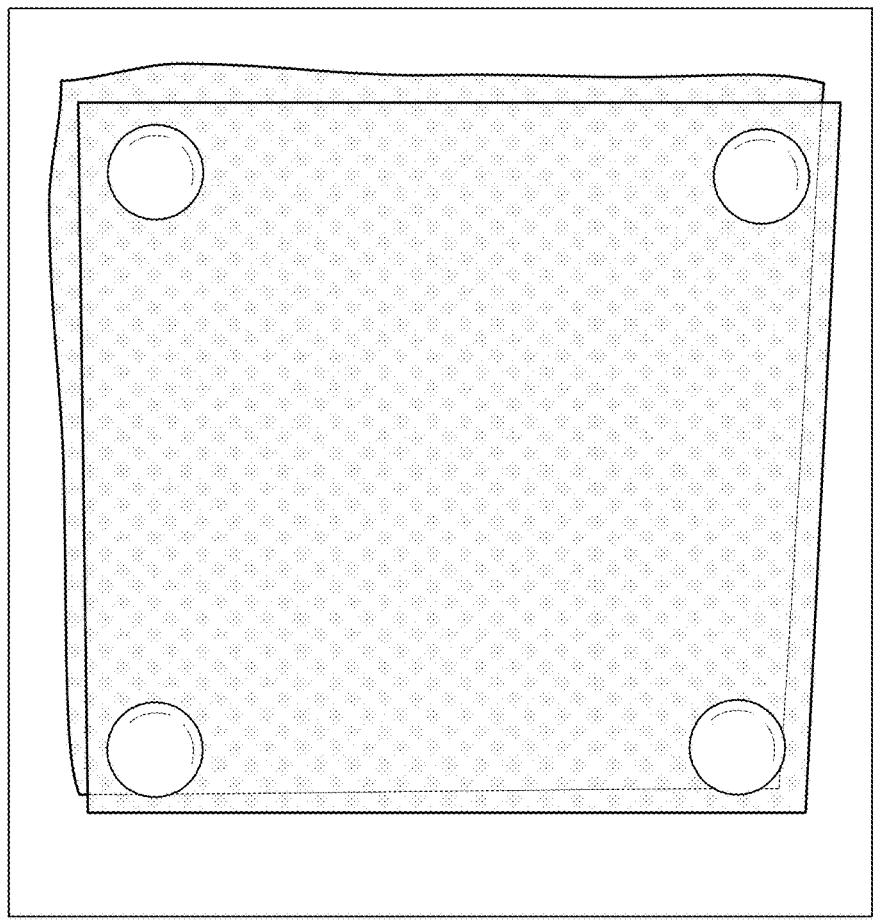

FIGS. 16A-16B show example diaphragm actuators based on an interpenetrating polymer networks (IPN) film, where FIG. 16A shows the actuator at 0 MV/m, and FIG. 16B shows the actuator at 418 MV/m. IPN films are formed by first prestraining the host acrylic elastomer, swelling it with a multifunctional additive monomer, and then curing the additive to form a secondary network.

In operation, the IPN film is under a constant, small pressure maintained by the air pressure in the diaphragm chamber. Upon releasing the prestrain on the film, the host acrylic network will attempt to return to its relaxed state, thereby compressing the additive network. The additive network will therefore act to restrict the host network from returning to its relaxed state, and a portion of the prestrain will be preserved. The resulting freestanding films can be actuated to strains comparable to those achieved using the highly prestrained acrylic elastomers, as shown in FIGS. 16A-16B. A comparison of the actuation properties of the two materials is shown in Table 1 above. Strains in excess of 300% have been achieved in example diaphragm-type actuators.

The actuation pressure will depend on the material, (e.g., dielectric constant, leakage current, etc.) For the silicone in Table 1 above, an example actuator can generate 3 MPa at 350 MV/m. Thus, assuming PDMS of about 5 micron thickness has a dielectric constant of 3 and losses can be neglected, the pressure equation above indicates that the example actuator in FIGS. 16A-16B can generate ~10 kPa of actuation pressure (e.g., approximately equivalent to gentle touch) at 10 V/μm.

Another nonlimiting example of a large actuator array is based on PDMS micro-chambers. FIGS. 18A-18C show a micro liquid-vapor actuators array 232 according to an embodiment, where vertical diaphragm 234 actuation can be accomplished due to the volume expansion from liquid (for example water) vaporization inside the micro fluidic chamber 236 upon heating. FIG. 18A shows an example structure of the micro fluidic chambers 236 associated to addressable micro heater arrays 238 (non-actuated state). In operation, the selected micro heater 238 is turned on (e.g., addressed by a TFT array), whereas the liquid (e.g., water) quickly vaporizes and causes a very large volume expansion, which leads to vertical actuation of the diagraphm 234, as shown in FIG. 18B (actuated state). FIG. 18C shows a top view of the micro actuator arrays 232. To help achieve the vertical expansion, the sidewalls of each cell can be substantially rigid and nonexpandable in horizontal directions. Other nonlimiting example arrays include piezoelectric thin film or polymer actuator arrays, CNTs, pneumatic actuators, shape memory alloys (SMAs) devices, etc.

Figure 19A:
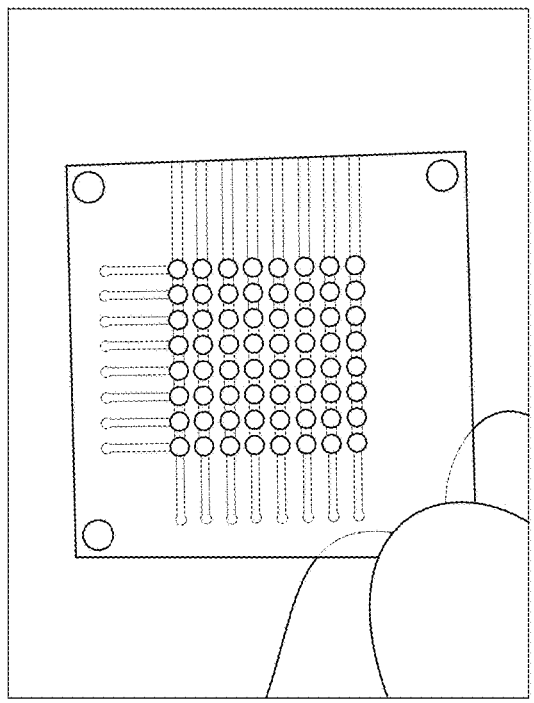
FIG. 19 shows an embodiment driver circuit for an 8×8 electroelastic polymer actuator array.
Figure 19B:
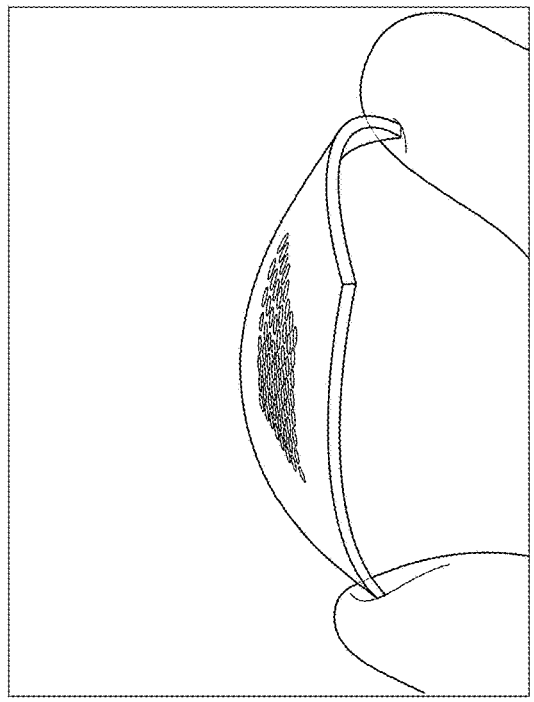
Figure 19C:
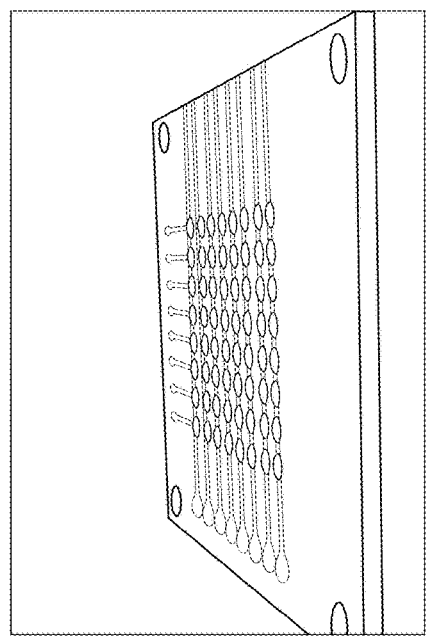

By connecting the TFT array reader with high voltage relays, an actuator array driver can be built to individually address the 8×8 (for example) electroelastic polymer actuator array. FIG. 19A-19C are photos of an example semi-flexible PDMS/acrylic polymer IPN actuator array with a dot diameter of 0.5 mm.

Figure 20A:
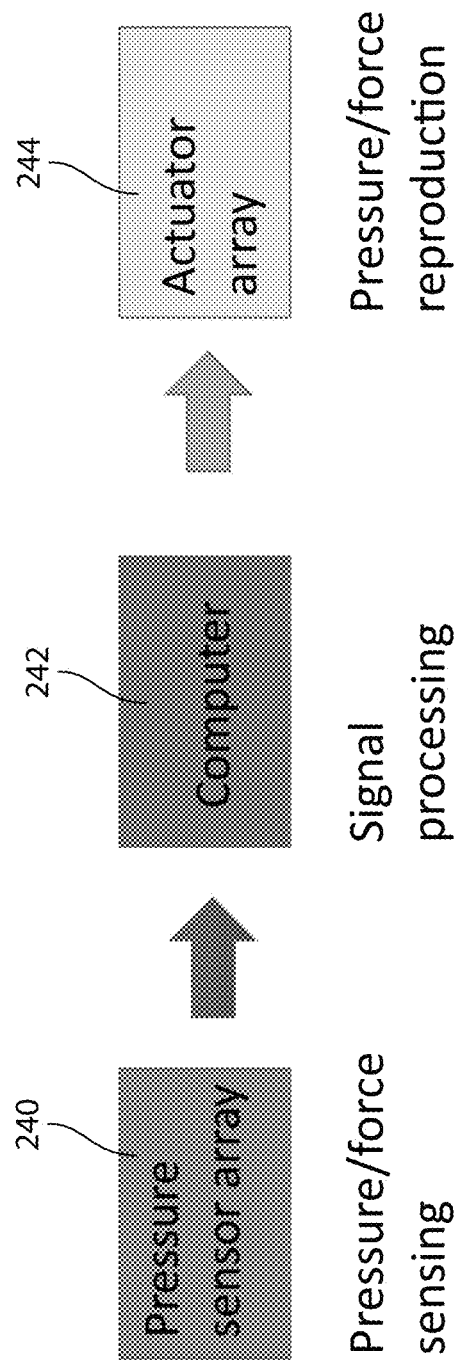
FIGS. 20A-20B show an example demonstration of pressure sensing and reproduction, where
Figure 20B:
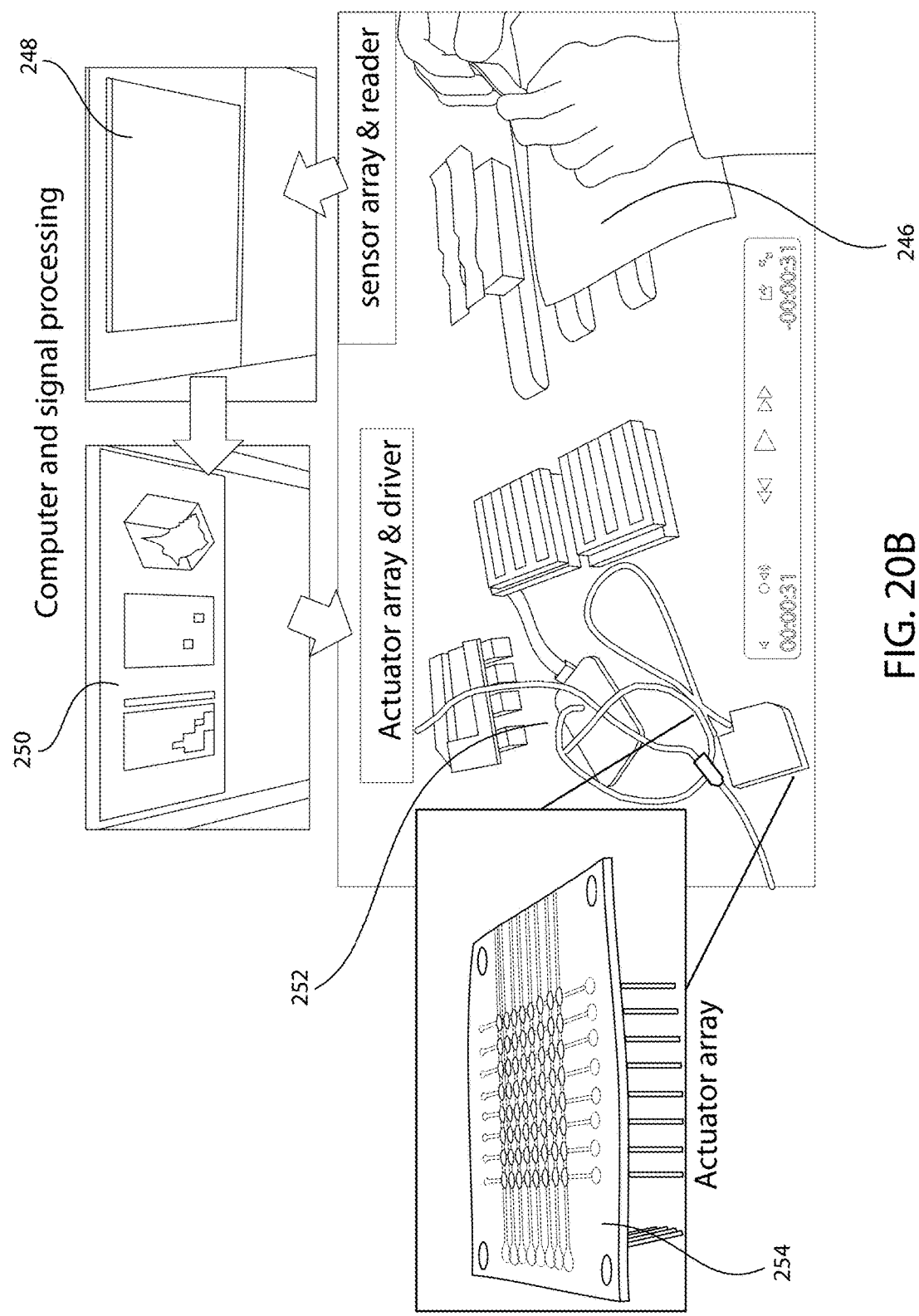

FIG. 20A shows an example method for recording and reproduction of touch sense, where force and pressure are detected 240 by an array of pressure sensors (for example), and digitized 242, which consequently are used to drive the actuation of an actuator array (for example) 244 to accomplish the reproduction of force. In some example devices, a large scale addressable sensor array is fabricated with a-Si and ZnO TFTs, coupled to an ITO gate, as shown in FIGS. 8 and 12. Large scale addressable PDMS and PDMS/acrylic IPN thin film actuators can be sandwiched between a common electrode and a patterned electrode, for instance, to provide integration of the sensor array and actuator array. As an example, FIG. 20B shows that in operation, by pressing on two specific pixels (dots), (3,6) and (6,7), simultaneously on a 8×8 ZnO:N sensor/TFT array 246, a computer 248 collects the signal and processes the signal to display the sensing results on a screen 250, while also sending a processed signal to an actuator array driver 252 and actuating the two specific pixels on an actuator array 254 (brighter spots on the polymer actuator array due to light reflection, highlighted by the two red circles).

Additional touch input and output transducers according to an embodiment detect and output touch sensations relating to moisture. As with the force or pressure related input and output transducers above, example moisture-related input and output transducers allow the capture (e.g., collection and recording), integration, and reproduction or recreation of moisture-related sensations. FIG. 21 shows a FET based moisture or humidity sensor 260, where the conductance of a channel, e.g., TFT channel 262, changes with the different level of humidity, e.g., from water vapor 264. Nonlimited example embodiment moisture input can be from MOSFET sensors, metal oxide sensors, nanowire and nanotube sensors, sol-gel oxide sensors, organic and polymeric sensors, optical sensors, etc.

FIGS. 22A-22C show a moisture or water vapor micro chamber array 270 according to an embodiment. FIG. 22A shows a structure including micro fluidic chambers 272 associated to addressable micro heater arrays 274. At OFF state (FIG. 22A), the heaters 274 are at cold state and the microfluidic valves 276 are shut. When a signal is sent from the processor (e.g., computer) to the driver 278, it turns on the respective heater 274 while opening up the valve 276. FIG. 22B shows releasing of water vapor 280 upon heating and by simultaneous opening of the control microfluidic valve 276 (ON state) and allow adjusting of the humidity. FIG. 22C shows a top view of the example micro fluidic chamber arrays 272. A humidity sensor or an array of humidity sensors (not shown in FIG. 22C) are integrated to the output transducer. The sensing signal collects humidity information and sends the information to the feedback control processor, which shuts off the valve 276 and turns off the heater 274 when the selected humidity level is reached. The micro resistive heaters 274 are constructed in an embodiment using metal wires or coils such as Pt.

Additional touch input and output transducers according to an embodiment detect and output touch sensations relating to temperature. As with the force or pressure related input and output transducers above, example temperature-related input and output transducers allow the capture (e.g., collection and recording), integration, and reproduction or recreation of temperature-related sensations. Though technologies exist for tracking temperature over time with feedback mechanism (e.g., programmable thermostats in indoor environments), example temperature input and output transducers allow recording and reproduction of temperature sensation on a closer scale to that sensed by humans. FIG. 23A shows a summary of example micro temperature sensor technologies, including Si and Ge thermistors, resistance temperature detectors (RTDs), thermocouples, acoustic and optical, in comparison to the human skin of the resolution or detection sensitivity.

In an example embodiment, temperature input transducers include resistance temperature detectors (RTDs) for temperature sensing. RTDs have a resistance that strongly varies with temperature. They are highly sensitive and have very reproducible resistance vs. temperature properties. Nonlimiting example temperature output transducers use thin filament based heaters for temperature reproduction. Readout circuitry can be provided, as will be appreciated by those of ordinary skill in the art, for receiving the temperature input signals and transmitting them to the processor.

FIGS. 23B-23G show an example pixel embodied in a micro temperature sensor 280, which provides one sensor in a high-resolution array. The temperature sensor 280, which in example embodiment is an Si MOSFET temperature sensor, can be driven and addressed by a TFT such as but not limited to a p-Si TFT, which can be part of a TFT matrix. An example TFT matrix includes a source, a drain, and a gate, which is separated from p-Si semiconductor by a dielectric layer. The TFT matrix can be disposed on a substrate such as the flexible substrates shown and described elsewhere herein or other substrates. Pt can be used as a (thin film) RTD-based temperature sensing material (thermistor material) in an example embodiment, though other materials can be used including ZnO, IGZO, GaAs, conjugated polymers, nanowires, etc. A passivation and protection layer of $SiO_2$, $SiN_x$, $Al_2O_3$, material covers the source and drain of the TFT. Nonlimiting example materials for the dielectric layer include $SiO_2$, $SiN_x$, $Al_2O_3$, $ZrO_2$, $HfO_2$, etc.

An example TFT matrix allows a single device (pixel) to be on (active) at a given time. In this way, other pixels that are not currently being measured can be prevented from affecting the measurement of the active pixel. In an example temperature range of interest (−20° C.-+40° C.), which is a practical temperature range, the example Si sensors are very linear and well behaved. FIG. 23B show the structure of a Si FET sensor. FIG. 23C shows the simulation results of Id vs Vg at different temperatures, and FIG. 23D shows current vs temperature at zero gate bias, indicating the minimum detectable current change of 0.725 nA for 0.01 K sensing resolution. FIGS. 23E-23G show simulation results of the band structure of the p-Si sensor.

For an array of micro temperature sensor pixels, temperature readouts can be determined to provide a surface map. FIGS. 24A-24D show an example fabrication process of a Si micro sensor array. FIG. 24A shows example connections to a 3×3 Si MOSFET temperature sensor array 282. FIG. 24B-24D shows an example design of a 4×4 Si MOSFET temperature sensor channel 284, source and drain contacts 286, and gate alignment 288, respectively. FIGS. 24E-24F show example testing external circuits 290 for the example 4×4 sensor array.

FIG. 25 shows an example temperature output system 300. In an example embodiment, arrays of micro heaters (e.g., resistive heaters) 302 and coolers (e.g., thermoelectric coolers) 304, along with the array of temperature sensors 306, including but not limited to the temperature sensors described and shown elsewhere herein, are integrated to a flexible substrate 307. In an example operation, the heater 302 and the cooler 304 in a specific location (i.e., certain pixels) are turned on and off by a driver 308, while the sensors 306 detect temperature and provide real-time feedback control over the heater and cooler to achieve certain temperature and heat dissipation rate. Nonlimiting example thermoelectric array coolers 304 can be based on thin film, nanowire arrays, nanoparticle composites, etc.

Micro-scale temperature recording and reproduction, for example, has utility in many applications. In one nonlimiting application, mobile health systems are provided to remotely monitor a user's health. Because many people use mobile devices (e.g., mobile phones, including smart phones) multiple times a day, incorporating example temperature recording into the mobile device allows the generation of a dataset for vital signs related to temperature. If temperature readings are out of a certain range for different areas of the body, for instance, warnings could be issued. Recorded data sets could be used, as another example, to track trending diseases, as disease patterns can be associated with temperature fluctuations over different parts of the body. Other example applications include monitoring of health metrics by providing micro-level temperature information about a patient. This can allow monitoring of critical body areas for infection activity and provide life-saving information and insight. Temperature output transducers can also be used to apply specific heat treatments to certain body areas of a patient for therapeutic treatment.

FIG. 26 shows an example input and output system and method using smell input and output transducers. The example smell input transducer is embodied in an electronic nose 310, and the smell output transducer is embodied in a microfluidic device 312, which may include, or be embodied in, one or more smell cartridges. The electronic nose includes a large number of sensors embodied in sensor arrays, for instance two-dimensional arrays, which detect odors (e.g., mixture of gases and volatile organic compounds) and output signals representative of a two-dimensional map of odors.

The signals are collected by the processor 56, which may (but need not) be integrated with or part of the electronic nose 310. In an example embodiment, the processor 56 compares the two-dimensional map to a library 314, referred to herein as a signature library, which includes a plurality of stored (e.g., in a suitable memory, e.g., in a database) two-dimensional signatures representative of particular analytes (mixtures of chemicals to be identified). Signatures as used herein refer to two-dimensional (for example) smell patterns, similar to patterns of 2D images in video. These patterns can be, but need not be, digital. By comparing the received two-dimensional map to a stored signature, e.g., by using signature matching methods analogous to image recognition, the processor 56 can identify the smell and store the result, produce an appropriate output in response, or both. Nonlimiting example responses include displayed results, updated databases, or reproduced smell outputs via the smell output transducer, e.g., the microfluidic device 312.

In an example embodiment the smell input transducer outputs a signature embodied in a digital pattern generated with the collectively assembled and integrated responses from the individual sensors in the array. The processor 56 applies a pattern recognition process to the digital pattern to compare the pattern to pre-recorded signatures in the signature library 314 to identify the chemical constituents of the analyte.

The processor 56 then reproduces the smell by opening one or more valves of the microfluidic device 312 for related chambers in the device according to the signature. This allows release of certain smell gradients to reproduce or synthesize the smell. In the example shown in FIG. 26, the electronic nose 310, integrated into a mobile phone (or other device, or in a standalone device), detects a smell and produces a signal 316, and the processor 56 stores the signal and processes it as disclosed above to determine the smell signature. An output signal 318 from the processor 56 representative of the smell signature is sent to another mobile device having the microfluidic device 312 as a digitized electronic signal. This additional mobile device receives and processes the signal (in any suitable manner), and releases the smell from the microfluidic device therein.

A nonlimiting example electronic nose is a sensing system that mimics human olfaction and detects odors in a non-separative fashion by signature matching. The example processor 56 includes a detection unit and a pattern recognition module, which typically includes an information processing unit having digital pattern recognition software. The signature library 314 preferably is pre-stored in a memory in the processor, such as but not limited to a database in the processor (or accessible by the processor), and includes a database of odors to provide a reference library.

The sensing unit can include a large (for instance) array of sensors that respond to an analyte. Example sensing mechanisms for the array of sensors include, but are not limited to, MOSFET and metal oxide chemo-FET, which measures the modulation in channel conductance upon gas molecules binding to the surface. Other nonlimiting example sensors for the array include quartz crystal microbalance sensors (which measure the resonance frequency of a quartz crystal with changes in mass per unit area), microelectromechanical systems (MEMS) sensors (e.g., which can measure modulation of surface acoustic waves), optical absorption sensors (e.g., infrared (IR) sensors), mass spectrometry sensors, and ultra-fast gas chromatography sensors.

An electronic nose in an embodiment employs nanowire chemo-FET sensors. Semiconductor nanowires are engineered one-dimensional nanostructures that have been demonstrated to be useful in functional electronic and optoelectronic devices and nanosystems. Semiconductor nanowires can provide fast ultrahigh sensitivity biosensors and chemical sensors due to their large surface-to-volume ratio and small sizes. Though various materials can be used, Si and metal oxides, particularly ZnO, $In_2O_3$, and $TiO_2$ nanowires have shown benefits for gas sensing applications due to their unique surface characteristics. Nanowire sensors typically consume minimal power, can be made in large arrays, and can be integrated into CMOS circuits for signal readout and data processing.

Vertical nanowire biological or chemical sensors typically are capacitive or resistive. In example embodiment electronic noses, highly sensitive nanowire Chemo-FET (resistive) sensors are used, in which the current flow in nanowire is modulated or gated by the surface absorption of analyte molecules from environments, similar to cilia. Electronic noses in an example embodiment include a large array of vertical Si/oxide nanowire bridge sensors. FIGS. 27A-27C show scanning electron micrograph (SEM) images of vertical ZnO nanowire arrays by chemical vapor deposition (CVD) growth (FIGS. 27A-27B) and vertical Si nanowires by a simple solution etching process (FIG. 27C), which is comparable to the cilia array in the lungs (FIG. 27D). The example nanowires have controllable diameters of 50-200 nm and length of a few microns, which are quite comparable to that of cilia.

FIG. 28 shows SEM images of a large array of periodic Si nanowires (labeled NWs in the figure) with various surface shell (sheath) coatings. Example coatings include ZnO, $In_2O_3$, $SiO_2$ (not shown), $SiN_x$, etc., by gas phase sputtering, and the branched nanorod coatings, such as ZnO, $TiO_2$, and $Fe_2O_3$, etc. from solution hydrothermal growth. The surface coatings or modification allow tailoring the surface properties, and as a result the affinity and sensitivity toward different gases or volatile organic compounds (VOCs) etc. analytes in the environment, which is useful for fabrication of example multi-sensor arrays including electronic noses.

A electronic nose embodiment includes an 8×8 array of vertical nanowire bridge sensors. It will be appreciated that the sensor array is not limited to 8×8, but can instead be scaled up or down to essentially any size. As shown in FIGS. 29A-29D, dry etched vertical Si nanowires can pair up and form bridges. FIG. 29A shows the bundling up at the tips of vertical nanowires in very large area, and FIG. 29B is a top view zoomed-in image indicating a periodical bundle-up of four nanowires at the tips. By varying the distance of the nanowires, two nanowires can "kiss" or pair up at the tips, as shown in FIG. 29C, and this can be further permanently fixed by coating a thin layer of ZnO oxide. The coating can be formed from other materials, though coating of a semiconductor of ZnO allows a conducting channel between the nanowires and also offers unique gas sensing capability.

The paired-up vertical nanowire bridge structures provide large area fabrication of nanoscale sensor arrays mimicking olfactory receptor cells, and allow significant benefits for biological and chemical sensing. FIG. 29D shows an example sensor 320 with nanowire bridges disposed on a substrate 321, with one wire on a cathode pad (orange) 322 and the other on an anode pad (blue) 324. Each sensor 320 can include many nanowire bridges. Photolithography can be used to selectively pattern and modify the nanowire bridges surface with different coatings (as shown for clarity of illustration as green or light blue), such as ZnO, $TiO_2$, $In_2O_3$, etc., oxides, or by surface chemical modification using organic molecules by micro-spotting machine allowing varied affinity or sensitivity to different analytes.

FIG. 29E shows an example 8×8 sensor array 326 with color scheme indicate different surface treatments, and thus different sensing capabilities. An example sensor array device can be coupled (e.g., mounted) to a readout circuitry PCB board and packed into a small portable unit. Measurements produced by periodically interrogating an example 8×8 array sensors at a time t can be stored in a 64-dimensional vector $X_t$. $X_t$ refers to the measurement vector. Machine learning methods, which will be appreciated by those of ordinary skill in the art, can be used to extract statistical information from collections of vectors, though other types of statistical analysis are also possible. Larger sensor array can improve the detection accuracy. Other nonlimiting example electronic nose technologies can be MOSFET and metal oxide chemo-FET, quartz crystal microbalance sensors, MEMS sensors, optical sensors, etc.

Example nanowire devices can be integrated into CMOS circuits for data collection. Example embodiment CMOS circuits can collect the electronic signals and transmit them to a processor (e.g., within the electronic nose, locally, remotely etc.) to generate a 2D map (image) for the smell. The processor uses the 2D map to perform the example image recognition process with the signature library in the database.

FIGS. 30A-30C show example smell output transducers embodied in a microfluidic chamber array 330, which releases certain smells upon "request", e.g., as actuated by a smell output signal from a processor. FIG. 30A shows an example structure of micro fluidic chambers 332 including micro smell cartridges 334 and associated to addressable micro heater arrays 336 at OFF state. When an electronic signal is sent to a driver based on an input (e.g., from the processor, from the electronic nose, or from both), the heater 336 and a valve 338 are turned on in FIG. 30B to release smell from the "smell cartridge". FIG. 30C shows the top view of the example micro fluidic chamber array 330. Ultimately, multiple valves can be open to "synthesize" smells based on the gradients and composition from certain cartridges.

For applications such as (but not limited to) environmental or disease detection, an example electronic nose can be programmed to take measurements and collect and save data for each of various periods (e.g., every 15 minutes). The processor memory can be programmed to store the last several (as a nonlimiting example, twenty) results. The results can be integrated with other sense input signals for one or more of sight, sound, and touch, including but not limited to those disclosed elsewhere herein, for processing. In an example embodiment, a location sensor, e.g., a global positioning system (GPS) device, is also integrated into the electronic nose (or elsewhere on the same device as the electronic nose) to simultaneously record location information, which can allow the identification of specific environments. Other nonlimiting example applications include television with smell, e-commerce, communication (e.g., a mobile device with smell output), education and physical learning, robotics, etc. Example electronic noses have additional application in fragrance and cosmetics, food and beverage, environmental monitoring, crime prevention and homeland security, medical diagnostics, personal safety, and other industries.

Example devices and systems allow capture, transmission, and reconstructions of touch sensations, smell sensations, or both. Such devices and systems have applications in learning, medical care, communication, human-machine interfacing, etc. For example, in e-commerce, using an example system, a seller can videotape an item and post it with sale information. A buyer can experience (e.g., touch) the object before making a purchase. A camcorder can be used to record and view with touching capability. For example, one could record an infant and experience how he or she feels years later. Video could be provided with playback in which a viewer can pause and touch the object, providing 4D movies, TV, games, etc. Objects within a game could be experienced by a user. Real-time communications with touch can be made possible.

Other example systems can provide virtual e-health and medical care. For example, using example systems, doctors or health care workers can directly record temperature, touch, feeling, etc., and videotape patients to provide comprehensive information recording of patients' symptoms. Other systems can provide remote medical examination and health care; for instance, a doctor or an expert in USA can obtain real-time recorded information of a patient in Africa or Asia, who are being examined by a local doctor or even non-medical professionals, and perform diagnosis. Point of care can be provided remotely by medical professionals. Medical devices can be improved by, for example, providing a massage pad for physical therapy, rehabilitation, and for special care for babies born prematurely (e.g., to provide physical contact and touch)

Still other example systems can be used for design of articles. In shoe design, one can record people's walking habits and design personalized shoes to maximize comfort. Also applicable to clothes design, bed design, etc. In car design, a car seat can be designed by recording sitting position and designing a personalized car seat to maximize comfort. Pedal design can be improved by recording people's driving habit, response time, etc., and designing a personalized, preferably tunable pedal for improving safety practices.

In communication, "touch" versions of web sites can be provided to allow real-time interaction, feeling, etc. For education and physical learning: interactive websites can be provided with touch, golf, baseball, etc. (e.g., record actions from best players so that learners physically experience process, dramatically reduce learning curve and process). For mobile communication, human chins have the second most populated sensory neurons. Mobile telephones integrated with sensory playback including touch can enhance communication to link people and break down communication barriers, such as "hand-shaking" via cell phones.

In still other example systems, scientific research can be improved, with applications in study of cell proliferation, stem cell research, tissue engineering (where external force may trigger cell division and guide cell propagation) scientific research on neuron signaling, brain-machine interaction and interfacing, etc. Robotics systems can be provided including industrial robots that can handle various non-rigid, flexible objects. Tactile, robotic skin can be generated.

It should be understood that other modifications, substitutions, and alternatives will be apparent to one of ordinary skill in the art. Such modifications, substitutions, and alternatives can be made without departing from the spirit and scope of the invention, which should be determined from the appended claims.

Various features are set forth in the appended claims.

The invention claimed is:

1. A system for recording and reproducing sensations comprising:
   at least one touch and smell input transducer disposed and configured to respectively receive touch sensations and detect smell and produce at least one touch input signal representative of the received touch sensation and one smell input signal representative of the smell;
   a processor configured to receive the at least one touch input signal and the one smell input signal, store data from the at least one touch and smell input signal, and generate at least one touch output signal and smell output signal representative of the received touch sensation and smell, wherein the processor correlates data of the at least one touch and smell input signal with meta data provided by one or more of an object, event, or environment when the at least one touch and smell input signals are received by the at least one touch and smell input transducers, and store the correlated data in memory;
   at least one touch output transducer configured to receive the correlated data from memory directed by the processor and generate a correlated touch output representative of the received touch sensation to reproduce the received touch sensation, and at least one smell output transducer configured to receive the correlated data from memory directed by the processor and generate a correlated smell output representative of the smell,
   wherein the at least one touch and smell output transducer is disposed on a flexible substrate and wherein the at least one touch and smell input transducer and the at least one touch and smell output transducer is coupled to an active matrix of thin film transistors (TFT) disposed to integrate the at least one touch and smell input transducer and the at least one touch and smell output transducer.

2. The system of claim 1, wherein the at least one touch output transducer comprises:

an upper electrode providing an upper substrate, the upper electrode being coupled to a driver;
a lower electrode disposed on the flexible substrate; and
a flexible dielectric material disposed between the upper electrode and the lower electrode.

3. The system of claim 1, further comprising:
at least one sight input transducer disposed and configured to receive sight sensations and produce at least one sight input signal representative of the received sight sensation;
at least one sight output transducer configured to receive a sight output signal from the processor and generate a sight output representative of the received sight sensation;
wherein the processor is configured to receive the at least one sight input signal, store sight input signal from the at least one sight input signal, correlate the sight input signal with the at least one touch and smell input signal and with meta data provided by one or more of an object, event, or environment , and provide the correlated data to the at least one sight output transducer to generate a correlated sight output signal representative of the received sight sensation.

4. The system of claim 3, further comprising: at least one sound input transducer disposed and configured to receive sound sensations and produce at least one sound input signal representative of the received sound sensation;
at least one sound output transducer configured to receive a sight output signal from the processor and generate a sound output representative of the received sound;
wherein the processor is configured to receive the at least one sound input signal, store sound input signal from the at least one sound input signal, correlate the sound input signal with the at least one touch and smell input signal, the sight input signal, and with meta data provided by one or more of an object, event, or environment, and provide the correlated data to the at least one sound output transducer to generate a correlated sound output signal representative of the received sound sensation.

5. A system for recording and reproducing sensations comprising:
at least one touch and smell input transducer disposed and configured to respectively receive touch sensations and detect smell and produce at least one touch input signal representative of the received touch sensation and one smell input signal representative of the smell;
a processor configured to receive the at least one touch input signal and the one smell input signal, store data from the at least one touch and smell input signal, and generate at least one touch output signal and smell output signal representative of the received touch sensation and smell;
at least one touch output transducer configured to receive the touch output signal from the processor and generate a touch output representative of the received touch sensation to reproduce the received touch sensation, and at least one smell output transducer configured to receive the smell output signal from the processor and generate a smell output representative of the smell, wherein the at least one smell output transducers comprises:

a microfluidic device including a plurality of chambers, each of the plurality of chambers being accessible by a selectively operable valve and having a smell cartridge disposed therein;
wherein each of the selective operable valves is selectively opened in response to the smell output signal.

6. The system of claim 1
wherein the at least one smell input transducer comprises a chemical sensor;
wherein the chemical sensor comprises one or more of a MOSFET sensor, a metal oxide chemo-FET sensor, a quartz crystal microbalance sensor, a microelectromechanical systems (MEMS) sensor, an optical absorption sensor, a mass spectrometry sensor, an ultra-fast gas chromatography sensor, and a nanowire sensor.

7. A method of recording and reproducing sensations comprising:
receiving touch sensations and smell with at least one touch and one smell input transducer and producing at least one touch and smell input signal representative of the received touch sensation and smell, wherein the touch input transducer is a glove that comprises temperature, texture and hardness sensors;
tracking the position of the glove and fingers in space to generate positional data;
storing data from the at least one touch and smell input signal;
generating at least one touch and smell output signal representative of the received touch sensation and smell;
receiving sight sensations and producing at least one sight input signal representative of the received sight sensation;
storing data from the at least one sight input signal;
integrating the sight input signal with the at least one touch and smell input signal, and the positional data, wherein the integrating includes correlating that data of the sight input signal, the positional data and the data of the at least one touch and smell input signal with one or more of an object, event or environment of said receiving; and
generating an output based on the integrating, wherein the output is through playback devices that reproduce an image, sound, smell and touch.

8. The method of claim 7
wherein receiving touch sensations and/or smell is performed on a first device;
wherein generating the output is performed on a second device.

9. The method of claim 7
wherein receiving touch sensations and generating the output are performed on the same device to provide interactive feedback.

10. The method of claim 9, further comprising:
receiving sound sensations and producing at least one sound input signal representative of the received sound sensation;
storing data from the at least one sound input signal;
correlating the sound input signal with the at least one touch and/or smell input signal; and
generating the output based on correlating data.

* * * * *